(12) United States Patent
Isaji et al.

(10) Patent No.: US 7,769,498 B2
(45) Date of Patent: Aug. 3, 2010

(54) DRIVER CONDITION DETECTING DEVICE, IN-VEHICLE ALARM SYSTEM AND DRIVE ASSISTANCE SYSTEM

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/417,293

(22) Filed: May 2, 2006

(65) Prior Publication Data
US 2007/0021876 A1 Jan. 25, 2007

(30) Foreign Application Priority Data

| May 12, 2005 | (JP) | ............................. 2005-140255 |
| Aug. 18, 2005 | (JP) | ............................. 2005-237893 |
| Jan. 12, 2006 | (JP) | ............................. 2006-005330 |

(51) Int. Cl.
*G05D 1/00* (2006.01)
*G05D 3/00* (2006.01)
*G06F 7/00* (2006.01)
*G06F 17/00* (2006.01)

(52) U.S. Cl. ........................... 701/1; 701/200; 701/207; 701/301; 348/63; 348/149; 348/148; 340/988; 340/903; 340/901; 340/902; 340/937; 340/942; 340/435; 342/357.07; 382/104; 180/167; 180/169

(58) Field of Classification Search ..................... 701/1, 701/200, 207, 301; 348/63, 149, 148, 116; 340/988, 903, 901, 902, 937, 942, 435; 382/104; 180/167, 169; 725/12; 342/357.07

See application file for complete search history.

(56) References Cited

U.S. PATENT DOCUMENTS

| 4,257,703 A | * | 3/1981 | Goodrich ................... 356/4.03 |
| 5,237,308 A | * | 8/1993 | Nakamura .................. 340/588 |
| 5,257,022 A | | 10/1993 | Irie |
| 5,410,346 A | * | 4/1995 | Saneyoshi et al. ........... 348/116 |
| 5,510,983 A | * | 4/1996 | Iino .............................. 701/1 |

(Continued)

FOREIGN PATENT DOCUMENTS

DE 41 09 159 9/2001

(Continued)

OTHER PUBLICATIONS

A vision-based vehicle behavior monitoring and warning system Tang-Hsien Chang; Chun-Hung Lin; Chih-Sheng Hsu; Yao-Jan Wu; Intelligent Transportation Systems, 2003. Proceedings. 2003 IEEE vol. 1, 2003 pp. 448-453 vol. 1.*

(Continued)

*Primary Examiner*—Dalena Tran
*Assistant Examiner*—Jorge O Peche
(74) *Attorney, Agent, or Firm*—Harness, Dickey & Pierce, PLC

(57) ABSTRACT

When there is a preceding vehicle in a traveling direction of a subject vehicle, an ECU computes a driver condition coefficient that represents degree of change in the size of an image of the preceding vehicle as viewed from the driver is computed. The driving condition of the driver is detected from this driver condition coefficient and used to provide an alarm indicative of the driving condition and to control vehicle travel condition.

35 Claims, 23 Drawing Sheets

U.S. PATENT DOCUMENTS

| | | | |
|---|---|---|---|
| 5,629,669 A * | 5/1997 | Asano et al. | 340/436 |
| 5,642,093 A | 6/1997 | Kinoshita et al. | |
| 5,684,473 A | 11/1997 | Hibino et al. | |
| 5,929,785 A * | 7/1999 | Satonaka | 340/903 |
| 6,324,465 B1 * | 11/2001 | Teramura et al. | 701/96 |
| 6,499,846 B1 * | 12/2002 | Hiller et al. | 353/50 |
| 6,515,597 B1 * | 2/2003 | Wada et al. | 340/988 |
| 6,708,087 B2 * | 3/2004 | Matsumoto | 701/1 |
| 6,917,378 B2 * | 7/2005 | Weis et al. | 348/113 |
| 7,219,309 B2 * | 5/2007 | Kaasila et al. | 715/800 |
| 7,222,306 B2 * | 5/2007 | Kaasila et al. | 715/801 |
| 7,561,181 B2 * | 7/2009 | Schofield et al. | 348/148 |
| 2002/0001398 A1 * | 1/2002 | Shimano et al. | 382/104 |
| 2002/0018119 A1 * | 2/2002 | Kogure et al. | 348/148 |
| 2002/0018120 A1 * | 2/2002 | Kogure et al. | 348/148 |
| 2002/0047901 A1 * | 4/2002 | Nobori et al. | 348/149 |
| 2002/0116106 A1 * | 8/2002 | Breed et al. | 701/45 |
| 2002/0167589 A1 * | 11/2002 | Schofield et al. | 348/148 |
| 2003/0095135 A1 * | 5/2003 | Kaasila et al. | 345/613 |
| 2003/0108222 A1 * | 6/2003 | Sato et al. | 382/104 |
| 2003/0122930 A1 * | 7/2003 | Schofield et al. | 348/148 |
| 2003/0137522 A1 * | 7/2003 | Kaasila et al. | 345/619 |
| 2003/0209893 A1 * | 11/2003 | Breed et al. | 280/735 |
| 2004/0022416 A1 * | 2/2004 | Lemelson et al. | 382/104 |
| 2004/0054473 A1 * | 3/2004 | Shimomura | 701/301 |
| 2004/0073367 A1 * | 4/2004 | Altan et al. | 701/301 |
| 2004/0109060 A1 * | 6/2004 | Ishii | 348/148 |
| 2004/0177323 A1 * | 9/2004 | Kaasila et al. | 715/513 |
| 2004/0183817 A1 * | 9/2004 | Kaasila | 345/660 |
| 2004/0184638 A1 * | 9/2004 | Nobori et al. | 382/104 |
| 2004/0201671 A1 * | 10/2004 | Weis et al. | 348/142 |
| 2005/0062758 A1 * | 3/2005 | Kaasila et al. | 345/613 |
| 2005/0063565 A1 * | 3/2005 | Nagaoka et al. | 382/104 |
| 2005/0085954 A1 * | 4/2005 | Isaji et al. | 701/1 |
| 2005/0090950 A1 * | 4/2005 | Sawamoto et al. | 701/23 |
| 2005/0200700 A1 * | 9/2005 | Schofield et al. | 348/148 |
| 2006/0164514 A1 * | 7/2006 | Muramatsu et al. | 348/207.99 |
| 2006/0203092 A1 * | 9/2006 | Nobori et al. | 348/148 |
| 2008/0024608 A1 * | 1/2008 | Hahn et al. | 348/148 |

FOREIGN PATENT DOCUMENTS

| | | |
|---|---|---|
| EP | 1 034 984 | 9/2000 |
| EP | 1 225 079 A | 7/2002 |
| JP | 63201345 A * | 8/1988 |
| JP | 5-162596 | 6/1993 |
| JP | 07-065294 | 3/1995 |
| JP | 09-290665 | 11/1997 |
| JP | 10-129373 | 5/1998 |
| JP | 11119147 A * | 4/1999 |
| JP | 11-139229 | 5/1999 |
| JP | 11-278098 | 10/1999 |
| JP | 2000-264092 | 9/2000 |
| JP | 2000-268297 | 9/2000 |
| JP | 2000-315300 | 11/2000 |
| JP | 2002-219968 | 8/2002 |
| JP | 2002-264687 | 9/2002 |
| JP | 2002-367100 | 12/2002 |
| JP | 2003-051097 | 2/2003 |
| JP | 2003-118423 | 4/2003 |
| JP | 2004-203340 | 7/2004 |
| JP | 2004-355324 | 12/2004 |
| JP | 2005222241 A * | 8/2005 |
| WO | WO 89/07537 A | 8/1989 |

OTHER PUBLICATIONS

Chang, Tang-Hsien et al., "A Vision-Based Vehicle Behavior Monitoring and Warning System," IEEE vol. 1, Oct. 23, 2003, pp. 448-453.

Masayoshi Aoki, "Imaging and Analysis of Traffic Scene," IEEE, vol. 4, Oct. 24, 1999 pp. 1-5.

European Search Report dated Mar. 19, 2007.

Korean Office Action issued in corresponding case and English translation thereof, 2007.

European Search Report dated Feb. 12, 2008.

Office Action dated Apr. 24, 2009 in corresponding Chinese Patent Application No. 2006-100827039.

European Patent Office Search Report for counterpart European application dated Jun. 12, 2009.

European Patent Office Search Report for counterpart European application dated Jul. 1, 2009.

Notice of Rejection mailed Aug. 25, 2009 in corresponding Japanese application No. 2006-005330.

* cited by examiner

FIG. 3
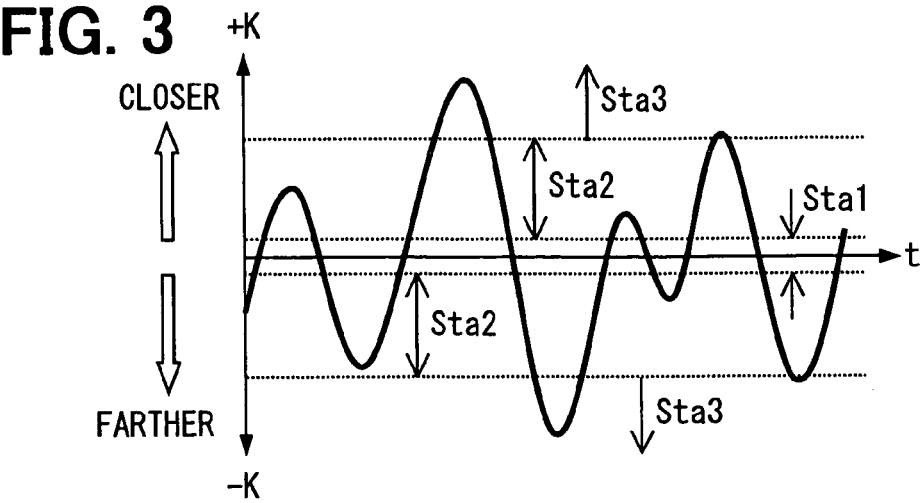
FIG. 4
| | K×1000 | DRIVE CONDITION |
|---|---|---|
| Sta5 | ±10 | TERRIBLY INAPPROPRIATE |
| Sta4 | ±1 | VERY INAPPROPRIATE |
| Sta3 | ±0.1 | INAPPROPRIATE |
| Sta2 | ±0.01 | NORMAL |
| Sta1 | ±0.001 | APPROPRIATE |
$10^4$ WIDTH (40dB) { Sta5, Sta4, Sta3, Sta2 }
INDIVIDUAL DIFFERENCE { Sta3, Sta2 }
FIG. 5
SDC CONTROL AND CC CONTROL MODEL
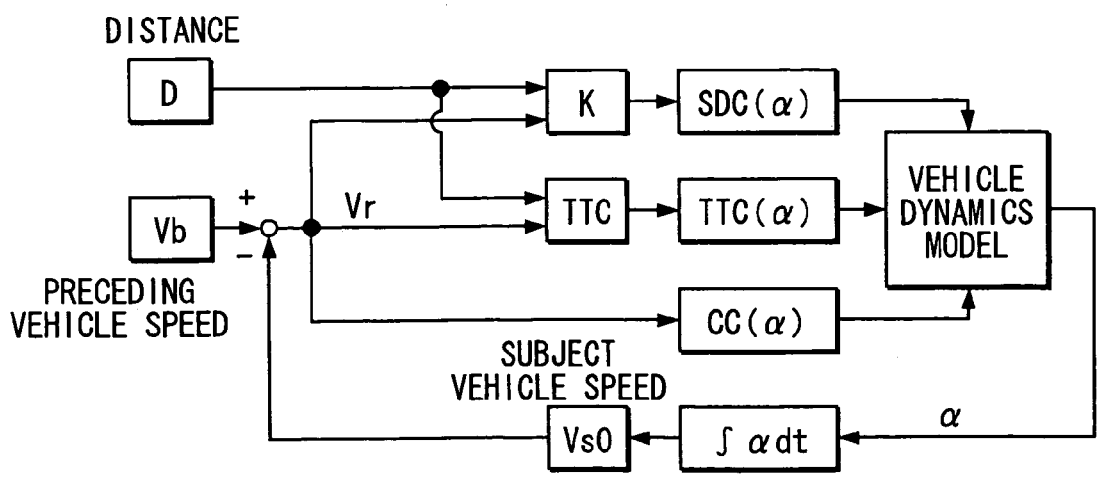

| | CASE | G1 | Vrda[km/h] |
|---|---|---|---|
| DEC. CONTROL | 1 | 0.167 | 0 |
| | 2 | 1.000 | 0 |
| | 3 | 1.000 | 10 |

| | CASE | G4 | TARGET KdB[dB] | Vraa[km/h] |
|---|---|---|---|---|
| DEC./ ACC. CONTROL | 4 | 1.000 | −20 | 0 |
| | 5 | 1.000 | −80 | 0 |
| | 6 | 1.000 | −80 | −10 |

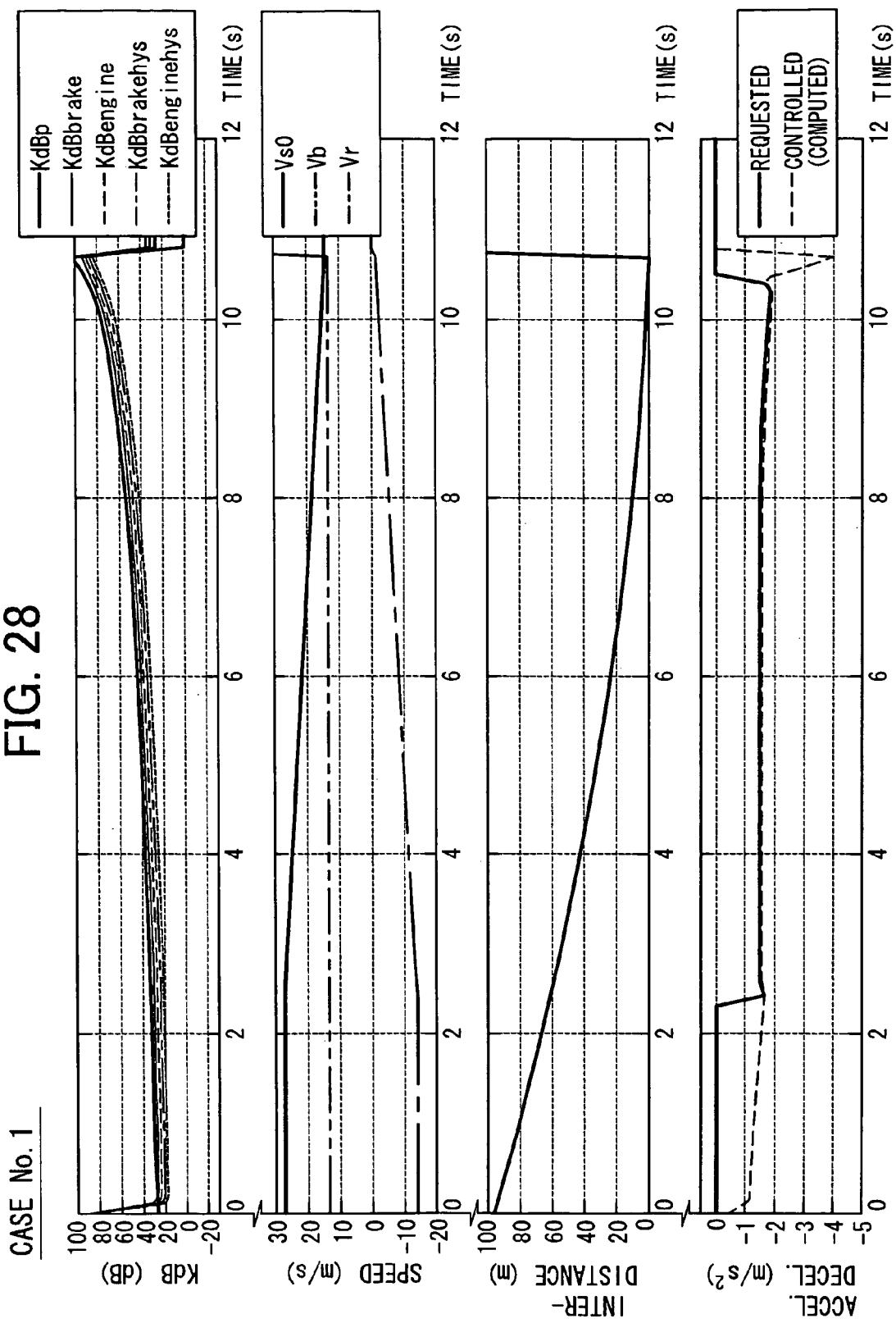

DRIVER CONDITION DETECTING DEVICE, IN-VEHICLE ALARM SYSTEM AND DRIVE ASSISTANCE SYSTEM

CROSS REFERENCE TO RELATED APPLICATION

This application is based on and incorporates herein by reference Japanese Patent Applications No. 2005-140255 filed on May 12, 2005, No. 2005-237893 filed on Aug. 18, 2005 and No. 2006-5330 filed on Jan. 12, 2006.

FIELD OF THE INVENTION

The present invention relates to a driver condition detecting device, an in-vehicle alarm system and a drive assistance system.

BACKGROUND OF THE INVENTION

In some of techniques of the past to detect the condition of a vehicle driver, the driving load on a driver is detected by the biological reactions of the driver, as disclosed in JP 264687/2002A, for example. Such biological reactions include heart beat, breath, electrodermal potential, and the like. In the technique disclosed in JP 219968/2002A, how a driver is looking off is detected from the orientation of the driver's face and how a drive is dozing is detected from the driver's opening/closing his/her eyes. In the technique disclosed in U.S. Pat. No. 5,642,093 (JP 203000/1996A), the presence/absence of a psychological stimulus that makes a psychological burden on or a visual stimulus to a driver is determined; and the wakefulness of the driver is detected by the presence/absence of this psychological stimulus. For example, the psychological burden comes from: the magnitude of the lane width and the degree of change in curvature radius of a road lying ahead of a subject vehicle that meets the driver's eyes; the presence/absence of a preceding vehicle, parked vehicle, or moving obstacle; or the presence/absence of the possibility of a rear-end collision with a preceding vehicle.

The driving condition of a driver unstable for driving includes such driving condition as inattentive driving, including "absent-minded driving and distracted driving," as well as the above drowsy driving and driving without keeping the driver's eyes on the road ahead. These driving conditions of the driver need be considered.

When a driver drives a car, he/she repeatedly carries out three processes: the driver mainly visually acquires information required for traveling, and perceives the condition of traveling based on the acquired information (perception process); he/she determines a driving operation to travel in safety according to the perceived condition of traveling (determination process); and he/she performs the determined driving operation (action process). In cases where the driver does not appropriately perform any one process, he/she cannot continue safe traveling.

Therefore, the driving condition of a driver can be comprehensively determined by detecting the driving condition of the driver in the determination process and the operation process as well as in the perception process. The above conventional techniques are all for detecting whether the perception process can be appropriately carried out or not, and cannot detect the driving condition of a driver in the individual processes including the above three processes. Further, they are incapable of comprehensively determining the driving condition of a driver and providing alarms and driving assistance based on the determination.

SUMMARY OF THE INVENTION

It is an object to provide a driver condition detecting device, an in-vehicle alarm system and a drive assistance system, wherein the driving condition of a driver can be comprehensively detected.

According to a driver condition detecting device according to a first aspect, in cases where a subject vehicle approaches a preceding vehicle, for example, a driver of the subject vehicle performs the following operation when he/she can perceive the presence of the preceding vehicle: the driver starts brake operation with braking start timing intrinsic to the driver; and he/she approaches the preceding vehicle while decelerating the subject vehicle. In cases where the driver of the subject vehicle is in such driving condition as drowsy driving, driving without keeping his/her eyes on the road ahead, and inattentive driving, it is difficult to perceive the presence of the preceding vehicle. Therefore, even when the braking start time intrinsic to the driver comes, he/she does not start brake operation and approaches the preceding vehicle without decelerating his/her vehicle.

In scenes in which the subject vehicle approaches a preceding vehicle, the driver of the subject vehicle usually perceives the approach to the preceding vehicle by change in the size (area) of an image of the preceding vehicle. (The approach is equivalent to change in the inter-vehicle distance between the subject vehicle and the preceding vehicle.) When the driver of the subject vehicle perceives the presence of the preceding vehicle, he/she approaches the preceding vehicle while decelerating the subject vehicle, as described above. Therefore, the degree of change (hereafter, referred to as driver condition coefficient) in the size of an image of the preceding vehicle as viewed from the approaching driver takes a low value. When it is difficult for the driver of the subject vehicle to perceive the presence of a preceding vehicle, he/she approaches the preceding vehicle without decelerating his/her vehicle, as described above. Therefore, the driver condition coefficient obtained during this approach takes a high value.

With respect to the preceding vehicle, therefore, the driving condition of the driver can be comprehensively detected based on the driver condition coefficient. Even when the driver of the subject vehicle can perceive the presence of a preceding vehicle, the above-described determination process or action process may not be appropriately carried out. That is, determination of braking start timing may be inappropriate or brake operation may be inappropriate. As a result, the driver condition coefficient may take a high value. Therefore, the driving condition of the driver can be comprehensively detected based on the driver condition coefficient in the determination process and the operation process as well as in the perception process.

The driver condition detecting device includes:
an inter-vehicle distance detecting means that detects an inter-vehicle distance between a preceding vehicle and the subject vehicle, and is characterized in that:
the driver condition coefficient computing means computes K for the driver condition coefficient by the following expression, letting the inter-vehicle distance be D and change in the inter-vehicle distance per unit time be dD/dt:

$$K = (-2/D^3) \times (dD/dt) \quad \text{(Expression 1)}$$

As illustrated in FIG. 2, letting the actual height of a preceding vehicle be Ho, its actual width be Wo, its actual area be So (=Wo×Ho), the height of the image of the preceding vehicle that meets the eyes (retinas) of the driver of the subject vehicle be H, its width be W, its area be S (=W×H), the distance between the driver's eye (lens of eye) and the preceding vehicle be D, and the focal distance of the driver's eyes be f, the area S of the image of the preceding vehicle is expressed by the expression below. (It is assumed that the distance D is equal to the inter-vehicle distance Do between the preceding vehicle and the subject vehicle for the sake of simplicity.)

$$S = W \times H = Wo \times Ho \times (f/D)^2 \quad \text{(Expression 2)}$$

Here, the degree of change dS/dt per unit time in the area S of the image of the preceding vehicle is expressed by the expression below. The symbol "∝" in the following expression refers to proportionality relation.

$$dS/dt = d(W \times H)/dt \propto d(f/D)^2/dt \propto d(1/D^2)/dt \quad \text{(Expression 3)}$$

When the above expression is partially differentiated with the distance D, the following expression is obtained.

$$dS/dt \propto d(1/D^2)/dt = (-2/D^3) \times (dD/dt) \quad \text{(Expression 4)}$$

Therefore, the driver condition coefficient K that represents the degree of change dS/dt in the area S of the image of the preceding vehicle can be computed from the inter-vehicle distance D between the preceding vehicle and the subject vehicle and change dD/dt in inter-vehicle distance per unit time.

A driver condition detecting device includes:

an inter-vehicle distance detecting means that detects an inter-vehicle distance between a preceding vehicle and the subject vehicle;

a subject vehicle speed detecting means that detects the vehicle speed of the subject vehicle; and at least either of a relative speed computing means that computes the relative speed between a preceding vehicle and the subject vehicle from the vehicle speed of the subject vehicle and temporal change in inter-vehicle distance, and a relative speed detecting means that detects the relative speed between a preceding vehicle and the subject vehicle, and is characterized in that:

the driver condition coefficient computing means computes K for the driver condition coefficient by the following expression, letting the inter-vehicle distance be D and the relative speed be Vr:

$$K = (-2/D^3) \times Vr \quad \text{(Expression 5)}$$

Change dD/dt in inter-vehicle distance per unit time is equal to the relative speed Vr between the preceding vehicle and the subject vehicle. Therefore, the driver condition coefficient K can be computed from the inter-vehicle distance D and the relative speed Vr.

A driver condition detecting device includes:

an image pickup means that is mounted in the subject vehicle and picks up an image of the preceding vehicle, and is characterized in that:

the driver condition coefficient computing means computes the driver condition coefficient from the degree of change per unit time in the size of an image of the preceding vehicle picked up by the image pickup means.

The driver condition coefficient K represents the degree of change dS/dt per unit time in the area S of an image of a preceding vehicle. Accordingly, it is equal to the degree of change per unit time in the size of the image of the preceding vehicle picked up by the image pickup means, such as a camera. Therefore, the driver condition coefficient K can be computed from the degree of change per unit time in the size of an image of the preceding vehicle picked up by the image pickup means.

An in-vehicle alarm system includes a driver condition detecting device and a driving condition reporting means that reports the driving condition of the driver corresponding to the magnitude of the absolute value of the driver condition coefficient.

As an example, it will be assumed that the subject vehicle travels following a preceding vehicle. When the driver is in condition suitable for driving, he/she can perform driving operation so that a certain inter-vehicle distance is maintained between the preceding vehicle and the subject vehicle. For this reason, the driver condition coefficient K in the situation in which the inter-vehicle distance is maintained varies within the range of Sta1 or Sta2, as illustrated in FIG. 3. The driving condition of the driver in Sta1 or Sta2 represents appropriate or normal driving condition, as illustrated in FIG. 4.

When the driver is in condition unsuitable for driving, he/she cannot perform driving operation so that a certain inter-vehicle distance is maintained between the preceding vehicle and the subject vehicle. For this reason, the driver condition coefficient K in the situation in which the inter-vehicle distance is not maintained varies within the range of Sta3 or larger, as illustrated in FIG. 3. The driving condition of the driver in Sta3 to Sta5 represents inappropriate, very inappropriate, or completely inappropriate driving condition, as illustrated in FIG. 4.

Therefore, the driving condition of the driver can be reported according to the magnitude of the absolute value of the driver condition coefficient K in accordance with the table in FIG. 4. (The driving condition is classified into five levels, for example, appropriate, normal, inappropriate, very inappropriate, and completely inappropriate.)

An in-vehicle alarm system includes a driver condition detecting device, and an alarm generating means that generates an alarm to the driver based on the magnitude of the absolute value of the driver condition coefficient.

It will be assumed that the subject vehicle travels following the preceding vehicle. As illustrated in FIG. 3 and FIG. 4, when the driver is in condition suitable for driving, the driver condition coefficient K varies within the range of Sta1 or Sta2; when the driver is in condition unstable for driving, the driver condition coefficient K varies within the range of Sta3 or larger. Therefore, an alarm to the driver can be generated based on the magnitude of the absolute value of the driver condition coefficient K, and the driver, when in condition unsuitable for driving, can be thereby alerted.

An in-vehicle alarm system includes:

a driver condition detecting device; and an alarm generating means that generates an alarm to the driver based on the magnitude of the value of the driver condition coefficient, and is characterized in that:

the driver condition coefficient is indicated by a positive or negative value relative to the value obtained when there is no change in the size of an image of the preceding vehicle, when the size of an image of the preceding vehicle is changed and increased, the driver condition coefficient takes a positive value, and when the size of an image of the preceding vehicle is changed and reduced, the driver condition coefficient takes a negative value, and when the driver condition coefficient takes a positive value, the alarm generating means generates an alarm.

With respect to the relative speed Vr between the preceding vehicle and the subject vehicle, the following assumption is made: when the preceding vehicle and the subject vehicle draw close to each other, the relative speed Vr is marked with a negative (−) sign; when the preceding vehicle and the subject vehicle draw apart from each other, the relative speed Vr is marked with a positive (+) sign. Since the driver condition coefficient $K=(-2/D^3) \times Vr$, the following takes place in this case: when the preceding vehicle and the subject vehicle draw close to each other, the size of an image of the preceding vehicle is changed and increased. The driver condition coefficient K at that time takes a positive value. When the preceding vehicle and the subject vehicle draw apart from each other, the size of an image of the preceding vehicle is changed and reduced. The driver condition coefficient K at that time takes a negative value. FIG. 3 illustrates the situation in which, when the preceding vehicle and the subject vehicle draw close to each other, the driver condition coefficient K takes a positive (+) value, and when the preceding vehicle and the subject vehicle draw apart from each other, the driver condition coefficient K takes a negative (−) value.

As described above, when the driver condition coefficient K takes a positive value, the situation in which the preceding vehicle and the subject vehicle draw close to each other continues. Therefore, the risk posed to the subject vehicle is larger than when the driver condition coefficient K takes a negative value, that is, when the situation in which the preceding vehicle and the subject vehicle draw apart from each other continues. Therefore, when the driver condition coefficient K takes a positive value, an alarm is generated to the driver based on the magnitude of the value of the driver condition coefficient. Thus, an alarm can be generated only in the situation in which the preceding vehicle and the subject vehicle are drawing close to each other.

An in-vehicle alarm system includes a braking force applying means that applies braking force to the subject vehicle. It is characterized in that the alarm generating means causes the braking force applying means to apply braking force to decelerate the subject vehicle and thereby generates an alarm. Thus, a body sensory alarm (alarming brake) can be given to the driver of the subject vehicle.

An in-vehicle alarm system includes:
a driver condition detecting device; and
an alarm generating means that generates an alarm to the driver based on the magnitude of the value of the driver condition coefficient, and is characterized in that:
the driver condition coefficient is
indicated by a positive or negative value relative to the value obtained when there is no change in the magnitude of the size of an image of the preceding vehicle,
when the magnitude of the size of an image of the preceding vehicle is changed and increased, the driver condition coefficient takes a positive value, and
when the magnitude of the size of an image of the preceding vehicle is changed and reduced, the driver condition coefficient takes a negative value, and
when the driver condition coefficient takes a negative value, the alarm generating means generates an alarm.

As described above, when the driver condition coefficient K takes a positive value, the situation in which the preceding vehicle and the subject vehicle draw close to each other continues. Therefore, the risk posed to the subject vehicle is larger than when the driver condition coefficient K takes a negative value, that is, when the situation in which the preceding vehicle and the subject vehicle draw apart from each other continues. There are also possible cases where the above-described situation in which the preceding vehicle and the subject vehicle draw apart from each other is not by the driver's intentional driving operation but is caused by the following: the driver of the subject vehicle lapses into driving condition unsuitable for driving. Therefore, when the driver condition coefficient takes a negative value, an alarm is generated, and thus an alarm can be generated in the situation in which the preceding vehicle and the subject vehicle draw apart from each other.

An in-vehicle alarm system includes a driving force applying means that applies driving force to the subject vehicle. It is characterized in that the alarm generating means causes the driving force applying means to apply driving force to accelerate the subject vehicle, and thereby generates an alarm. Thus, a body sensory alert can be given to the driver of the subject vehicle.

An in-vehicle alarm system includes a time to collision computing means that computes a time to collision that indicates a time allowed before the subject vehicle collides with the preceding vehicle. It is characterized in that the alarm generating means generates an alarm according to the time to collision. Thus, an alarm can be generated based on a time to collision.

An in-vehicle alarm system includes a target inter-vehicle distance computing means that computes a target inter-vehicle distance between the preceding vehicle and the subject vehicle, corresponding to the vehicle speed of the subject vehicle. It is characterized in that, when the inter-vehicle distance between the preceding vehicle and the subject vehicle becomes shorter than the target inter-vehicle distance, the alarm generating means generates an alarm. Thus, an alarm can be generated based on the inter-vehicle distance between the preceding vehicle and the subject vehicle.

An in-vehicle alarm system is characterized in that: the alarm generating means includes an alarm determining means that compares a value taken by the driver condition coefficient with a threshold value of the driver condition coefficient and determines whether to generate an alarm or not; and it generates an alarm when the alarm determining means determines that an alarm should be generated. Thus, whether to generate an alarm or not can be determined based on the threshold value of the driver condition coefficient.

An in-vehicle alarm system includes a threshold value changing means that changes a threshold value of the driver condition coefficient to an arbitrary value. Thus, the driver of the subject vehicle can change a threshold value of the driver condition coefficient used for determining whether to generate an alarm to a desired threshold value.

An in-vehicle alarm system is characterized in that: the alarm determining means repeatedly carries out determination in a predetermined cycle; and the alarm generating means generates an alarm when the number of times when the alarm determining means determines that an alarm should be generated becomes a certain value or above and/or when the time when it is determined that an alarm should be generated lasts for a certain time or longer. Thus, hunting in alarm generation can be suppressed.

An in-vehicle alarm system is characterized in that: when generation of an alarm is started and then the time when the alarm determining means determines that an alarm should not be generated lasts for a certain time or longer, the alarm generating means ceases generating an alarm. Thus, alarm generation can be ceased.

An in-vehicle alarm system is characterized in that:
the relative speed between the preceding vehicle and the subject vehicle takes a negative value when the preceding vehicle and the subject vehicle draw close to each other, and
a positive value when the preceding vehicle and the subject vehicle draw apart from each other, and
when the relative speed between the preceding vehicle and the subject vehicle transitions from negative to positive, the alarm generating means ceases generating an alarm.

As described above, the relative speed Vr between the preceding vehicle and the subject vehicle is marked with a negative (−) sign when the preceding vehicle and the subject vehicle draw close to each other; it is marked with a positive (+) sign when the preceding vehicle and the subject vehicle draw apart from each other. When the relative speed Vr transitions from negative to positive, the situation in which the preceding vehicle and the subject vehicle draw close to each other transitions to the situation in which they draw apart from each other. As the result of this change of situation, the risk posed to the subject vehicle is reduced. Therefore, generation of an alarm can be ceased when the risk posed to the subject vehicle is reduced.

An in-vehicle alarm system includes:
a driver condition detecting device;
an object detecting means that detects an object existing ahead of the subject vehicle; and
an alarm generating means that, when the object detecting means detects an object and the object exists in a predetermined alarm coverage ahead of the subject vehicle, generates an alarm to the driver, and is characterized in that:
the alarm generating means includes a alarm coverage changing means that changes the width of the alarm coverage according to the magnitude of the absolute value of the driver condition coefficient.

For example, a very wakeful driver has broad sight; therefore, he/she can extensively perceive an object existing ahead of his/her vehicle. Meanwhile, a less wakeful driver has narrow sight; therefore, he/she has difficulty in perceiving an object existing in peripheral vision off the center of his/her field of view (central vision). (Or, the driver cannot perceive it at all.) Consequently, the width of alarm coverage is changed according to the magnitude of the absolute value of the driver condition coefficient K, as illustrated in FIG. 11. When an object exists in this changed alarm coverage, an alarm is generated. Thus, an alert can be given to the driver in condition unsuitable for driving about the presence of an object that could be perceived if he/she is in condition suitable for driving.

An in-vehicle alarm system is characterized in that: the alarm coverage changing means changes
the width in the left and right direction ahead of the subject vehicle and changes the alarm coverage so that
the width is widened with increase in the absolute value of the driver condition coefficient and
the width is narrowed with decrease in the absolute value of the driver condition coefficient.

Thus, an alert can be given to, for example, a driver whose wakefulness is lowered and thus whose field of view is narrowed about the presence of an object that he/she cannot perceive. Also, it is possible to avoid giving an alert to a driver in condition suitable for driving about the presence of an object he/she can perceive.

An in-vehicle alarm system is characterized in that the object detecting means detects at least one object of light vehicle, pedestrian, road traffic sign, and traffic light. This makes it possible to detect any light vehicle or pedestrian that can enter the course of the subject vehicle, and detect a road traffic sign and a traffic light to be followed during traveling.

A drive assistance system includes: a driver condition detecting device; and an acceleration/deceleration controlling means that, when the subject vehicle travels following the preceding vehicle, carries out at least either of acceleration control in which the subject vehicle is accelerated and deceleration control in which the subject vehicle is decelerated based on the magnitude of the value of the driver condition coefficient.

When the subject vehicle travels following the preceding vehicle, the foregoing takes place. A driver in condition suitable for driving can perform driving operation so that the inter-vehicle distance between the preceding vehicle and the subject vehicle is kept constant. Therefore, in this situation in which the constant inter-vehicle distance is maintained, the driver condition coefficient K varies within the range of Sta1 or Sta2, as illustrated in FIG. 3.

A driver in condition unsuitable for driving cannot perform driving operation so that the inter-vehicle distance between the preceding vehicle and the subject vehicle is kept constant. Therefore, in this situation in which the constant inter-vehicle distance is not maintained, the driver condition coefficient K varies within the range of Sta3 or larger, as illustrated in FIG. 3.

To assist the driving operation of a driver who is lapsing into condition unsuitable for driving, the invention accelerates or decelerates the subject vehicle according to the magnitude of the value of the driver condition coefficient K. Thus, when the subject vehicle travels following the preceding vehicle, the driving operation can be assisted.

A drive assistance system is characterized in that:
the driver condition coefficient is
indicated by a positive or negative value relative to the value obtained when there is no change in the size of an image of the preceding vehicle,
when the size of an image of the preceding vehicle is changed and increased, the driver condition coefficient takes a positive value, and
when the size of an image of the preceding vehicle is changed and reduced, the driver condition coefficient takes a negative value, and
the acceleration/deceleration controlling means carries out deceleration control when the driver condition coefficient takes a positive value, and
acceleration control when the driver condition coefficient takes a negative value.

Thus, deceleration control is carried out when the preceding vehicle and the subject vehicle draw close to each other. Therefore, the subject vehicle can be restrained from approaching the preceding vehicle. Meanwhile, acceleration control is carried out when the preceding vehicle and the subject vehicle draw apart from each other. Therefore, the subject vehicle can be restrained from receding from the preceding vehicle.

A drive assistance system is characterized in that: even when at least either of acceleration operation aNDbrake operation by the driver of the subject vehicle intervenes while acceleration control or deceleration control is being carried out, the acceleration/deceleration controlling means carries out acceleration control or deceleration control without interruption.

Thus, when the subject vehicle travels following the preceding vehicle, the following can be implemented: in cases where the subject vehicle is basically driven by the driving operation of the driver of the subject vehicle and the driver is lapsing into condition unsuitable for driving, the driving operation of the driver can be assisted.

A drive assistance system is characterized in that: when acceleration operation is performed to accelerate the subject vehicle while deceleration control is being carried out, the acceleration/deceleration controlling means ceases the execution of the deceleration control when a certain time has lapsed after start of the acceleration operation.

Thus, when the subject vehicle passes the preceding vehicle, for example, the following can be implemented: in cases where the driver performs acceleration operation to accelerate the subject vehicle in order to smoothly pass the preceding vehicle, continuing the execution of deceleration control can be avoided.

A drive assistance system is characterized in that:

the acceleration/deceleration controlling means carries out at least either of deceleration control by main brake and deceleration control by engine brake as deceleration control, and carries out only deceleration control by engine brake when a certain time has lapsed after start of acceleration operation in cases where the acceleration operation is performed to accelerate the subject vehicle while deceleration control is being carried out.

Thus, when the preceding vehicle and the subject vehicle draw close to each other and nevertheless the driver performs acceleration operation to accelerate the subject vehicle, the execution of deceleration control by main brake can be continuously avoided.

A drive assistance system is characterized in that: deceleration control by the acceleration/deceleration controlling means is such that multiple different threshold values are set for the driver condition coefficient and multiple different decelerations to be generated in the subject vehicle are set for the threshold values; and the subject vehicle is decelerated at a deceleration corresponding to the value of the driver condition coefficient. Thus, the subject vehicle can be decelerated at a deceleration corresponding to the value of the driver condition coefficient K.

A drive assistance system is characterized in that the acceleration/deceleration controlling means sets the deceleration to be generated in the subject vehicle to a larger value as the threshold value is larger. Thus, the following advantage is brought: in the situation in which the driver's brake operation is not performed and the preceding vehicle and the subject vehicle draw close to each other, for example, the driver condition coefficient K gradually takes a larger value. Therefore, the larger the threshold value is, the larger value the deceleration to be generated in the subject vehicle is set to. Thus, the deceleration to be generated in the subject vehicle can be increased stepwise.

A drive assistance system includes:

an oncoming vehicle detecting means that detests an oncoming vehicle on the lane adjacent to the lane on which the subject vehicle is traveling, and is characterized in that:

when an oncoming vehicle is detected by the oncoming vehicle detecting means, the acceleration/deceleration controlling means ceases the execution of acceleration control in which the subject vehicle is accelerated and deceleration control in which the subject vehicle is decelerated. Thus, even when an oncoming vehicle is erroneously detected as the preceding vehicle, acceleration control or deceleration control can be prevented from being carried out.

A drive assistance system is characterized in that, when the steering system of the subject vehicle is operated by the driver, the acceleration/deceleration controlling means ceases the execution of deceleration control. Thus, the following can be prevented: the driver operates the steering system during deceleration, and as the result, the behavior of the vehicle becomes unstable.

A drive assistance system includes a vehicle speed controlling means that controls the vehicle speed of the subject vehicle to a certain vehicle speed. Thus, when the subject vehicle solely runs, assistance can be provided to keep the vehicle speed of the subject vehicle at a certain vehicle speed.

A drive assistance system includes an in-vehicle alarm system. Thus, the driver's operation can be assisted, and further an alarm can be generated based on the driver condition coefficient.

According to a second aspect, a driver condition coefficient within the range of Sta1 or Sta2 illustrated in FIG. 3 is taken as a driver condition coefficient (target driver condition coefficient) to be taken as a target. (The above condition coefficient is equivalent to a driver condition coefficient in the situation in which a driver in condition suitable for driving is performing driving operation so as to keep the inter-vehicle distance between the preceding vehicle and the subject vehicle at a certain distance.) Based on this target driver condition coefficient and the present driver condition coefficient, a relative acceleration/deceleration between the subject vehicle and the preceding vehicle to be taken as a target (target relative acceleration/deceleration) is computed. Based on this target relative acceleration/deceleration, the subject vehicle is accelerated or decelerated. Thus, when the subject vehicle travels following the preceding vehicle, driving operation can be assisted based on the relation between the target driver condition coefficient and the present driver condition coefficient.

A drive assistance system includes:

an inter-vehicle distance detecting means that detects the inter-vehicle distance D between the preceding vehicle and the subject vehicle; and a relative speed acquiring means that acquires the relative speed Vr between the preceding vehicle and the subject vehicle, and is characterized in that:

the target relative acceleration/deceleration computing means computes $(dVr/dt)t$, or the target relative acceleration/deceleration by the following expression, letting a driver condition variable, determined based on $Kp[dB]$, or the present driver condition coefficient expressed by logarithm and $Kt[dB]$, or the target driver condition coefficient expressed by logarithm, be $Kf[dB]$:

$$(dVr/dt)t = 7.5 \times 10^{\{(Kf[dB]/10)-8\}} \times D^2 \times Vr \quad \text{(Expression 6)}$$

When Expression 5 is multiplied by a constant and expressed by logarithm (decibel [dB]), the following expression is obtained. $|K|$ in the following expression represents the absolute value of the driver condition coefficient.

$$K[dB] = 10 \times \log(|K|/0.00005) \quad \text{(Expression 7)}$$

When the relative speed Vr is subjected to time differentiation, the relative acceleration/deceleration $(dVr/dt)$ expressed by the following expression is obtained from the constant multiple of Expression 5 and Expression 7.

$$(dVr/dt) = 7.5 \times 10^{\{(K[dB]/10)-8\}} \times D^2 \times Vr \quad \text{(Expression 8)}$$

As an example, it will be assumed that the target driver condition coefficient $Kt[dB]$ is 30[dB]. When this is substituted for $K[dB]$ in Expression 8, the relative deceleration $(dVr/dt)$ is indicated by the curve in FIG. 14. According to the invention, the driver condition variable $Kf[dB]$ is determined so that the present driver condition coefficient $Kp[dB]$ approaches the target driver condition coefficient $Kt[dB]$. The thus determined driver condition variable $Kf[dB]$ is substituted into Expression 6. Thus, a target relative acceleration/deceleration $(dVr/dt)t$ that is a relative acceleration/deceleration to be taken as a target can be computed.

A drive assistance system includes a target driver condition coefficient setting means that sets the target driver condition coefficient $Kt[dB]$ to an arbitrary value. Thus, it can be set to a value to the driver's own taste.

A drive assistance system is characterized in that: the relative speed Vr takes a negative value when the preceding vehicle and the subject vehicle draw close to each other; and it takes a positive value when the preceding vehicle and the subject vehicle draw apart from each other. Thus, the relation between the preceding vehicle and the subject vehicle can be grasped from the sign of the relative speed.

A drive assistance system is characterized in that:
the subject vehicle acceleration/deceleration controlling means prohibits the execution of deceleration control when the relative speed Vr takes a negative value and the absolute value of the relative speed Vr is larger than the speed of the subject vehicle.

When the relative speed Vr takes a negative value and its absolute value is larger than the speed of the subject vehicle, the following is possible: the relative speed Vr is not the relative speed between the subject vehicle and the preceding vehicle in the same traveling direction as the subject vehicle but the relative speed between the subject vehicle and an oncoming vehicle. In this case, the execution of deceleration control is prohibited, and erroneous control can be thereby prevented from being carried out.

A drive assistance system is characterized in that: the subject vehicle acceleration/deceleration controlling means prohibits the execution of acceleration control when the relative speed Vr takes a positive value and the absolute value of the relative speed Vr is smaller than a predetermined value.

Even when the preceding vehicle and the subject vehicle draw apart from each other (the relative speed Vr takes a positive value), the following is possible: when the absolute value of the relative speed Vr is smaller than a predetermined value, the driver may be in condition suitable for driving and be performing driving operation so as to follow the preceding vehicle. In this case, therefore, excessive intervention in the driver's driving operation can be prevented by stopping the execution of acceleration control.

A drive assistance system is characterized in that: when the relative speed Vr takes a negative value, the subject vehicle acceleration/deceleration controlling means stops the execution of deceleration control in any of the following cases: cases where the absolute value of the relative speed Vr is smaller than a predetermined value; cases where the driver performs accelerating operation to the extent that a certain value is reached or exceeded to avoid contact with the preceding vehicle; and cases where the driver starts steering system operation to avoid contact with the preceding vehicle.

Even when the preceding vehicle and the subject vehicle draw close to each other (the relative speed Vr takes a negative value), the following is possible: when the absolute value of the relative speed Vr is smaller than a predetermined value, the driver may be in condition suitable for driving and be performing driving operation so as to follow the preceding vehicle. In this case, therefore, excessive intervention in the driver's driving operation can be prevented by stopping the execution of deceleration control.

Even when the preceding vehicle and the subject vehicle draw close to each other (the relative speed Vr takes a negative value), the following is possible: when the driver starts accelerating operation or steering system operation to avoid contact with the preceding vehicle, the driver may start lane change to pass the preceding vehicle. In this case, therefore, such an intervention as to hinder lane change can be avoided by stopping the execution of deceleration control.

A drive assistance system is characterized in that: the subject vehicle acceleration/deceleration controlling means includes a means that, when the execution of deceleration control is stopped, reports at least either of that the deceleration control is stopped and that the driver should start decelerating operation. Thus, the driver can comprehend that deceleration control is stopped or that he/she should start decelerating operation.

A drive assistance system is characterized in that: when the execution of deceleration control is stopped and then the driver's driving operation transitions to driving operation for starting decelerating operation, the subject vehicle acceleration/deceleration controlling means carries out brake preload application control to apply brake preload to the brake actuator of the subject vehicle.

Thus, brake preload can be applied during the period during which the driver changes his/her foot position from accelerator pedal to brake pedal. Therefore, a time lag before decelerating operation is started can be eliminated.

A drive assistance system is characterized in that:
the driver condition coefficient is
indicated by a positive or negative value relative to the value obtained when there is no change in the size of an image of the preceding vehicle,
the driver condition coefficient takes a positive value when the size of an image of the preceding vehicle is changed and increased, and
the driver condition coefficient takes a negative value when the size of an image of the preceding vehicle is changed and decreased,
a collision damage mitigating device that mitigates damage from collision of the subject vehicle is equipped, and
the subject vehicle acceleration/deceleration controlling means carries out control so as to actuate the collision damage mitigating device in the following cases: cases where the execution of deceleration control is stopped and then the driver condition coefficient takes a negative value; cases where the driver's driving operation does not transition to driving operation for starting decelerating operation; and cases where the present driver condition coefficient Kp[dB] takes a positive value equal to or larger than a predetermined value.

As described above, when the preceding vehicle and the subject vehicle draw close to each other (the relative speed Vr takes a negative value), the following takes place: when the execution of deceleration control is stopped and then the driver's driving operation does not transition to driving operation for starting decelerating operation, the preceding vehicle and the subject vehicle further draw close to each other. The possibility of collision between the preceding vehicle and the subject vehicle is increased.

In this case, the following measure is taken: when the present driver condition coefficient Kp[dB] takes a positive value equal to or larger than a predetermined value, it is determined that both the vehicles are rapidly drawing close to each other. Then, control to actuate the collision damage mitigating device is carried out. Thus, damage from collision between the preceding vehicle and the subject vehicle can be mitigated.

A drive assistance system is characterized in that: the subject vehicle acceleration/deceleration controlling means includes a collision alarm means that, when control is carried out so as to actuate the collision damage mitigating device, generates an alarm to the driver. Thus, the driver can be informed that the collision damage mitigating device is actuated.

A drive assistance system is characterized in that: the subject vehicle acceleration/deceleration controlling means places limitations on deceleration and/or acceleration to be generated in the subject vehicle, and places different limitations according to the driving operation of the driver. Thus, deceleration or acceleration to be generated in the subject vehicle can be limited according to the driving operation of the driver.

A drive assistance system is characterized in that:

when the relative speed Vr takes a negative value, the subject vehicle acceleration/deceleration controlling means limits deceleration to be generated in the subject vehicle to a deceleration smaller than the maximum deceleration "a" that can be generated by deceleration control in cases where the driver is performing accelerating operation or cruising operation for maintaining the present speed of the subject vehicle, and limits deceleration to be generated in the subject vehicle to a deceleration smaller than the deceleration "b" of the subject vehicle generated by the decelerating operation of the driver or the deceleration "c" generated by a brake assist system that adds the driver's brake pedal effort in cases where the driver is performing decelerating operation.

Thus, when the relative speed Vr takes a negative value, different limitations can be imposed on deceleration to be generated in the subject vehicle according to the presence or absence of the decelerating operation of the driver.

A drive assistance system is characterized in that:

when the relative speed Vr takes a positive value, the subject vehicle acceleration/deceleration controlling means limits deceleration to be generated in the subject vehicle to a deceleration smaller than the maximum deceleration "a" that can be generated by deceleration control and acceleration to be generated in the subject vehicle to an acceleration smaller than the maximum acceleration "g" that can be generated by acceleration control in cases where the driver is performing accelerating operation or cruising operation for maintaining the present speed of the subject vehicle, and limits deceleration to be generated in the subject vehicle to a deceleration smaller than the deceleration "b" of the subject vehicle generated by the decelerating operation of the driver or the deceleration "c" generated by a brake assist system that adds the driver's brake pedal effort in cases where the driver is performing decelerating operation.

Thus, when the relative speed Vr takes a positive value, different limitations can be imposed on deceleration to be generated in the subject vehicle according to the presence or absence of the decelerating operation of the driver. At the same time, limitations can be imposed on acceleration to be generated in the subject vehicle A drive assistance system is characterized in that the deceleration "c" is set according to the deceleration of the preceding vehicle. Thus, the deceleration c can be set in accordance with the level of the deceleration of the preceding vehicle.

A drive assistance system includes:

a distance condition evaluation index computing means that computes a distance condition evaluation index KdB that is an evaluation index indicating the distance decreasing and the distance increasing between a preceding vehicle existing in the traveling direction of the subject vehicle and the subject vehicle;

a target relative deceleration computing means that computes a target relative deceleration dVrdtssdc between the subject vehicle and the preceding vehicle from the inter-vehicle distance D between the preceding vehicle and the subject vehicle, the relative speed Vr between the preceding vehicle and the subject vehicle, and the distance condition evaluation index KdB; and a controlling means that carries out deceleration control to decelerate the subject vehicle so that the relative deceleration becomes equal to the target relative deceleration dVrdtssdc.

The distance condition evaluation index KdB can be computed by the following expression. The signs (+, −) of the distance condition evaluation index KdB are assigned so that the following measure is implemented: when the relative speed Vr takes a negative value (Vr<0, drawing close to each other), the sign is assigned so that it takes a positive value (KdB>0); when the relative speed Vr takes a positive value (Vr>0, drawing apart from each other), the sign is assigned so that it takes a negative value (KdB<0). ∥ in the expression is a symbol indicating an absolute value.

$$KdB = 10 \times \log\{|-2 \times Vr|/(D^3 \times 5 \times 10^{-8})\} \quad \text{(Expression 9)}$$

The above expression can be transformed into the following expression.

$$10^{(|KdB|/10)} = |-2 \times Vr|/(D^3 \times 5 \times 10^{-8}) \quad \text{(Expression 10)}$$

$$|-Vr| = (D^3 \times 5 \times 10^{-8}/2) \times 10^{(|KdB|/10)} = 2.5 \times D^3 \times 10^{\{(|KdB|/10)-8\}} \quad \text{(Expression 11)}$$

Here, a target relative deceleration dVrdtssdc between the subject vehicle and the preceding vehicle is computed from the inter-vehicle distance D, the relative speed Vr, and the distance condition evaluation index KdB by the following expression.

$$\text{Target relative deceleration } dVrdtssdc = (dVr/dD) \times (dD/dt) = 7.5 \times D^2 \times 10^{\{(|KdB|/10)-8\}} \times Vr \quad \text{(Expression 12)}$$

The target relative deceleration dVrdtssdc shown in Expression 12 represents a target value of relative deceleration for maintaining the present inter-vehicle distance D. Therefore, deceleration control is carried out to decelerate the subject vehicle so that the relative deceleration becomes equal to this target relative deceleration dVrdtssdc. The present distance condition evaluation index KdB can be thereby maintained. (In other words, the present inter-vehicle distance D can be substantially maintained.).

It is preferable that deceleration control should be carried out as follows:

the target relative deceleration computing means multiplies the target relative deceleration dVrdtssdc by a first gain that takes a positive value not more than 1, and the controlling means uses the target relative deceleration dVrdtssdc multiplied by the first gain to carry out deceleration control.

The target relative deceleration dVrdtssdc multiplied by the first gain G1 is expressed by the following expression:

$$dVrdtssdc = G1 \times 7.5 \times D^2 \times 10^{\{(|KdB|/10)-8\}} \times Vr \quad \text{(Expression 13)}$$

The first gain G1 in Expression 13 is set to the value of 1. Deceleration control is thereby carried out so that the relative deceleration becomes equal to the target relative deceleration dVrdtssdc at that time. Thus, the present distance condition evaluation index KdB can be maintained. (In other words, the present inter-vehicle distance D can be substantially maintained.) Meanwhile, the first gain G1 is set to a positive value less than 1. Deceleration control is thereby carried out so that the relative deceleration becomes equal to the target relative deceleration dVrdtssdc at that time. Thus, the inter-vehicle distance can be made shorter than the present inter-vehicle distance D.

Here, consideration will be given to the range of the first gain G1. It will be assumed that the subject vehicle approaching the preceding vehicle at a stop at speed Vs0 (=Vr) starts deceleration at a certain deceleration GG. At this time, the travel distance DD traveled by the subject vehicle before it stops in a position where it is brought into contact with the preceding vehicle is expressed by the following expression.

$$DD = Vr^2/2 \times GG \quad \text{(Expression 14)}$$

Here, the ratio of the deceleration GG to the target relative deceleration dVrdtssdc is determined. The deceleration GG is a deceleration at which the subject vehicle stops in the position where it is brought into contact with the preceding vehicle. The target relative deceleration dVrdtssdc (first gain G1=1) is a target relative deceleration for maintaining the present distance condition evaluation index KdB (in other words, for substantially maintaining the present inter-vehicle distance D).

$$GG/dVrdtssdc = (Vr^2/2 \times DD)/(G1 \times 7.5 \times \quad \text{(Expression 15)}$$
$$D^2 \times 10^{\{(|KdB|/10)-8\}} \times Vr)$$
$$= Vr/(15 \times D^3 \times 10^{\{(|KdB|/10)-8\}})$$

When Expression 11 is substituted for the relative speed Vr in Expression 15, the following expression is obtained.

$$GG/dVrdtssdc = (2.5 \times D^3 \times 10^{\{(|KdB|/10)-8\}})/(15 \times \quad \text{(Expression 16)}$$
$$D^3 \times 10^{\{(|KdB|/10)-8\}})$$
$$= 2.5/15 \approx 0.167$$

Therefore, a target relative deceleration dVrdtssdc at which the relative speed Vr=0 in the position where the subject vehicle is brought into contact with the preceding vehicle can be obtained by setting the first gain G1 to 0.167. The inter-vehicle distance D=0 can be maintained by carrying out deceleration control so that the relative deceleration becomes equal to the target relative deceleration dVrdtssdc. According to the foregoing, the range of the first gain G1 is between 0.167 and 1.000 inclusive.

A drive assistance system includes:
a safe inter-vehicle distance determining means that determines whether or not the value of the inter-vehicle distance D is larger than a safe inter-vehicle distance Dsafe that takes a value corresponding to the speed of the subject vehicle; and
a first gain changing means that changes the value of the first gain according to the result of determination by the safe inter-vehicle distance determining means.

Some examples will be taken. When the inter-vehicle distance D is longer than the safe inter-vehicle distance Dsafe, a safe inter-vehicle distance is ensured. Therefore, the first gain G1 is changed to 0.167. When the inter-vehicle distance D is shorter than the safe inter-vehicle distance Dsafe, a safe inter-vehicle distance is not ensured. Therefore, the first gain G1 is changed to an arbitrary value within the range ranging from 0.167 to 1.000. Thus, a target relative deceleration dVrd-ssdc can be changed according to the result of determination by the safe inter-vehicle distance determining means.

The safe inter-vehicle distance varies depending on the conditions of the road on which the vehicle travels. Therefore, the safe inter-vehicle distance Dsafe may be corrected according to the road conditions. As an example, it will be assumed that the safe inter-vehicle distance Dsafe is defined as the value obtained by multiplying a preset headway by the speed Vs0 of the subject vehicle. (The headway is an index indicating how many seconds later the subject vehicle will be brought into contact with the preceding vehicle when the present distance decreasing between the subject vehicle and the preceding vehicle lasts.) In this case, it is advisable to correct the safe inter-vehicle distance Dsafe by correcting the headway according to the road conditions.

As in the drive assistance system, it is preferable that the target relative deceleration computing means should take into account a target relative speed Vrda between the preceding vehicle and the subject vehicle when computing a target relative deceleration dVrdtssdc. The computational expression for the target relative deceleration dVrdtssdc (first gain G1=1.000) with the target relative speed Vrda taken into account is as follows:

$$dVrdtssdc = 7.5 \times D^2 \times 10^{\{(|KdB|/10)-8\}} \times (Vr - Vrda) \quad \text{(Expression 17)}$$

When the target relative speed Vrda=0, deceleration control is carried out so that the relative deceleration becomes equal to the target relative deceleration dVrdtssdc at that time. The present inter-vehicle distance D can be thereby maintained, as described above.

When the target relative speed Vrda is negative (Vrda<0), the target relative deceleration dVrdtssdc takes a smaller value than in cases where the target relative speed Vrda=0. Therefore, deceleration control is carried out so that the relative deceleration becomes equal to the target relative deceleration dVrdtssdc at that time. The subject vehicle can be thereby decelerated until the present relative speed Vr becomes equal to the target relative speed Vrda.

When the target relative speed Vrda is positive (>0), the target relative deceleration dVrdtssdc takes a larger value than in cases where the target relative speed Vrda=0. Therefore, deceleration control is carried out so that the relative deceleration becomes equal to the target relative deceleration dVrdtssdc at that time. The subject vehicle can be thereby decelerated until the present relative speed Vr becomes equal to the target relative speed Vrda for distance increasing.

It is preferable that deceleration control should be carried out as follows:
the target relative deceleration computing means multiplies the target relative deceleration dVrdtssdc by a second gain that takes a positive value not more than 1, determined from the speed of the preceding vehicle, and
the controlling means uses the target relative deceleration dVrdtssdc multiplied by the second gain to carry out deceleration control.

In cases where the preceding vehicle brakes suddenly, the risk posed to the subject vehicle is increased with increase in the speed of the preceding vehicle. Therefore, the driver of the subject vehicle is likely to generate a larger deceleration in the subject vehicle as the speed of the preceding vehicle becomes larger. Consequently, a target relative deceleration dVrdtssdc multiplied by a second gain G2 as well as the first gain is computed, as described below.

$$dVrdtssdc = G2 \times \{G1 \times 7.5 \times D^2 \times 10^{\{(|KdB|/10)-8\}} \times (Vr - Vrda)\} \quad \text{(Expression 18)}$$

In Expression 18, for example, the G2 is set to 0.5 when the speed Vb of the preceding vehicle is less than 50[km/h]; and G2 is set to 1.0 when the speed Vb of the preceding vehicle is equal to or above 50[km/h]. Thus, the target relative deceleration dVrdtssdc can be matched with the deceleration generated by the driver's own decelerating operation.

A drive assistance system includes:
a deceleration target computing means that computes a deceleration target KdBssdc that is an index indicating execution timing of deceleration control, from the normal deceleration of the subject vehicle, the inter-vehicle distance D, and the relative speed Vr; and a deceleration target determining means that determines whether or not the value of the distance condition evaluation index KdB is larger than the deceleration target KdBssdc, and is characterized in that:

the controlling means starts the execution of deceleration control when it is determined by the deceleration target determining means that the value of the distance condition evaluation index KdB is larger than the deceleration target KdBssdc.

With respect to the deceleration target KdBssdc, the following expression is obtained from Expression 13, letting the normal deceleration of the subject vehicle generated by the driver's decelerating operation be ND:

$$ND = G1 \times 7.5 \times D^2 \times 10^{\{(|KdBssdc|/10)-8\}} \times Vr \quad \text{(Expression 19)}$$

When the above expression is transformed, the following expression is obtained.

$$10^{\{(|KdBssdc|/10)-8\}} = ND/G1 \times 7.5 \times D^2 \times Vr \quad \text{(Expression 20)}$$

When the above expression is repressed by logarithm, the following expression is obtained.

$$|KdBssdc| = \{\log(|ND/(G1 \times 7.5 \times D^2 \times Vr)|) + 8\} \times 10 \quad \text{(Expression 21)}$$

As described above, a deceleration target KdBssdc is computed from the normal deceleration ND generated by the driver's decelerating operation. When the distance condition evaluation index KdB is larger than the deceleration target KdBssdc, the execution of deceleration control is started. Thus, the execution start timing can be matched with the timing of decelerating operation performed when the driver causes normal deceleration ND to be generated. The first G1 in Expression 21 may be changed within the range from 0.167 to 1.000.

It is preferable that the deceleration target computing means should multiply the deceleration target KdBssdc by a third gain that takes a positive value not more than 1, determined from the speed of the preceding vehicle to compute the final deceleration target KdBssdc.

As described above, in cases where the preceding vehicle brakes suddenly, the risk posed to the subject vehicle is increased with increase in the speed of the preceding vehicle. When there is high risk as described above, the driver of the subject vehicle is likely to perform brake operation earlier with increase in the speed of the preceding vehicle. To reflect this propensity of the driver, a deceleration target KdBssdc multiplied by a third gain G3 that takes a positive value not more than 1 is computed, as described below:

$$|KdBssdc| = G3 \times \{\log(|ND/(G1 \times 7.5 \times D^2 \times Vr)|) + 8\} \times 10 \quad \text{(Expression 22)}$$

Multiplication by the third gain G3 smallers the value taken by the deceleration target KdBssdc. As a result, the time that lapses before the distance condition evaluation index KdB reaches the deceleration target KdBssdc is shortened. Therefore, for example, the G3 is set to 1.00 when the speed Vb of the preceding vehicle is 0[km/h], and the value of G3 is made smaller with increase in the speed Vb of the preceding vehicle. (For example, the G3 is set to 0.95 when the speed Vb of the preceding vehicle is 100[km/h].) The final deceleration target KdBssdc is computed by multiplying the third gain G3. Thus, the execution timing of deceleration control can be accelerated, and the driver's propensity can be reflected.

A drive assistance system is characterized in that:

the deceleration target computing means computes a deceleration target KdBssdc-hys that is an index indicating termination timing of deceleration control based on the deceleration target KdBssdc, the deceleration target determining means determines whether or not the value of the distance condition evaluation index KdB is smaller than the deceleration target KdBssdc-hys, and the controlling means terminates the execution of deceleration control when it is determined by the deceleration target determining means that the value of the distance condition evaluation index KdB is smaller than the deceleration target KdBssdc-hys while deceleration control is being carried out.

For example, a deceleration target KdBssdc-hys that takes a value smaller by −3[dB] to −6[dB] or so than the deceleration target KdBssdc is computed. When the distance condition evaluation index KdB becomes smaller than the deceleration target KdBssdc-hys while deceleration control is being carried out, the execution of the deceleration control is terminated. Thus, hunting in deceleration control can be suppressed.

A drive assistance system is characterized in that:

the deceleration target computing means computes a deceleration target KdBengine that is an index indicating execution timing of deceleration control by engine brake and a deceleration target KdBbrake that is an index indicating execution timing of deceleration control by brake actuator from an engine brake normal deceleration that indicates an engine brake-equivalent deceleration and a main brake normal deceleration that indicates a main brake-equivalent deceleration that is a deceleration larger than the engine brake normal deceleration and is generated by a brake actuator, the deceleration target determining means determines whether or not the value of the distance condition evaluation index KdB is larger than the deceleration target KdBengine and the deceleration target KdBbrake, and the controlling means starts the execution of deceleration control when it is determined by the deceleration target determining means that the value of the distance condition evaluation index KdB is larger than at least either of the deceleration target KdBengine and the deceleration target KdBbrake.

Thus, for example, when the distance condition evaluation index KdB is larger than the deceleration target KdBengine, the execution of deceleration control is started. The execution start timing can be thereby matched with the timing of decelerating operation performed when an engine brake normal deceleration NDengine is generated. For example, when the distance condition evaluation index KdB is larger than the deceleration target KdBbrake, the execution of deceleration control is started. The execution start timing can be thereby matched with the timing of decelerating operation performed when a main brake normal deceleration NDbrake is generated.

A drive assistance system includes:

a headway determining means that determines whether or not the present headway TTC computed from the inter-vehicle distance D and the relative speed Vr is smaller than a preset headway TTCon, and is characterized in that:

the controlling means starts the execution of deceleration control when it is determined by the deceleration target determining means that the distance condition evaluation index KdB is larger than the deceleration target KdBssdc and it is determined by the headway determining means that the present headway TTC is smaller than the preset headway TTCon.

For example, when the inter-vehicle distance D is equal to or smaller than 50 m or so, the execution of deceleration control is started when the distance condition evaluation index KdB becomes larger than the deceleration target KdBssdc. The execution start timing of deceleration control can be thereby matched with the timing of brake operation performed by the driver himself/herself. However, when the inter-vehicle distance D is equal to or larger than 50 m or so, the driver of the subject vehicle is lowered in the degree of perception of change in the area of the preceding vehicle, as compared with cases where the inter-vehicle distance D is equal to or smaller than 50 m or so. For this reason, when the execution of deceleration control is started only based on the distance condition evaluation index KdB that is in correspondence with the degree of change in the area of the preceding vehicle, the following takes place: the driver feels as though deceleration began earlier than when the driver himself/herself performs brake operation.

As described above, consequently, the execution of deceleration control is started when: it is determined that the value of the distance condition evaluation index KdB is larger than the deceleration target KdBssdc; and at the same time, it is determined that the value of the present headway TTC is smaller than the preset headway TTCon. Thus, the execution start timing of deceleration control can be matched with the timing of brake operation performed by the driver himself/herself.

According to a fourth aspect, an acceleration distance condition evaluation index KdBaa is set in place of the distance condition evaluation index KdB in Expression 12. Thus, the target relative acceleration dVrdtaa can be computed by the following expression.

$$dVrdtaa = 7.5 \times D^2 \times 10^{\{(|KdBaa|/10)-8\}} \times Vr \quad \text{(Expression 23)}$$

This target relative acceleration dVrdtaa represents a target value of relative acceleration for maintaining the present inter-vehicle distance D (for maintaining the inter-vehicle distance D between the subject vehicle and the preceding vehicle). Therefore, the subject vehicle can run following the preceding vehicle by carrying out acceleration control so that the relative deceleration becomes equal to this target relative deceleration dVrdtssdc.

It is advisable that the target relative acceleration computing means should take into account a target relative speed Vraa between the preceding vehicle and the subject vehicle when computing the target relative acceleration dVrdtaa. The computational expression for the target relative acceleration dVrdtaa with the target relative speed Vraa taken into account is as follows:

$$dVrdtaa = 7.5 \times D^2 \times x 10^{\{(|KdBaa|/10)-8\}} \times (Vr - Vraa) \quad \text{(Expression 24)}$$

When the target relative speed Vraa=0, acceleration control is carried out so that the relative acceleration becomes equal to the target relative acceleration dVrdtaa at that time. Thus, the subject vehicle can run following the preceding vehicle while maintaining the present inter-vehicle distance D.

When the target relative speed Vraa is negative (Vraa<0), the target relative acceleration dVrdtaa takes a larger value than in cases where the target relative speed Vraa=0. Therefore, acceleration control is carried out so that the relative acceleration becomes equal to the target relative deceleration dVrdtaa at that time. The subject vehicle can be thereby accelerated until the present relative speed Vr becomes equal to the target relative speed Vraa for distance decreasing.

When the target relative speed Vraa is positive (Vraa>0), the target relative acceleration dVrdtaa takes a smaller value than in cases where the target relative speed Vraa=0. Therefore, acceleration control is carried out so that the relative acceleration becomes equal to the target relative acceleration dVrdtaa at that time. The subject vehicle can be thereby accelerated until the present relative speed Vr becomes equal to the target relative speed Vraa.

A drive assistance system is characterized in that:
the target relative acceleration computing means multiplies the target relative acceleration dVrdtaa by a fourth gain that takes a positive value not more than 1, and
the controlling means carries out acceleration control, using a target relative acceleration dVrdtaa multiplied by the fourth gain.

The target relative acceleration dVrdtaa multiplied by the fourth gain G4 is expressed by the following expression:

$$dVrdtaa = G4 \times \{7.5 \times D^2 \times 10^{\{(|KdBaa|/10)-8\}} \times (Vr - Vraa)\} \quad \text{(Expression 25)}$$

The fourth gain G4 in Expression 25 is set to the value of 1. Acceleration control is thereby carried out so that the relative acceleration becomes equal to the target relative acceleration dVrdtaa at that time. Thus, the subject vehicle can run following the preceding vehicle while maintaining the present inter-vehicle distance D. Meanwhile, when the fourth gain G4 is set to a positive value less than 1, the target relative acceleration dVrdtaa takes a low value. Therefore, the subject vehicle can be accelerated while increasing the inter-vehicle distance by carrying out acceleration control so that the relative acceleration becomes equal to this target relative acceleration dVrdtaa.

It is preferable that a safe inter-vehicle distance determining means should be equipped which determines whether or not the value of the inter-vehicle distance D is smaller than a safe inter-vehicle distance Dsafe that takes a value corresponding to the speed of the subject vehicle. Thus, it can be comprehended whether a safe inter-vehicle distance D is ensured or not.

It is preferable that a fourth gain changing means should be equipped which, when it is determined by the safe inter-vehicle distance determining means that the value of the inter-vehicle distance D is smaller than the safe inter-vehicle distance Dsafe, changes the value of the fourth gain to 1. Thus, the inter-vehicle distance D can be prevented from becoming shorter than the present inter-vehicle distance D.

It is preferable that, when it is determined by the safe inter-vehicle distance determining means that the value of the inter-vehicle distance D is smaller than the safe inter-vehicle distance Dsafe, the controlling means should prohibit the execution of acceleration control. Thus, the subject vehicle can be prevented from accelerating and further approaching the preceding vehicle. Also, when the target relative acceleration dVrdtaa is set to zero (dVrdtaa=0), the subject vehicle can be prevented from being accelerated.

It is preferable that an override prohibiting means should be equipped. When it is determined by the safe inter-vehicle distance determining means that the value of the inter-vehicle distance D is smaller than a safe inter-vehicle distance Dsafe, the override prohibiting means prohibits the intervention of driving operation for accelerating the subject vehicle. Thus, when a sufficient inter-vehicle distance is not ensured, the subject vehicle can be prevented from being accelerated by the driver's driving operation and further approaching the preceding vehicle.

A drive assistance system includes:
a distance condition evaluation index computing means that computes a distance condition evaluation index KdB that is an evaluation index indicating the distance decreasing and the distance increasing between the preceding vehicle and the subject vehicle;
a deceleration target computing means that computes a deceleration target KdBssdc that is an index indicating execution timing of deceleration control from the normal deceleration of the subject vehicle, the inter-vehicle distance D, and the relative speed Vr; and a deceleration target determining means that determines whether or not the value of the distance condition evaluation index KdB is larger than the deceleration target KdBssdc, and is characterized in that:

the controlling means starts the execution of acceleration control when it is determined by the deceleration target determining means that the value of the distance condition evaluation index KdB is smaller than the deceleration target KdBssdc.

According to a fifth aspect, a deceleration target KdBssdc is computed from the normal deceleration generated by the driver's decelerating operation. When the distance condition evaluation index KdB becomes larger than the deceleration target KdBssdc, the execution of deceleration control is started. Thus, the execution start timing can be matched with the timing of decelerating operation performed when the driver causes the normal deceleration to be generated. When the distance condition evaluation index KdB becomes smaller than the deceleration target KdBssdc, the execution of acceleration control is started. Thus, the subject vehicle can be accelerated with such timing that deceleration control need not be carried out.

The distance condition evaluation index KdB is computed by the following expression, letting the inter-vehicle distance be D and the relative speed be Vr:

$$KdB = 10 \times \log\{|-2 \times Vr|/(D^3 \times 5 \times 10^{-8})\} \quad \text{(Expression 26)}$$

The driver condition coefficient K that indicates the degree of change in the area of a preceding vehicle can be used as an evaluation index for the distance decreasing and the distance increasing between the preceding vehicle and the subject vehicle. Therefore, Expression 26 is obtained by multiplying Expression 5 that represents the driver condition coefficient K by a constant, expressing it by logarithm (decibel [dB]), and further multiplying it by a constant.

BRIEF DESCRIPTION OF DRAWINGS

The above and other objects, features and advantages of the present invention will become more apparent from the following detailed description made with reference to the accompanying drawings. In the drawings:

FIG. 3 is an operation diagram illustrating the sign of the driver condition coefficient K;

FIG. 4 is a table illustrating the correspondence between the driver condition coefficient K and the driving condition of a driver;

FIG. 5 is a block diagram of control models illustrating the respective functions of the driver condition coefficient K computation unit, SDC control unit TTC control unit, CC control unit, target braking force computation unit, and target driving force computation unit of SDC-ECU;

FIG. 28 is an operation diagram illustrating each result of a numerical simulation in Case No. 1;

DETAILED DESCRIPTION OF EMBODIMENTS

First Embodiment

Figure 1:
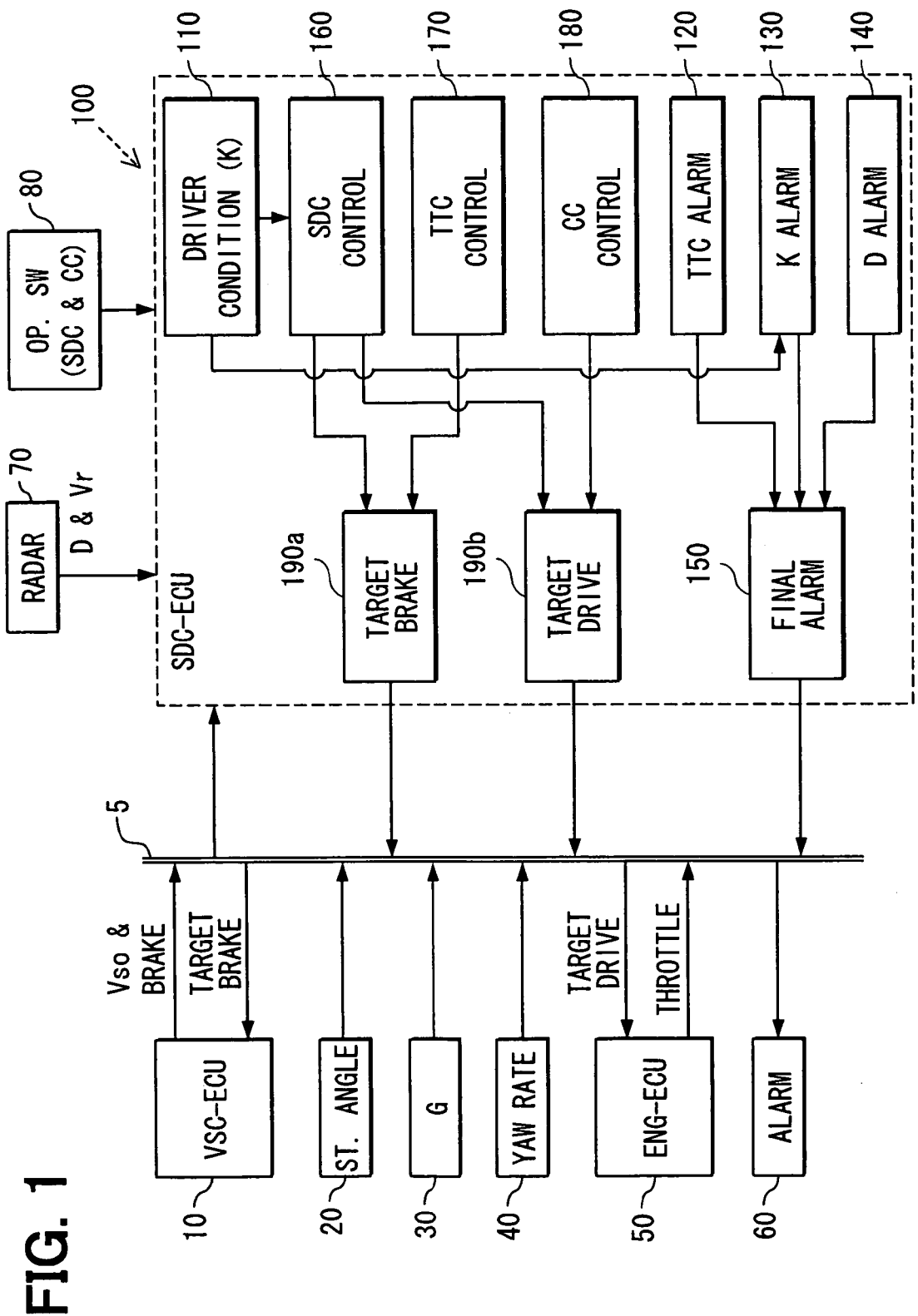
FIG. 1 is a block diagram illustrating a drive assistance system according to a first embodiment of the present invention.

Referring to FIG. 1, a drive assistance system is constructed with a VSC-ECU 10, a steering angle sensor 20, a G sensor 30, a yaw rate sensor 40, ENG-ECU 50, an alarm system 60, a laser radar 70, an operation switch SW 80, and SDC-ECU 100.

The VSC-ECU 10 controls a brake actuator (not shown) that applies braking force to a subject vehicle. It is provided with a function of controlling VSC (vehicle stability control, registered trademark) that suppresses skidding of the subject vehicle. The VSC-ECU 10 receives information on a target braking force from an in-vehicle LAN 5, and controls the brake actuator so that this target braking force is generated. Further, the VSC-ECU 10 transmits information on the vehicle speed $Vs0$ and the braking pressure of the subject vehicle to the in-vehicle LAN 5. The steering angle sensor 20 is a sensor for detecting information on the steering angle of the steering system of the subject vehicle. It transmits information on the detected steering angle to the in-vehicle LAN 5.

The G sensor 30 is an acceleration sensor for detecting acceleration generated in the direction of the length of the subject vehicle (longitudinal acceleration). It transmits information on the detected longitudinal acceleration to the in-vehicle LAN 5. The yaw rate sensor 40 is a sensor that detects the angular velocity (yaw rate) of the subject vehicle around the vertical direction. It transmits information on the detected yaw rate to the in-vehicle LAN 5.

The ENG-ECU 50 receives information on a target driving force from the in-vehicle LAN 5, and controls a throttle actuator, not shown, so that this target driving force is generated. The alarm system 60 is constructed with a monitor, a speaker, and the like. It receives information on an alarm command from the in-vehicle LAN 5, and generates an alarm based on this received alarm command.

The laser radar 70 applies a laser beam to a predetermined area ahead of the subject vehicle, and receives its reflected light and detects the following: the inter-vehicle distance D and relative speed $Vr$ between a preceding vehicle existing ahead of the subject vehicle and the subject vehicle; the amount of deviation between the central axis of the subject vehicle in the left and right direction and the central axis of the preceding vehicle in the left and right direction (the amount of horizontal deviation), and the like. It outputs the result of detection to the SDC-ECU 100. In this embodiment, the sign of relative speed $Vr$ is defined as follows: when the preceding vehicle and the subject vehicle draw close to each other, the relative speed is negative (−) indicating they are getting closer; and when the preceding vehicle and the subject vehicle draw apart from each other, the relative speed is positive (+) indicating they are getting farther.

Figure 2:
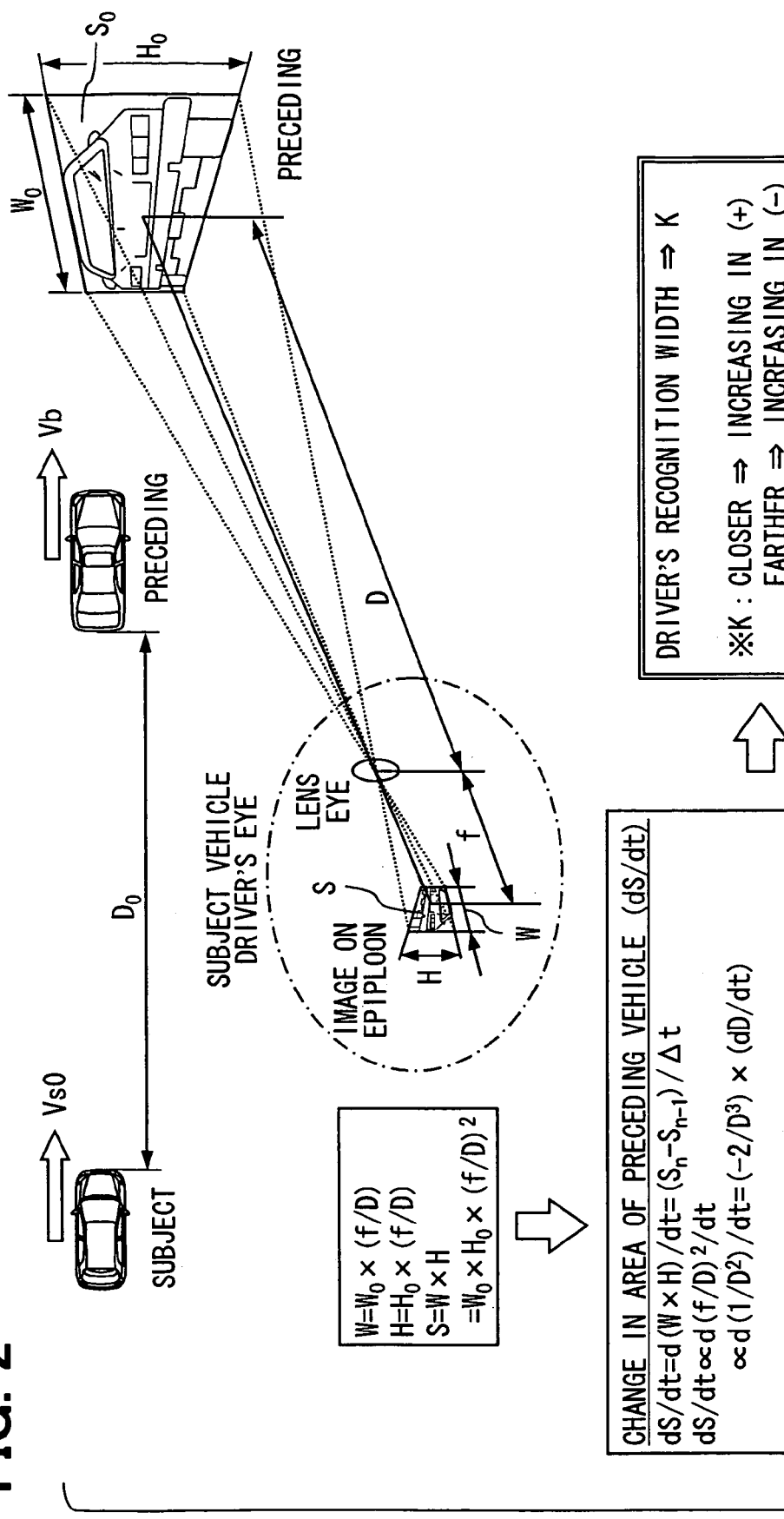
FIG. 2 is a schematic view illustrating the driver condition coefficient K that represents the degree of change dS/dt in the area S of an image of the preceding vehicle as viewed from the driver of the subject vehicle.

Therefore, the relative speed is marked with a sign as illustrated in FIG. 2, for example. When the vehicle speed $Vs0$ of the subject vehicle is larger than the vehicle speed $Vb$ of the preceding vehicle, the preceding vehicle and the subject vehicle draw close to each other. Therefore, the relative speed $Vr$ is marked with the negative (−) sign. When the vehicle speed $Vs0$ of the subject vehicle is smaller than the vehicle speed $Vb$ of the preceding vehicle, the preceding vehicle and the subject vehicle draw apart from each other. Therefore, the relative speed $Vr$ is marked with the positive (+) sign.

The operation SW 80 is a group of switches operated by the driver, and information related to the operation of the group of switches is outputted to the SDC-ECU 100. The SDC-ECU 100 is constructed with the following units and is provided with their functions: a driver condition coefficient computation unit 110, a TTC alarm determination unit 120, a K alarm determination unit 130, a D alarm determination unit 140, a final alarm determination unit 150, an SDC control unit 160, a TTC control unit 170, a CC control unit 180, a target braking force computation unit 190a, and a target driving force computation unit 190b.

The SDC-ECU 100 is basically provided by a microcomputer and is constructed with CPU, ROM, RAM, and I/O any of which is publicly known and a bus that connects them. When the subject vehicle travels following the preceding vehicle, the SDC-ECU 100 basically allows the subject vehicle to be driven by the driving operation of the driver of the subject vehicle. When the driver is lapsing into condition unsuitable for driving, it carries out control for assisting the driver's driving operation so that the subject vehicle travels with a safe inter-vehicle distance maintained relative to the preceding vehicle. This control is referred to as safe inter-vehicle distance maintaining control, Safety Distance Control, or SDC.

When a preceding vehicle exists in the traveling direction of the subject vehicle, the driver condition coefficient computation unit 110 computes the following: the driver condition coefficient K that is equivalent to the degree of change in the size of an image of the preceding vehicle as viewed from the driver of the subject vehicle. Here, description will be given to the reason why the driving condition of a driver can be detected from the driver condition coefficient K.

For example, when the subject vehicle approaches the preceding vehicle, the driver of the subject vehicle performs the following operation: in cases where the driver can perceive the presence of the preceding vehicle, he/she starts brake operation with braking start timing intrinsic to the driver; and he/she approaches closely to the preceding vehicle while decelerating the subject vehicle. In cases where the driver of the subject vehicle is in such driving condition as drowsy driving, driving without keeping his/her eyes on the road ahead, and inattentive driving, it is difficult to perceive the presence of the preceding vehicle. Therefore, even when the braking start time intrinsic to the driver comes, he/she does not start brake operation and approaches the preceding vehicle without decelerating his/her vehicle.

In scenes in which the subject vehicle approaches a preceding vehicle, the driver of the subject vehicle usually perceives the approach to the preceding vehicle by change in the size (area) of an image of the preceding vehicle. The approach is equivalent to change in the inter-vehicle distance between the subject vehicle and the preceding vehicle. When the driver of the subject vehicle perceives the presence of the preceding vehicle, he/she approaches the preceding vehicle while decelerating his/her vehicle, as described above. Therefore, the condition coefficient K, which is equivalent to the degree of change in the size of an image of the preceding vehicle as viewed from the approaching driver, takes a low value. When it is difficult for the driver of the subject vehicle to perceive the presence of the preceding vehicle, he/she approaches the preceding vehicle without decelerating his/her vehicle. Therefore, the driver condition coefficient K obtained during this approach takes a high value. With respect to the preceding vehicle, consequently, the driving condition of the driver can be detected from the driver condition coefficient K.

Even when the driver perceives the presence of a preceding vehicle, the above determination process or action process may not be appropriately carried out. That is, determination of braking start timing may be inappropriate or brake operation may be inappropriate. As a result, the driver condition coefficient K may take a high value. Therefore, the driving condition of the driver can be comprehensively detected based on the driver condition coefficient K in the determination process and the operation process as well as in the perception process.

This driver condition coefficient computation unit 110 computes the driver condition coefficient K based on information on the inter-vehicle distance outputted from the laser radar 70. That is, letting the inter-vehicle distance be D and change in inter-vehicle distance per unit time be dD/dt, K for the driver condition coefficient is computed by the following expression:

$$K = (-2/D^3) \times (dD/dt) \quad \text{(Expression 27)}$$

Here description will be given to the reason why the driver condition coefficient K can be computed by the above expression. As illustrated in FIG. 2, letting the actual height of a preceding vehicle be Ho, its actual width be Wo, its actual area be So (=Wo×Ho), the height of the image of the preceding vehicle that meets the eyes (retinas) of the driver of the subject vehicle be H, its width be W, its area be S (=W×H), the distance between the driver's eye (lens of eye) and the preceding vehicle be D, and the focal distance of the driver's eyes be f, the area S of the image of the preceding vehicle is expressed by the expression below. It is assumed that the distance D is equal to the inter-vehicle distance Do between the preceding vehicle and the subject vehicle for the sake of simplicity.

$$S = W \times H = Wo \times Ho \times (f/D)^2 \quad \text{(Expression 28)}$$

Here, the degree of change dS/dt per unit time in the area S of the image of the preceding vehicle is expressed by the expression below. The symbol "∝" in the following expression refers to the proportionality relation.

$$dS/dt = d(W \times H)/dt \propto (f/D)^2/dt \propto d(1/D^2)/dt \quad \text{(Expression 29)}$$

When the above expression is partially differentiated with the distance D, the following expression is obtained:

$$dS/dt \propto d(1/D^2)/dt = (-2/D^3) \times (dD/dt) \quad \text{(Expression 30)}$$

Therefore, the driver condition coefficient K that represents the degree of change dS/dt in the area S of the image of the preceding vehicle can be computed from the inter-vehicle distance D between the preceding vehicle and the subject vehicle and change dD/dt in inter-vehicle distance per unit time.

The change dD/dt in inter-vehicle distance D per unit time is equal to the relative speed Vr between the preceding vehicle and the subject vehicle. Therefore, the driver condition coefficient K may be computed from the inter-vehicle distance D and relative speed Vr outputted from the laser radar 70 by the following expression:

$$K = (-2/D^3) \times Vr \quad \text{(Expression 31)}$$

The driver condition coefficient K represents the degree of change dS/dt per unit time in the area S of an image of a preceding vehicle. Accordingly, it is equal to the degree of change per unit time in the size of the image of the preceding vehicle picked up by an image pickup device, such as a camera. Therefore, such an image pickup device as a camera may be provided, and the driver condition coefficient K may be computed from the degree of change per unit time in the size of an image of the preceding vehicle picked up by it.

The driving condition of the driver corresponding to the magnitude of the absolute value of the driver condition coefficient, computed by the driver condition coefficient computation unit 110, may be reported to the driver through the alarm system 60.

As an example, it will be assumed that the subject vehicle travels following a preceding vehicle. When the driver is in condition suitable for driving, he/she can perform driving operation so that a certain inter-vehicle distance is maintained between the preceding vehicle and the subject vehicle. For this reason, the driver condition coefficient K in the situation in which the inter-vehicle distance is maintained varies within the range of Sta1 or Sta2, as illustrated in FIG. 3. The driving condition of the driver in Sta1 or Sta2 represents appropriate or normal driving condition, as illustrated in FIG. 4.

When the driver is in condition unsuitable for driving, he/she cannot perform driving operation so that a certain inter-vehicle distance is maintained between the preceding vehicle and the subject vehicle. For this reason, the driver condition coefficient K in the situation in which the inter-vehicle distance is not maintained varies within the range of sta3 or larger, as illustrated in FIG. 3. The driving condition of the driver in Sta3 to Sta5 represents inappropriate, very inappropriate, or terribly inappropriate driving condition, as illustrated in FIG. 4.

Therefore, the driving condition of the driver can be reported according to the magnitude of the absolute value of the driver condition coefficient K in accordance with the table in FIG. 4. The driving condition is classified into five levels, for example, appropriate, normal, inappropriate, very inappropriate, and terribly inappropriate.

The TTC alarm determination unit 120 computes a time to collision (TTC=D/Vs0) that indicates a time allowed before the subject vehicle possibly collides with the preceding vehicle from the vehicle speed Vs0 of the subject vehicle and the inter-vehicle distance D. When this time to collision TTC is smaller than a predetermined time $TTC_{TH}$ ($TTC<TTC_{TH}$), it outputs a command to generate an alarm to the final alarm determination unit 150. Thus, an alarm can be generated based on the time to possible collision.

The D alarm determination unit 140 computes a target inter-vehicle distance between the preceding vehicle and the subject vehicle corresponding to the vehicle speed Vs0 of the subject vehicle based on the inter-vehicle distance obtained when the driver operates the operation SW 80. When the inter-vehicle distance D becomes smaller than the target inter-vehicle distance, it outputs a command to generate an alarm to the final alarm determination unit 150. Thus, an alarm can be generated based on the inter-vehicle distance between the preceding vehicle and the subject vehicle.

The K alarm determination unit 130 determines whether to generate an alarm to the driver of the subject vehicle based on the magnitude (of the absolute value) of the driver condition coefficient K. It will be assumed that the subject vehicle travels following the preceding vehicle. As illustrated in FIG. 3 and FIG. 4, when the driver is in condition suitable for driving, the driver condition coefficient K varies within the range of Sta1 or Sta2. When the driver is in condition unsuitable for driving, the driver condition coefficient K varies within the range of Sta3 or larger. Therefore, an alarm to the driver can be generated based on the magnitude (of the absolute value) of the driver condition coefficient K, and the driver, when in condition unsuitable for driving, can be thereby alerted.

More specifically, the K alarm determination unit 130 compares a value taken by the driver condition coefficient K with a threshold value of the driver condition coefficient to determine whether to generate an alarm. When it is determined as the result of this operation that an alarm should be generated, it outputs a command to generate an alarm. Thus, whether to generate an alarm can be determined based on the threshold value of the driver condition coefficient K.

The K alarm determination unit 130 may be so constructed that, when the driver condition coefficient K takes a positive value, an alarm is generated. More specifically, the sign of the relative speed Vr is defined as follows: when the preceding vehicle and the subject vehicle draw close to each other, the relative speed is negative (−); when the preceding vehicle and the subject vehicle draw apart from each other, the relative speed is positive (+). In this case, the driver condition coefficient is defined as $K=(-2/D^3) \times Vr$. Therefore, when the preceding vehicle and the subject vehicle draw close to each other, the size of an image of the preceding vehicle is changed and increased. At this time, the driver condition coefficient K takes a positive value. When the preceding vehicle and the subject vehicle draw apart from each other, the size of an image of the preceding vehicle is changed and reduced. At this time, the driver condition coefficient K takes a negative value. FIG. 3 illustrates the situation in which the following takes place: when the preceding vehicle and the subject vehicle draw close to each other, the driver condition coefficient K takes a positive value; when the preceding vehicle and the subject vehicle draw apart from each other, the driver condition coefficient K takes a negative value.

When the driver condition coefficient K takes a positive value, as described above, the situation in which the preceding vehicle and the subject vehicle draw close to each other continues. Therefore, the risk posed to the subject vehicle is larger than when the driver condition coefficient K takes a negative value, that is, when the situation in which the preceding vehicle and the subject vehicle draw apart from each other continues. Consequently, when the driver condition coefficient K takes a positive value, an alarm is generated to the driver based on the magnitude of the value of driver condition coefficient. Thus, an alarm can be generated only in the situation in which the preceding vehicle and the subject vehicle are drawing close to each other.

It is preferable that the threshold value of the driver condition coefficient can be changed to an arbitrary value in the K alarm determination unit 130. Thus, the driver of the subject vehicle can change the threshold value of driver condition for determining whether to generate an alarm to a desired threshold value.

Figure 9:
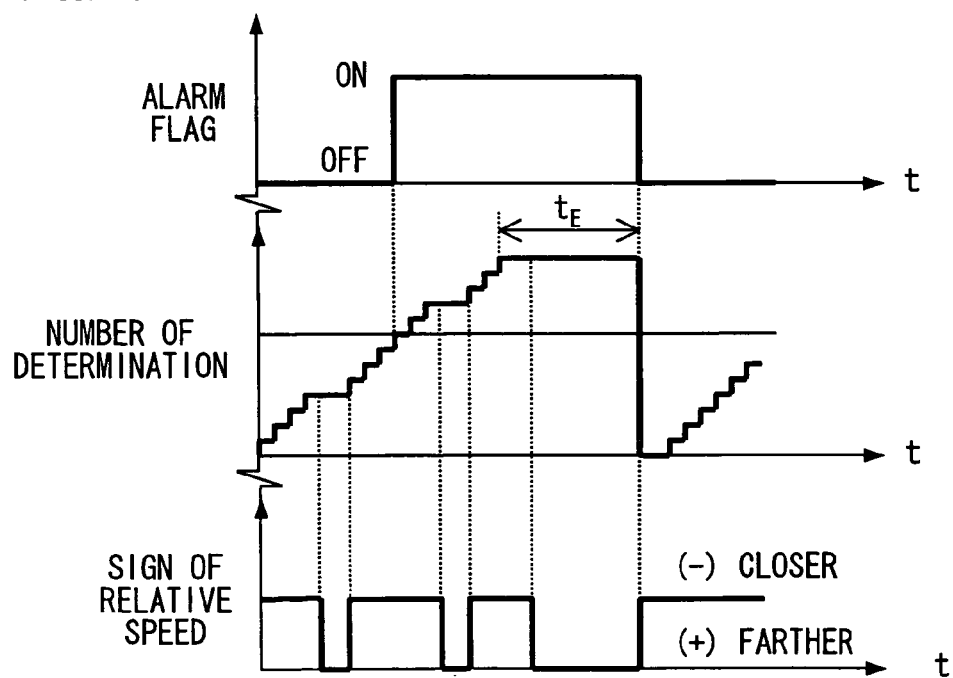
FIG. 9 is an operation diagram illustrating a condition to turn on an alarm generation flag and a condition to turn it off.

The K alarm determination unit 130 repeatedly determines whether to generate an alarm in a predetermined cycle. As illustrated in FIG. 9, when the number of times when it determines that an alarm should be generated becomes a certain value or above, it finally determines that an alarm should be generated. Or, when the time when it determines that an alarm should be generated lasts for a certain time or longer, it finally determines that an alarm should be generated. Thus, fluctuation in alarm generation can be suppressed.

When the K alarm determination unit 130 determines that an alarm should be generated and generation of an alarm is started, and then the time when it determines that an alarm should not be generated lasts for a certain time $t_E$ or longer, as illustrated in FIG. 9, it finally determines to cease generating an alarm. Thus, alarm generation can be ceased. That generation of an alarm should be ceased may be finally determined when the relative speed Vr changes from negative to positive.

As described above, the relative speed Vr between the preceding vehicle and the subject vehicle is indicated as follows: when the preceding vehicle and the subject vehicle draw close to each other, it is marked with the negative (−) sign; when the preceding vehicle and the subject vehicle draw apart from each other, it is marked with the positive (+) sign. When the relative speed Vr changes from negative to positive, the situation in which the preceding vehicle and the subject vehicle draw close to each other transitions to the situation in which they draw apart from each other. As the result of this change of situation, the risk posed to the subject vehicle is reduced. Therefore, when the risk posed to the subject vehicle is reduced, it can be finally determined that generation of an alarm should be ceased.

The final alarm determination unit 150 determines the type, contents, and the like of an alarm to be generated by the alarm system 60 based on the following: the results of determinations by the TTC alarm determination unit 120, K alarm determination unit 130, and D alarm determination unit 140. Then, the final alarm determination unit 150 transmits an alarm command to the in-vehicle LAN 5. The final alarm determination unit 150 may be so constructed that the following is implemented: when it is determined by the K alarm determination unit 130 that an alarm should be generated, it gives a body sensory alarm (alarming brake) to the driver of the subject vehicle. For example, a target braking force corresponding to alarming brake is transmitted to the VSC-ECU 10, and the VSC-ECU 10 controls the brake actuator so that the target braking force is applied to the subject vehicle. Thus, a body sensory alarm (alarming brake) can be given to the driver of the subject vehicle.

When the subject vehicle travels following the preceding vehicle, the SDC control unit 160 operates as follows: it carries out acceleration control to accelerate the subject vehicle and deceleration control to decelerate the subject vehicle based on the magnitude of the value of the driver condition coefficient K. More specifically, it will be assumed that the subject vehicle travels following the preceding vehicle. When the driver is in condition suitable for driving, he/she can perform driving operation so as to maintain a certain inter-vehicle distance between the preceding vehicle and the subject vehicle, as described above. Therefore, in this situation in which the inter-vehicle distance is maintained, the driver condition coefficient K varies within the range of Sta1 or Sta2, as illustrated in FIG. 3.

When the driver is in condition unsuitable for driving, he/she cannot perform driving operation so as to maintain a certain inter-vehicle distance between the preceding vehicle and the subject vehicle. Therefore, in this situation in which the inter-vehicle distance is not maintained, the driver condition coefficient K varies within the range of Sta3 or larger, as illustrated in FIG. 3.

For the purpose of assisting the driving operation of a driver who is lapsing or falling into condition unstable for driving, this drive assistance system accelerates or decelerates the subject vehicle based on the magnitude of the value of the driver condition coefficient K. Thus, driving operation can be assisted when the subject vehicle travels following the preceding vehicle.

The SDC control unit 160 carries out deceleration control when the driver condition coefficient K takes a positive value and acceleration control when the driver condition coefficient K takes a negative value. Thus, when the preceding vehicle and the subject vehicle draw close to each other, deceleration control is carried out. Therefore, the subject vehicle can be deterred from approaching the preceding vehicle. When the preceding vehicle and the subject vehicle draw apart from each other, acceleration control is carried out. Therefore, the subject vehicle can be deterred from receding from the preceding vehicle.

Figure 6:
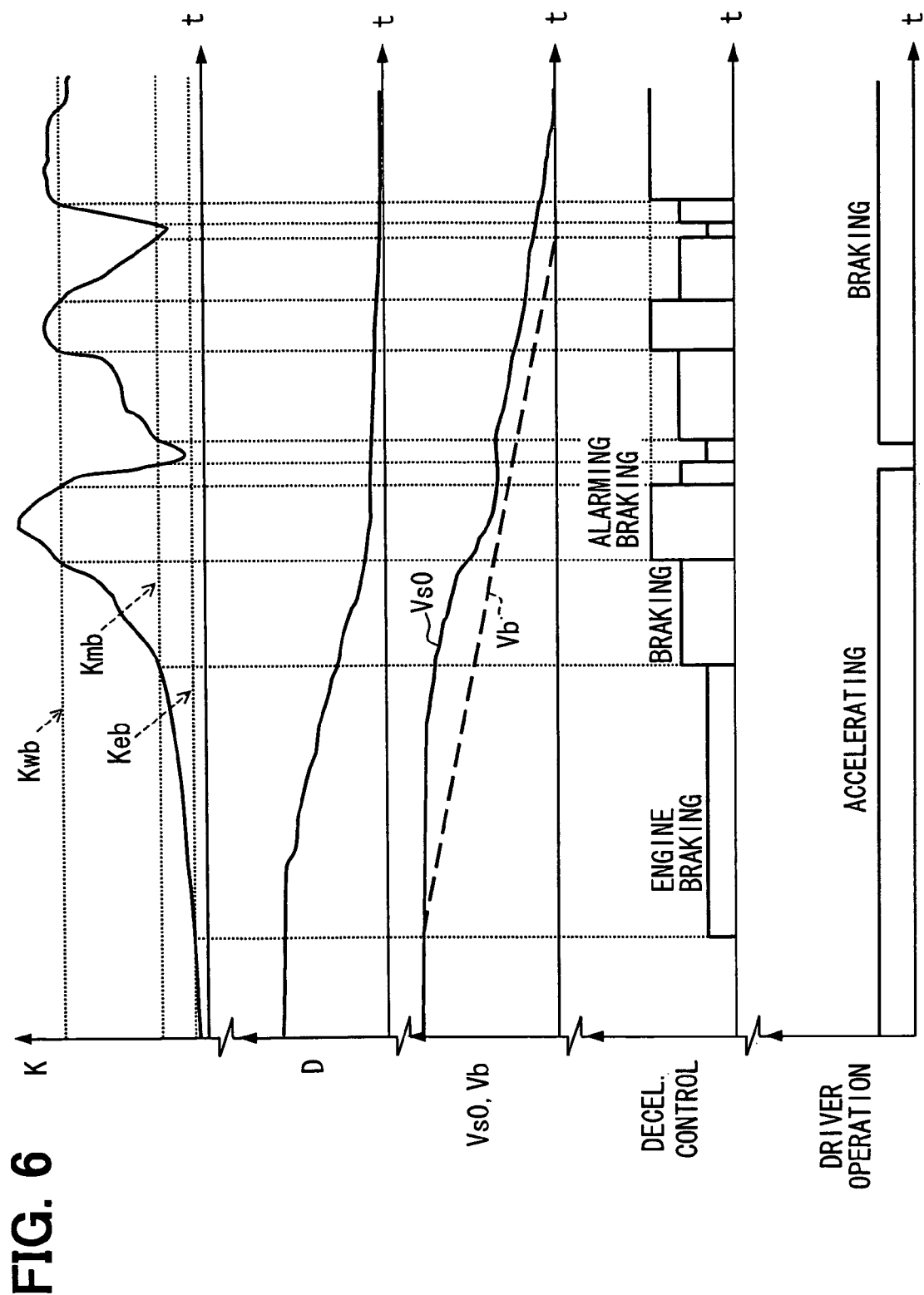
FIG. 6 is an operation diagram of the following obtained when the preceding vehicle and the subject vehicle draw close to each other: the driver condition coefficient K, inter-vehicle distance D, the vehicle speed Vs0 of the subject vehicle, the vehicle speed Vb of the preceding vehicle, deceleration control by the SDC control unit, and the driving operation of the driver.

FIG. 6 is an operation diagram illustrating the following obtained when the preceding vehicle and the subject vehicle draw close to each other: the driver condition coefficient K, the inter-vehicle distance D, the vehicle speed Vs0 of the subject vehicle, the vehicle speed Vb of the preceding vehicle, deceleration control carried out by the SDC control unit 160, and the driving operation of the driver. The SDC control unit 160 sets an engine brake threshold value Keb, a brake threshold value Kmb, and a alarming brake threshold value Kwb for the driver condition coefficient K. Further, it sets the deceleration to be generated in the subject vehicle to a larger value with increase in these threshold values.

Figure 8A:
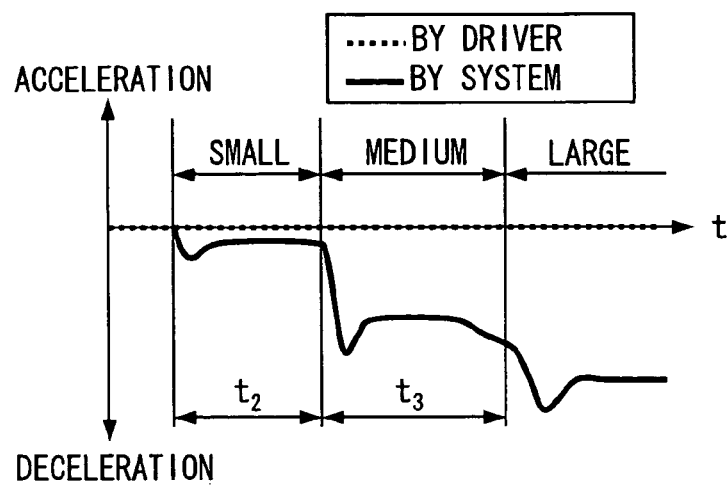
FIG. 8A is an operation diagram illustrating cases where deceleration generated in the subject vehicle is increased stepwise in the situation in which the driver's brake operation is not performed and the preceding vehicle and the subject vehicle draw close to each other.

FIG. 8A illustrates deceleration generated in the subject vehicle in the situation in which the driver's brake operation is not performed and the preceding vehicle and the subject vehicle draw close to each other. In the situation in which the driver's brake operation is not performed and the preceding vehicle and the subject vehicle draw close to each other, as described above, the driver condition coefficient K gradually takes a larger value. For this reason, deceleration generated in the subject vehicle can be increased stepwise by setting the deceleration to be generated in the subject vehicle to a larger value with increase in the above threshold values. Thus, in deceleration control, the subject vehicle can be decelerated at a deceleration corresponding to the value of the driver condition coefficient K. As illustrated in FIG. 8A, the deceleration generated in the subject vehicle may be increased stepwise after a certain time $t_2$, $t_3$ elapses.

Figure 8B:
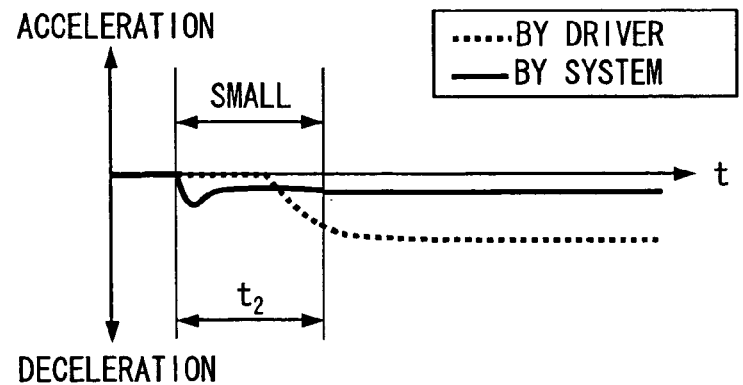
FIG. 8B is an operation diagram illustrating cases where, after a certain time lapses, that deceleration is continuously generated without increasing stepwise the deceleration generated in the subject vehicle.

In cases where the driver condition coefficient K reaches some threshold value and the driver's brake operation intervenes while the subject vehicle is decelerated at a deceleration set in correspondence with that threshold value, the following measure may be taken: even after a certain time $t_2$ elapses, that deceleration may be continuously generated without increasing stepwise the deceleration generated in the subject vehicle, as illustrated in FIG. 8B.

Even when acceleration operation or brake operation by the driver of the subject vehicle intervenes while acceleration control or deceleration control is being carried out, the SDC control unit 160 carries out the acceleration control or deceleration control without interruption. Thus, the following operation can be implemented: when the subject vehicle travels following the preceding vehicle, the subject vehicle is basically driven by the driving operation of the driver of the subject vehicle; when the driver is lapsing into condition unsuitable for driving, the driving operation of the driver is assisted.

Figure 7A:
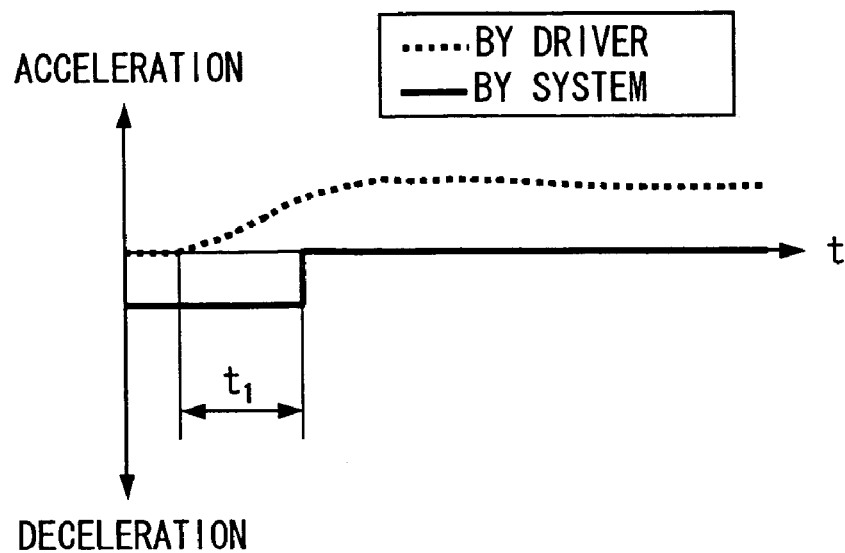
FIG. 7A is an operation diagram illustrating cases where the execution of deceleration control is ceased when a certain time has lapsed after start of acceleration operation.

More specifically, when acceleration operation is performed to accelerate the subject vehicle while deceleration control is being carried out, as illustrated in FIG. 7A, the following measure is taken: when a certain time $t_1$ has elapsed after start of this acceleration operation, the execution of deceleration control is ceased. Thus, deceleration control can be prevented from being continuously carried out in the following case: in situations in which the subject vehicle passes by the preceding vehicle, for example, the driver performs acceleration operation to accelerate the subject vehicle to smoothly pass by the preceding vehicle.

Figure 7B:
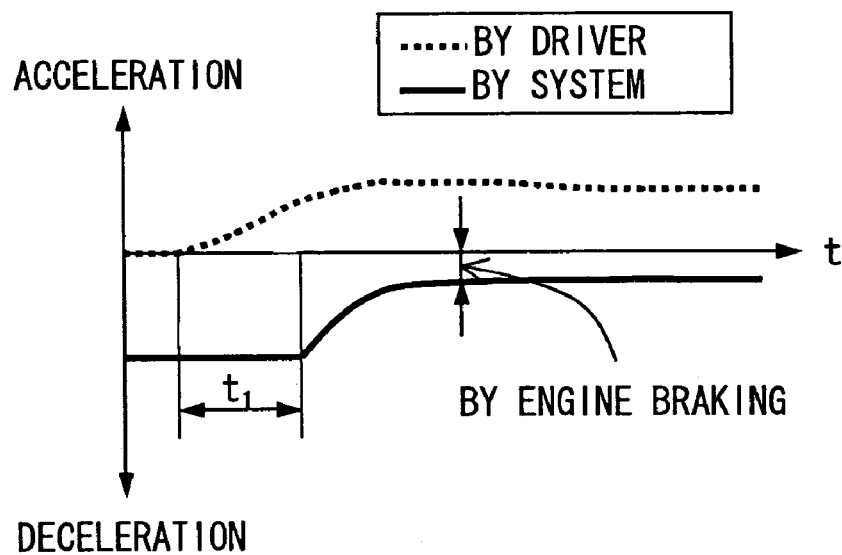
FIG. 7B is an operation diagram illustrating cases where only deceleration control by engine brake is carried out when a certain time has lapsed after start of acceleration operation.

In cases where at least either of deceleration control by main brake (control of brake actuator) and deceleration control by engine brake is carried out as deceleration control, the measure illustrated in FIG. 7B may be taken. That is, in cases where acceleration operation is performed to accelerate the subject vehicle while deceleration control is being carried out, only deceleration control by engine brake is carried out when a certain time $t_1$ has elapsed after start of this acceleration operation. Thus, when the driver performs acceleration operation to accelerate the subject vehicle even though the preceding vehicle and the subject vehicle draw close to each other, deceleration control by main brake can be prevented from being continuously carried out.

The TTC control unit 170 carries out control so as to decelerate the subject vehicle when a time to collision TTC that indicates a time allowed before the subject vehicle possibly collides with the preceding vehicle becomes smaller than a predetermined time $TTC_{TH}$ (TTC<$TTC_{TH}$). Thus, the subject vehicle can be decelerated based on the time to collision TTC.

In cases where there is no preceding vehicle in the traveling direction of the subject vehicle, the CC control unit 180 controls the vehicle speed of the subject vehicle to a certain vehicle speed. That is, when the inter-vehicle distance between the subject vehicle and the preceding vehicle exceeds an inter-vehicle distance within which the laser radar 70 can carry out detection, the CC control unit performs the above operation. Thus, in cases where the subject vehicle solely runs, assistance can be provided to keep the vehicle speed of the subject vehicle at a certain vehicle speed.

The target braking force computation unit 190a and the target driving force computation unit 190b respectively compute a target braking force and a target driving force to be generated in the subject vehicle based on the following: the acceleration/deceleration SDC($\alpha$) to be generated in the subject vehicle from the SDC control unit 160; the deceleration TTC($\alpha$) to be generated in the subject vehicle from the TTC control unit 170; and the acceleration/deceleration CC($\alpha$) to be generated in the subject vehicle from the CC control unit 180. Then, the target braking force computation unit and the target driving force computation unit transmit the target braking force and the target driving force to the in-vehicle LAN 5.

FIG. 5 illustrates the respective functions of the driver condition coefficient computation unit 110, SDC control unit 160, TTC control unit 170, CC control unit 180, target braking force computation unit 190a, and target driving force computation unit 190b of the SDC-ECU 100 in the form of control model. As illustrated, the acceleration/deceleration SDC($\alpha$), TTC($\alpha$), and CC($\alpha$) of the SDC control unit 160, TTC control unit 170, and CC control unit 180 are inputted to a vehicle dynamics model. Then, a target braking force or a target driving force to be generated in the subject vehicle is computed. When this target braking force or target driving force is inputted to the vehicle dynamics model, acceleration/deceleration ($\alpha$) that indicates the behavior of the subject vehicle is outputted.

Figure 10:
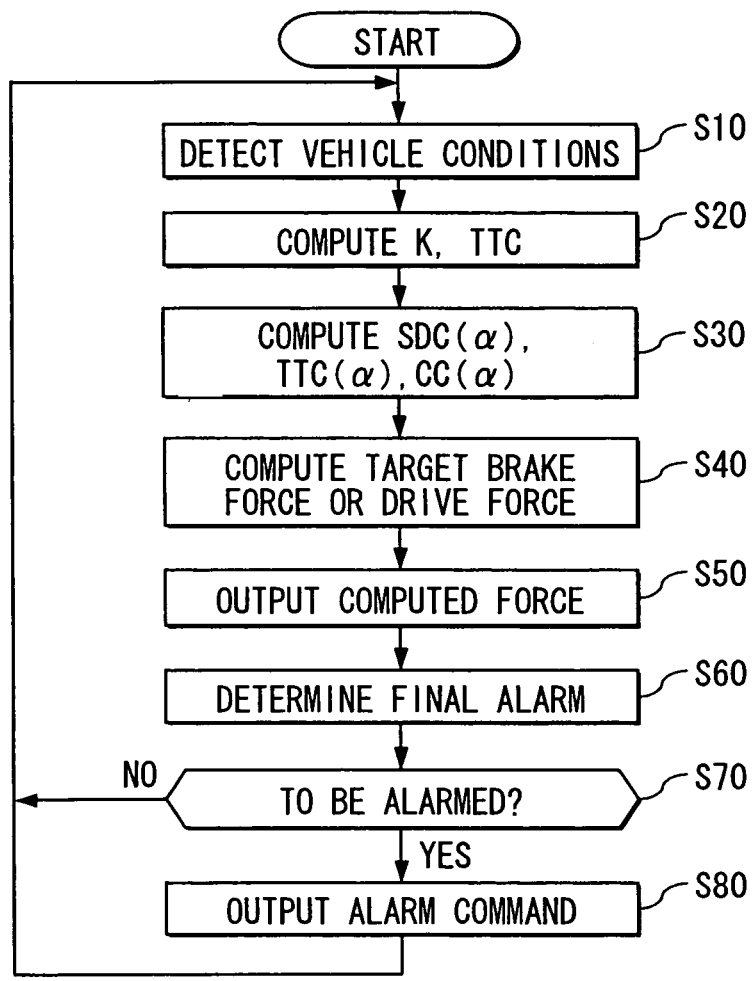
FIG. 10 is a flowchart illustrating the operation of a drive assistance system in the first embodiment.

The operation of this drive assistance system, particularly of the SDC-ECU 100, according to the first embodiment will be described with reference to the flowchart in FIG. 10, which the SDC-ECU 100 is programmed to perform. At step (hereafter, abbreviated as S) 10, the condition quantities of the vehicle, such as the inter-vehicle distance D, the vehicle speed Vs0 of the subject vehicle, the relative speed Vr, and the like, are detected. At S20, a driver condition coefficient K and a time to collision TTC are computed. At S30, SDC($\alpha$), TTC ($\alpha$) and CC($\alpha$) are computed.

At S40, the target braking force or target driving force to be generated in the subject vehicle is computed based on the SDC($\alpha$), TTC($\alpha$) and CC($\alpha$) computed at S30. At S50, the computed target braking force or target driving force is outputted to the in-vehicle LAN 5. At S60, the type, contents, and the like of an alarm to be generated by the alarm system 60 are determined based on the following: the results of determinations by the TTC alarm determination unit 120, K alarm determination unit 130, and D alarm determination unit 140. At S70, it is determined whether it was determined or not at S60 that an alarm should be generated. When an affirmative determination is made here, an alarm command is outputted to the in-vehicle LAN 5 at S80. When a negative determination is made here, the operation proceeds to S10, and the above processing is repeatedly performed.

As described above, the drive assistance system in this embodiment operates as follows. When there is a preceding vehicle in the traveling direction of the subject vehicle, a driver condition coefficient K that indicates the degree of change in the size of an image of the preceding vehicle as viewed from the driver is computed, and the driving condition of the driver is detected from this driver condition coefficient K. According to the magnitude of the value taken by the driver condition coefficient K, an alarm is generated to the driver or the driving operation of the driver is assisted.

(First Modification)

In the first embodiment, the K alarm determination unit 130 of the SDC-ECU 100 may generate an alarm when the driver condition coefficient K takes a positive value. Further, an alarm may also be generated when the driver condition coefficient K takes a negative value.

When the driver condition coefficient K takes a positive value, the situation in which the preceding vehicle and the subject vehicle draw close to each other continues, as described above. Therefore, the risk posed to the subject vehicle is larger than when the driver condition coefficient K takes a negative value, that is, the situation in which the preceding vehicle and the subject vehicle draw apart from each other continues. However, there are also possible cases where the situation in which the preceding vehicle and the subject vehicle draw apart from each other is not by the driver's intentional driving operation. That is, the above situation may be caused by that the driver of the subject vehicle has lapsed into driving condition unsuitable for driving. Therefore, when the driver condition coefficient K takes a negative value, an alarm is generated, and thus an alarm can be generated in the situation in which the preceding vehicle and the subject vehicle draw apart from each other.

With respect to the alarm that is generated when the driver condition coefficient takes a negative value, the following construction may be adopted: an alarm is generated by applying driving force to the subject vehicle to accelerate the subject vehicle. Thus, a body sensory alarm can be given to the driver of the subject vehicle, so that the driver may sense or feel it by his/her body.

(Second Modification)

The SDC control unit 160 of the SDC-ECU 100 in the first embodiment carries out acceleration control or deceleration control with attention focused on the presence of a preceding vehicle. In cases where there is an oncoming vehicle on the lane adjacent to the lane on which the subject vehicle is traveling, the execution of acceleration control and deceleration control may be ceased. Thus, even when the laser radar 70 erroneously detects an oncoming vehicle as the preceding vehicle, for example, acceleration control and deceleration control can be prevented from being carried out.

(Third Modification)

The SDC control unit 160 of the SDC-ECU 100 in the first embodiment may be so modified that the following is implemented: even when acceleration operation or brake operation by the driver of the subject vehicle intervenes while acceleration control or deceleration control is being carried out, it carries out the acceleration control or deceleration control without interruption. However, when the steering system is operated by the driver of the subject vehicle, the execution of deceleration control may be ceased. This prevents the behavior of the vehicle from becoming unstable because the driver operates the steering system during deceleration.

Second Embodiment

The second embodiment is similar to the first embodiment. The drive assistance system in the first embodiment generates an alarm to the driver according to the magnitude of the value taken by the driver condition coefficient K.

Meanwhile, the drive assistance system in the second embodiment is so constructed that it performs the following operation: it detects any object existing ahead of the subject vehicle; when this detected object exists in the predetermined alarm coverage of the subject vehicle, it generates an alarm to the driver. It changes the width of the alarm coverage according to the magnitude of the absolute value of the driver condition coefficient K.

Figure 11:
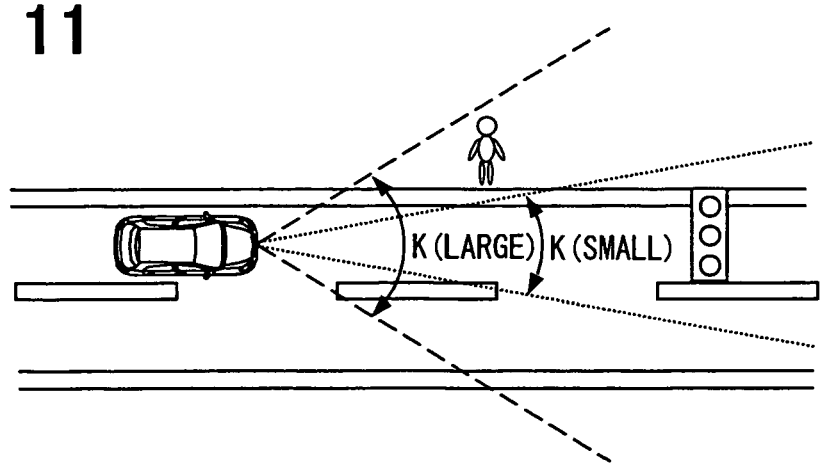
FIG. 11 is a schematic diagram showing a case where the width of alarm coverage is varied according to the magnitude of the absolute value of driver condition coefficient K according to a second embodiment of the present invention.

A very wakeful driver (in condition suitable for driving) has a broad field of view; therefore, he/she can extensively perceive an object existing ahead of the subject vehicle. Meanwhile, a less wakeful driver (in condition unsuitable for driving) has a narrow field of view; therefore, he/she cannot perceive an object positioned in peripheral vision off the center of his/her field of view (central vision). Consequently, the width of the alarm coverage is changed according to the magnitude of the absolute value of the driver condition coefficient K, as illustrated in FIG. 11. When an object exists in this changed alarm coverage, an alarm is generated. Thus, an alert can be given to the driver in condition unsuitable for driving about the presence of an object that could be perceived if he/she is in condition suitable for driving.

It is advisable that this change in the width of the alarm coverage is carried out as follows: the larger the absolute value of the driver condition coefficient K is, it is changed so that its width in the left and right direction ahead of the subject vehicle becomes larger; the smaller the absolute value of the driver condition coefficient K is, it is changed so that its width in the left and right direction ahead of the subject vehicle becomes smaller. Thus, an alert can be given to, for example, a driver whose wakefulness is lowered and thus whose field of view is narrowed about the presence of an object that he/she cannot perceive. Also, it is possible to avoid giving an alert to a driver in condition suitable for driving about the presence of an object he/she can perceive.

As a means for detecting an object existing ahead of the subject vehicle, such an image pickup means as a camera can be adopted. It is advisable to subject an image of the scene ahead of the subject vehicle, picked up by this image pickup means, to predetermined image processing, and detect at least one object of light vehicle, pedestrian, road traffic sign, and traffic light using such a technique as template matching. This makes it possible to detect any light vehicle or pedestrian that can enter the course of the subject vehicle, and detect a road traffic sign and a traffic light to be followed during traveling.

Third Embodiment

Figure 12:
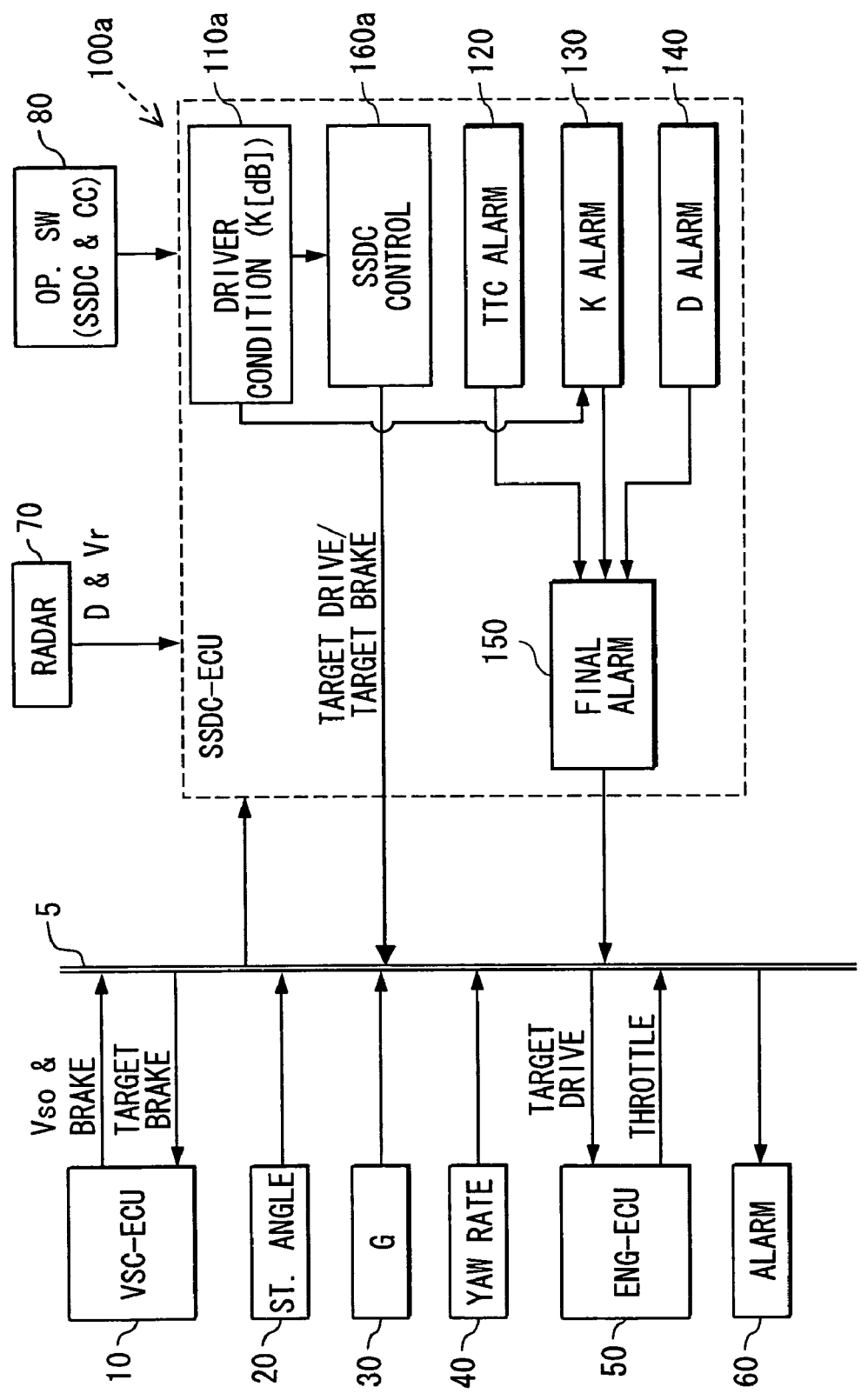
FIG. 12 is a block diagram illustrating a drive assistance system according to a third embodiment of the present invention.

As illustrated in FIG. 12, a drive assistance system according to the second embodiment is constructed with a VSC-ECU 10, a steering angle sensor 20, a G sensor 30, a yaw rate sensor 40, ENG-ECU 50, an alarm system 60, a laser radar 70, an operation SW 80a, and SSDC-ECU 100a. The parts other than the SSDC-ECU 100a are the same as those in the first embodiment.

The SSDC-ECU 100a is basically constructed with a microcomputer. It includes CPU, ROM, RAM, and I/O any of which is publicly known and a bus that connects them. This SSDC-ECU 100a takes the driver condition coefficient within the range of Sta1 or Sta2 illustrated in FIG. 3 as a driver condition coefficient to be taken as a target (target driver condition coefficient). That is, it takes as a target driver condition coefficient the driver condition coefficient obtained when a driver in condition suitable for driving is performing driving operation so that the inter-vehicle distance between the preceding vehicle and the subject vehicle is kept at a certain value. Based on this target driver condition coefficient and the present driver condition coefficient, it computes a relative acceleration/deceleration between the subject vehicle and preceding vehicle to be taken as a target (target relative acceleration/deceleration). Based on this target relative acceleration/deceleration, it carries out control so as to accelerate or decelerate the subject vehicle.

The drive assistance system in this embodiment accelerates or decelerates the subject vehicle based on the target relative acceleration/deceleration. It thereby carries out safety speed and inter-vehicle distance control to control the inter-vehicle distance between the preceding vehicle and the subject vehicle and the speed of the subject vehicle. This control will be hereafter referred to as SSDC control for Safety Speed & Distance Control.

This SSDC control includes the function of conventional constant speed traveling control (CC control). When the relative speed Vr takes a positive value (when the preceding vehicle and the subject vehicle draw apart from each other), it carries out this CC control. When the relative speed Vr of the subject vehicle takes a negative value, in SSDC control, deceleration control is carried out to reduce the speed of the subject vehicle. That is, when the preceding vehicle and the subject vehicle draw close to each other, deceleration control is carried out in SSDC control.

A driver condition coefficient K[dB] computation unit 110a computes a driver condition coefficient K based on information on the inter-vehicle distance outputted from the laser radar 70. That is, it computes a driver condition coefficient K by the following expression, letting the inter-vehicle distance be D and change in inter-vehicle distance per unit time be dD/dt.

$$K = (-2/D^3) \times (dD/dt) \qquad \text{(Expression 32)}$$

Change dD/dt in inter-vehicle distance D per unit time is equal to the relative speed Vr between the preceding vehicle and the subject vehicle. Therefore, the driver condition coefficient K may be computed from the inter-vehicle distance D and relative speed Vr outputted from the laser radar 70 by the following expression.

$$K = (-2/D^3) \times Vr \qquad \text{(Expression 33)}$$

The driver condition coefficient K represents the degree of change dS/dt per unit time in the area S of an image of a preceding vehicle. Accordingly, it is equal to the degree of change per unit time in the size of the image of the preceding vehicle picked up by the image pickup means, such as a camera. Therefore, the following construction may be adopted: such an image pickup means as a camera is provided, and the driver condition coefficient K is computed from the degree of change per unit time in the size of an image of the preceding vehicle picked up by the image pickup means.

The driver condition coefficient K[dB] computation unit 110a carries out the following computation in which the driver condition coefficient K is multiplied by a constant and expressed by logarithm (decibel [dB]). It outputs the result of this computation to an SSDC control unit 160a. |K| in the following expression represents the absolute value of the driver condition coefficient K.

$$K[dB] = 10 \times \log(|K|/0.00005) \qquad \text{(Expression 34)}$$

When the subject vehicle travels following the preceding vehicle, the SSDC control unit 160a performs the following operation: it computes a target relative acceleration/deceleration (dVr/dt)t, expressed by the following expression, based on a target driver condition coefficient Kt[dB] and the present driver condition coefficient Kp[dB] outputted from the driver condition coefficient K[dB] computation unit 110a; and it accelerates or decelerates the subject vehicle based on this target relative acceleration/deceleration (dVr/dt)t.

$$(dVr/dt)t = 7.5 \times 10^{\{(Kf[dB])/10)-8\}} \times D^2 \times Vr \qquad \text{(Expression 35)}$$

This target relative acceleration/deceleration (dVr/dt)t is computed as described below: when the relative speed Vr is subjected to time differentiation, the relative acceleration/deceleration (dVr/dt), expressed by the following expression, is obtained from the constant multiple of Expression 33 and Expression 34.

$$(dVr/dt) = 7.5 \times 10^{\{(K[dB])/10)-8\}} \times D^2 \times Vr \qquad \text{(Expression 36)}$$

As an example, it will be assumed that the target driver condition coefficient Kt[dB] is 30[dB]. This is a driver condition coefficient obtained when the driver is in condition suitable for driving. When this is substituted for K[dB] in Expression 36, the relative deceleration (dVr/dt) is indicated by the curve in FIG. 14. In this embodiment, the driver condition variable Kf[dB] is determined so that the present driver condition coefficient Kp[dB] approaches the target driver condition coefficient Kt[dB] The thus determined driver condition variable Kf[dB] is substituted into Expression 17. Thus, a target relative acceleration/deceleration (dVr/dt)t is computed.

Figure 14:
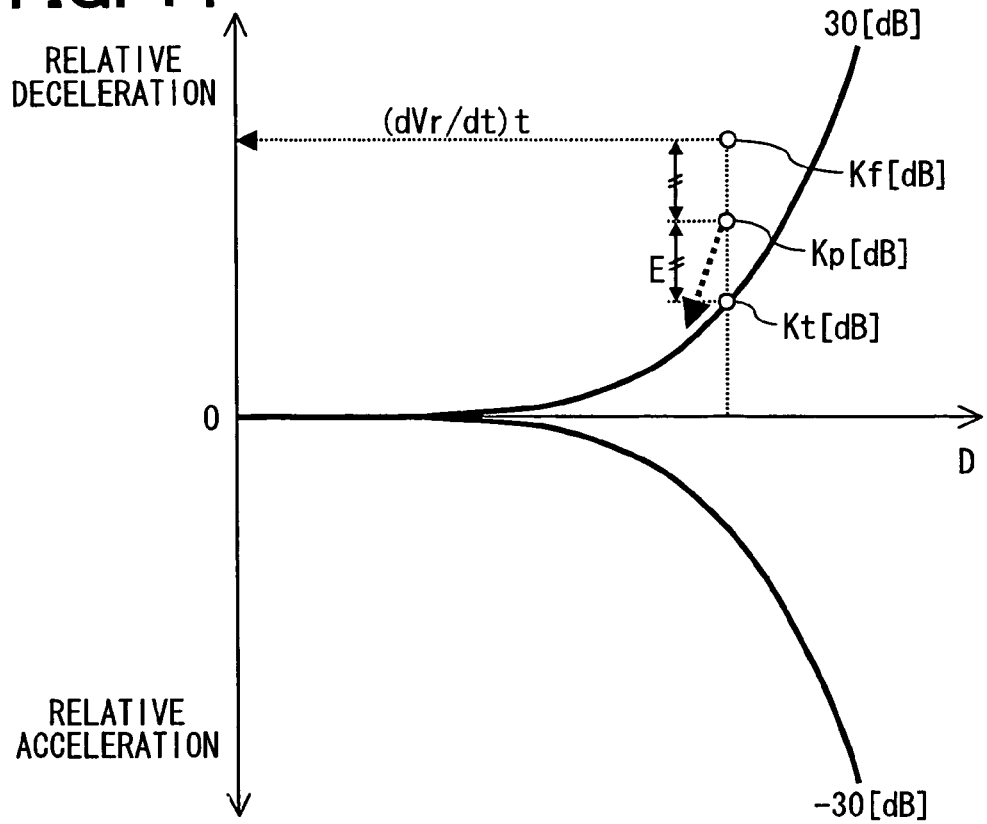
FIG. 14 is an operation diagram illustrating the driver condition variable Kf[dB] determined from the present driver condition coefficient Kp[dB] and a target driver condition coefficient Kt[dB]

As illustrated in FIG. 14, the driver condition variable Kf[dB] is determined by adding the present driver condition coefficient Kp[dB] to the difference between the present driver condition coefficient Kp[dB] and the target driver condition coefficient Kt[dB]. In the example in FIG. 14, a proportional term is used for the difference. Instead, a derivative term, an integral term, or a combination of them may be used for the difference.

Figure 13:
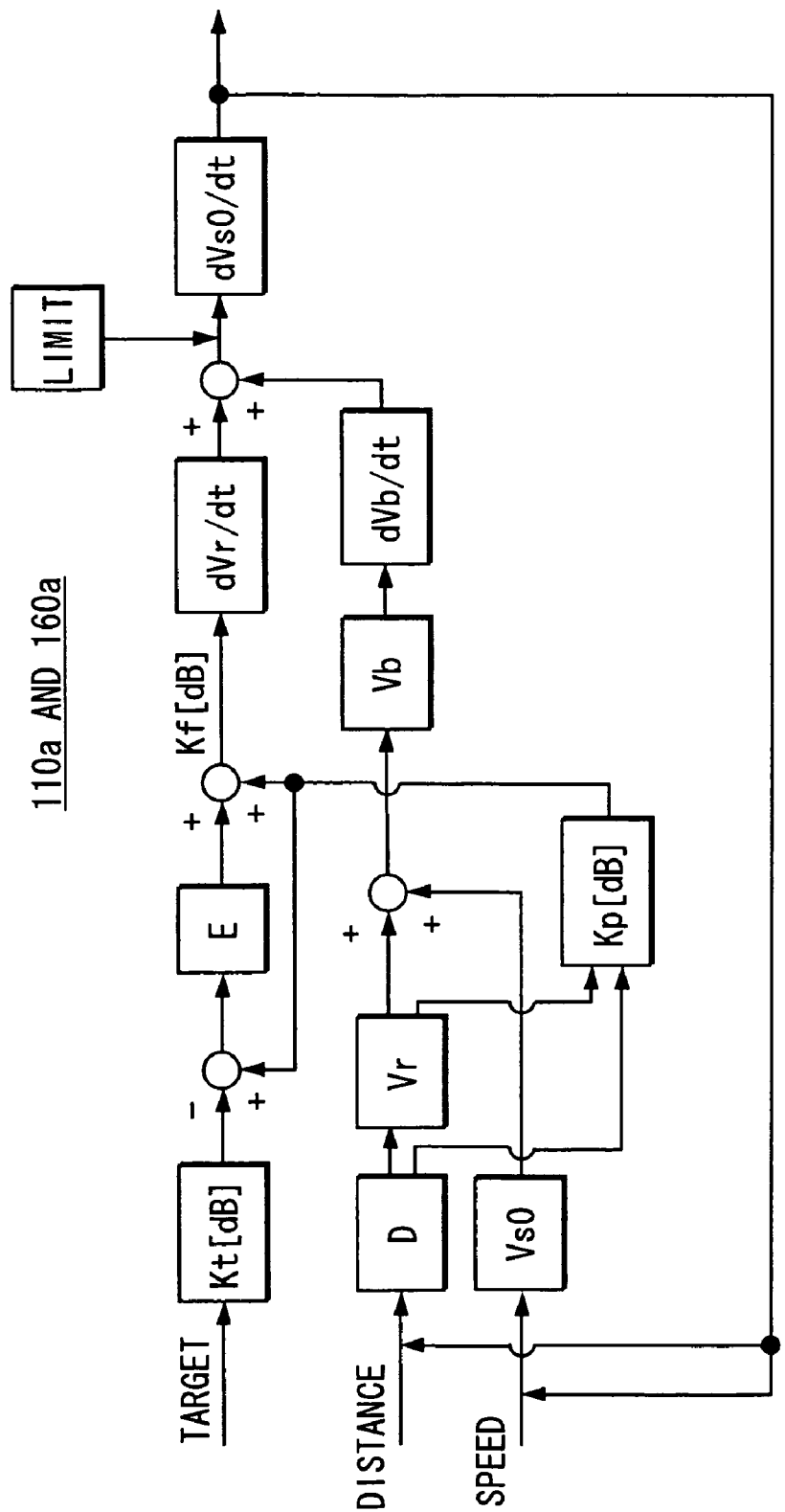
FIG. 13 is a block diagram of a control model illustrating the respective functions of the driver condition coefficient K[dB] computation unit and the SSDC control unit of SSDC-ECU.

FIG. 13 illustrates a control model corresponding to the respective functions of the driver condition coefficient K[dB] computation unit 110a and the SSDC control unit 160a. As illustrated, the present driver condition coefficient Kp[dB] is computed, and a difference between the present driver condition coefficient Kp[dB] and the target driver condition coefficient Kt[dB] is determined. Then, a target acceleration/deceleration (dVr/dt)t is computed from the driver condition variable Kf[dB] obtained by adding the present driver condition coefficient Kp[dB] to that difference.

Figure 15A:
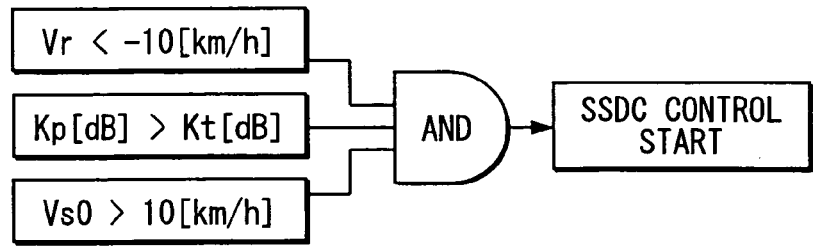
FIG. 15A and FIG. 15B are diagrams illustrating SSDC control start/termination conditions.
Figure 15B:
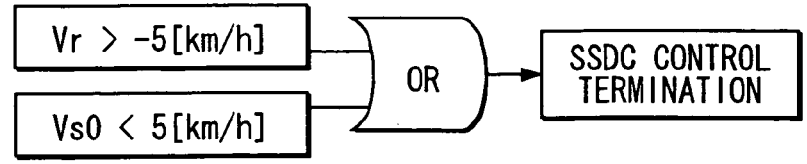
Figure 16A:
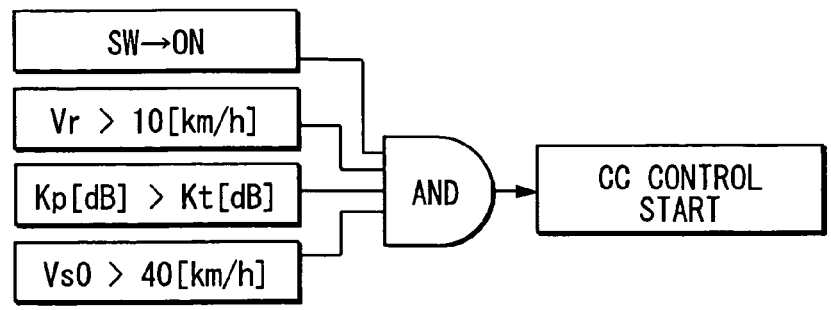
FIG. 16A and FIG. 16B are diagrams illustrating CC control start/termination conditions.
Figure 16B:
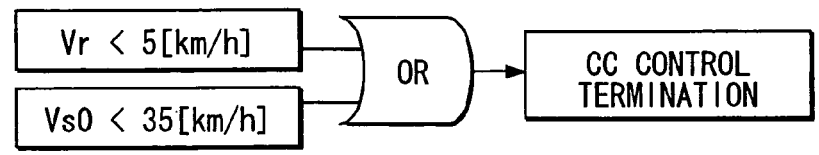

When carrying out SSDC control, the SSDC control unit 160a determines whether the control start/termination conditions illustrated in FIGS. 15A and 15B and FIGS. 16A and 16B are met or not. It starts/terminates SSDC control according to the result of this determination. FIGS. 15A and 15B illustrate control start/termination conditions for cases where the relative speed Vr takes a negative value (the preceding vehicle and the subject vehicle draw close to each other); FIGS. 16A and 16B illustrate control start/termination conditions for cases where the relative speed Vr takes a positive value (the preceding vehicle and the subject vehicle draw apart from each other).

As illustrated in FIG. 15A, in cases where the relative speed Vr takes a negative value (Vr<0), SSDC control is started when the following conditions are met: the value of the relative speed Vr is smaller than a predetermined value (e.g. −10[km/h]); the value of the present driver condition coefficient Kp[dB] is larger than the target driver condition coefficient Kt[dB]; and the speed Vs0 of the subject vehicle is larger than a predetermined value (e.g. 10[km/h]).

As illustrated in FIG. 15B, in cases where the relative speed Vr takes a negative value (Vr<0), SSDC control is terminated when either of the following conditions is met: the value of the relative speed Vr is larger than a predetermined value (e.g. −5[km/h]) (in other words, the absolute value of the relative speed Vr is smaller than a predetermined value); or the speed Vs0 of the subject vehicle is smaller than a predetermined value (e.g. 5[km/h]).

As described above, even when the preceding vehicle and the subject vehicle draw close to each other (the relative speed Vr takes a negative value), the following is possible: in cases where the absolute value of the relative speed Vr is smaller than a predetermined value, the driver may be performing driving operation in condition suitable for driving so that he/she follows the preceding vehicle. In this case, therefore, excessive intervention in the driver's driving operation can be prevented by terminating (stopping) the execution of deceleration control in SSDC control.

The following construction may be adopted though not shown in FIG. 15B: the execution of deceleration control in SSDC control is also terminated (stopped) in the following cases: cases where the driver performs accelerating operation to the extent that a certain value is reached or exceeded to avoid contact with the preceding vehicle; and cases where the driver starts steering system operation to avoid contact with the preceding vehicle.

That is, even when the preceding vehicle and the subject vehicle draw close to each other (the relative speed Vr takes a negative value), the following is possible: in cases where the driver starts accelerating operation or steering system operation to avoid contact with the preceding vehicle, the driver may probably have started lane change to pass the preceding vehicle. In this case, therefore, such an intervention as to hinder lane change can be avoided by stopping the execution of deceleration control in SSDC control.

When a SSDC control condition illustrated in FIG. 15B holds and SSDC control is terminated (stopped), it is advisable to take the following measure: an instruction is given to the final alarm determination unit 150 to report that deceleration control in SSDC control is terminated (stopped) or that the driver should start decelerating operation. Thus, it is reported by the alarm system 60 that deceleration control is terminated (stopped) or the driver should start decelerating operation. Therefore, the driver can comprehend that deceleration control in SSDC control is terminated (stopped) or he himself/she herself should start decelerating operation.

In cases where, after SSDC control is terminated (stopped), the driver's driving operation transitions to driving operation for starting decelerating operation, the following may be performed: brake preload application control may be carried out to apply brake preload to the brake actuator of the subject vehicle. Thus, brake preload can be applied during the period during which the driver changes his/her foot position from accelerator pedal to brake pedal. Therefore, a time lag before decelerating operation is started can be eliminated.

Control may be carried out to actuate a collision damage mitigating device, not shown, in the following cases: cases where SSDC control is terminated (stopped) and then the driver condition coefficient takes a negative value; cases where the driver's driving operation does not transition to driving operation for starting decelerating operation; and cases where the present driver condition coefficient Kp[dB] takes a positive value equal to or larger than a predetermined value.

As described above, when the preceding vehicle and the subject vehicle draw close to each other (the relative speed Vr takes a negative value), the following is possible: in cases where, after the execution of deceleration control in SSDC control is terminated (stopped), the driver's driving operation does not transition to driving operation for starting decelerating operation, the preceding vehicle and the subject vehicle further draw close to each other. As a result, the possibility of collision between the preceding vehicle and the subject vehicle is increased.

When the present driver condition coefficient Kp[dB] takes a positive value equal to or larger than a predetermined value in this case, it is determined that both the vehicles are rapidly drawing close to each other. Then, control is carried out so as to actuate the collision damage mitigating device. Thus, damage from collision between the preceding vehicle and the subject vehicle can be mitigated. When control is carried out so as to actuate the collision damage mitigating device, it is preferable that an alarm should be generated to the driver and the driver should be informed that the collision damage mitigating device is actuated.

As illustrated in FIG. 16A, in cases where the relative speed Vr takes a positive value (Vr>0), CC control is started when the following conditions are met: the setting speed SW of the operation SW 80 is ON; the value of the relative speed Vr is larger than a predetermined value (e.g. 10[km/h]); the value of the present driver condition coefficient Kp[dB] is larger than a target driver condition coefficient Kt[dB]; and the speed Vs0 of the subject vehicle is larger than a predetermined value (e.g. 40[km/h]).

As illustrated in FIG. 16B, in cases where the relative speed Vr takes a positive value (Vr>0), CC control is terminated when either of the following conditions is met: the value of the relative speed Vr is smaller than a predetermined value (e.g. 5[km/h]) (in other words, the absolute value of the relative speed Vr is smaller than a predetermined value); and the speed Vs0 of the subject vehicle is smaller than a predetermined value (e.g. 35[km/h]).

As described above, even when the preceding vehicle and the subject vehicle draw apart from each other (the relative speed Vr takes a positive value), the following is possible: in cases where the absolute value of the relative speed Vr is smaller than a predetermined value, the driver may be performing driving operation in condition suitable for driving so that he/she follows the preceding vehicle. In this case, therefore, excessive intervention in the driver's driving operation can be prevented by stopping the execution of CC control.

When the absolute value of the relative speed Vr takes a value larger than the speed Vs0 of the subject vehicle, though not shown in FIG. 15 or FIG. 16, the following is possible: the relative speed Vr is not the relative speed relative to the preceding vehicle in the same traveling direction as the subject vehicle but the relative speed relative to an oncoming vehicle. In this case, therefore, erroneous control can be prevented from being carried out by prohibiting the execution of SSDC control or CC control.

As illustrated in FIG. 12 and FIG. 13, the SSDC control unit 160a computes a target acceleration/deceleration (dVs0/dt)t of the subject vehicle from a target relative acceleration/deceleration (dVr/dt)t and the acceleration/deceleration (dVb/dt) of the preceding vehicle. It computes a target braking force or target driving force to be generated in the subject vehicle from this target acceleration/deceleration (dVs0/dt)t, and transmits it to the in-vehicle LAN 5.

As illustrated in FIG. 13, limitation corresponding to the presence/absence of the driver's decelerating operation (that is, the presence/absence of brake pedal operation) is imposed on the target acceleration/deceleration (dVs0/dt)t.

Figure 17A:
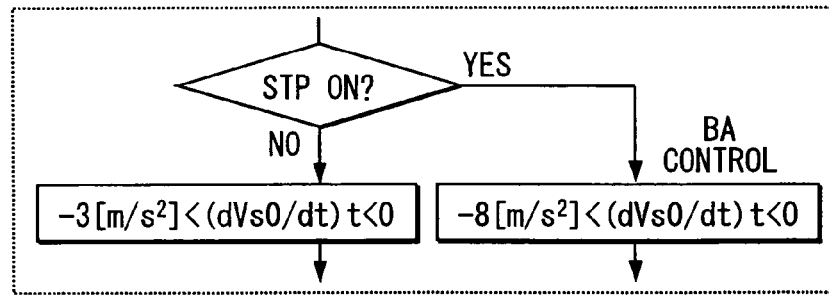
FIGS. 17A and 17B are diagrams illustrating limitations imposed on the target acceleration/deceleration (dVs0/dt)t.

FIG. 17A illustrates limitation imposed when the relative speed Vr takes a negative value. As illustrated, when the driver is not performing brake pedal operation (STP to OFF), the operation described below is performed. That is, when the driver is performing accelerating operation or cruising operation for maintaining the present speed of the subject vehicle, the following operation is performed: the target acceleration/deceleration (dVs0/dt)t is limited to a deceleration smaller than the maximum deceleration a (e.g. $a=-3[m/s^2]$) that can be generated in deceleration control in SSDC control.

When the driver is performing brake pedal operation (STP to ON), the target acceleration/deceleration (dVs0/dt)t is limited to a deceleration smaller than the deceleration b of the subject vehicle generated by the driver's decelerating operation. Or, it is limited to a deceleration smaller than the deceleration c (e.g. $c=-8[m/s^2]$) generated by a brake assist system (BA) that adds the driver's brake pedal effort. Thus, when the relative speed Vr takes a negative value, the following can be implemented: different limitations are imposed on the target acceleration/deceleration (dVs0/dt)t according to the presence or absence of the driver's decelerating operation.

Figure 17B:
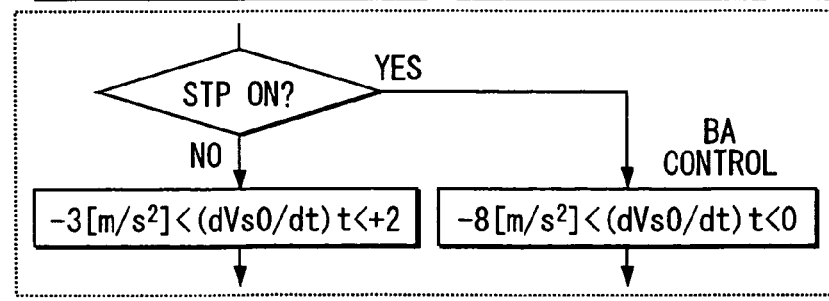

FIG. 17B illustrates limitation imposed when the relative speed Vr takes a positive value. As illustrated, when the driver is not performing brake pedal operation (STP to OFF), the operation described below is performed. That is, when the driver is performing accelerating operation or cruising operation for maintaining the present speed of the subject vehicle, the following operation is performed: the target acceleration/deceleration (dVs0/dt)t is limited to a deceleration smaller than the maximum deceleration a (e.g. $a=-3[m/s^2]$) that can be generated in deceleration control in CC control; at the same time, the target acceleration/deceleration (dVs0/dt)t is limited to an acceleration smaller than the maximum acceleration g (e.g. $g=+2[m/s^2]$) that can be generated in acceleration control in CC control.

When the driver is performing brake pedal operation (STP to ON), the target acceleration/deceleration (dVs0/dt)t is limited to a deceleration smaller than the deceleration b of the subject vehicle generated by the driver's decelerating operation. Or, it is limited to a deceleration smaller than the deceleration c generated by a brake assist system that adds the driver's brake pedal effort.

Thus, when the relative speed Vr takes a positive value, the following can be implemented: different limitations are imposed on the target deceleration (dVs0/dt)t according to the presence or absence of the driver's decelerating operation; at the same time, limitation is also imposed on the target acceleration (dVs0/dt)t. It is preferable that the deceleration c should be set according to the deceleration (dVb/dt) of the preceding vehicle so that it is matched with the level of the deceleration (dVb/dt) of the preceding vehicle.

Figure 18:
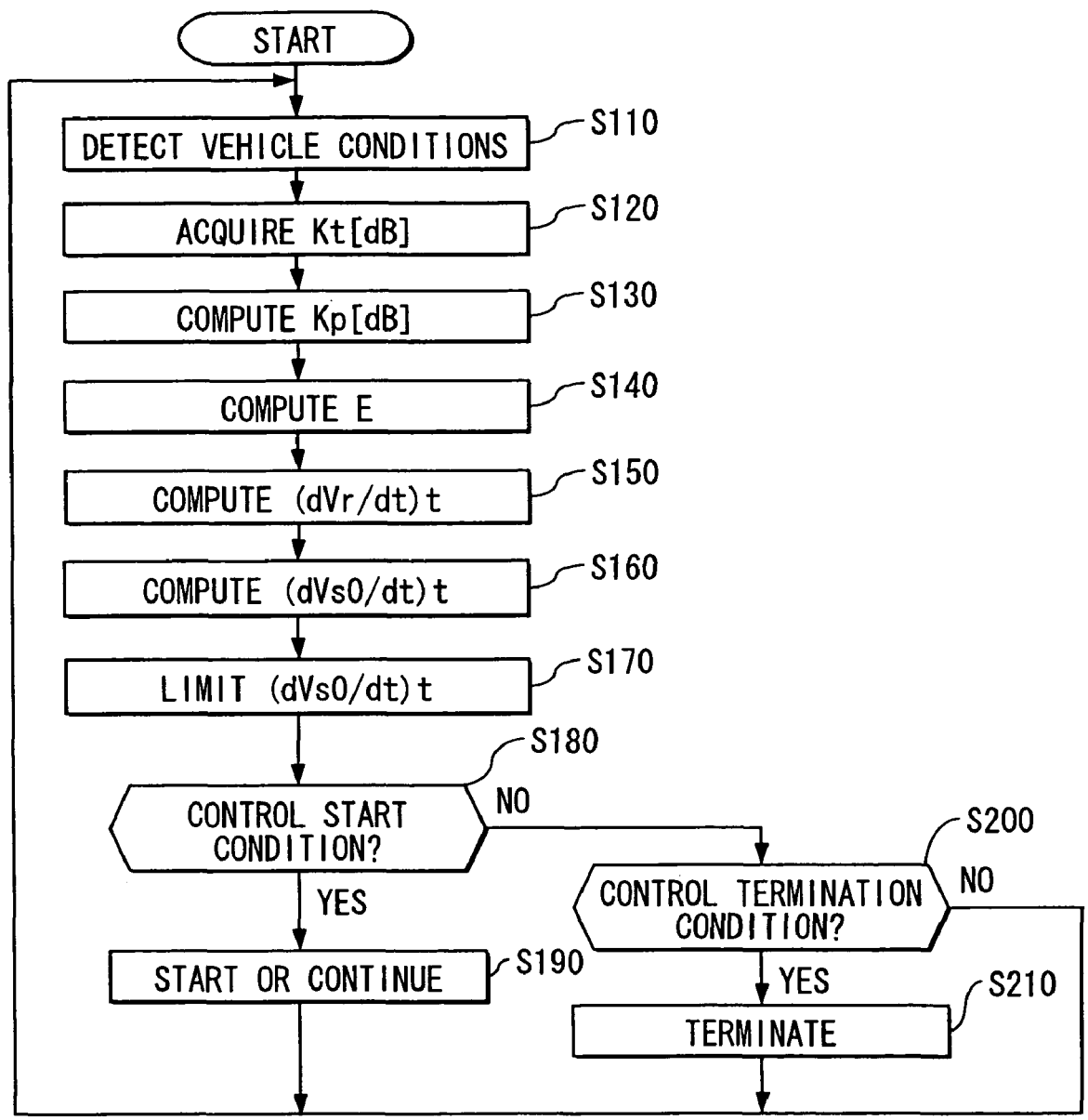
FIG. 18 is a flowchart illustrating the operation of the drive assistance system according to the third embodiment.

This drive assistance system is described further with reference to the flowchart in FIG. 18. At S110, the condition quantities of the vehicle, such as the inter-vehicle distance D, the vehicle speed Vs0 of the subject vehicle, the relative speed Vr, and the like, are detected. At S120, a target driver condition coefficient Kt[dB] is acquired. At S130, the present driver condition coefficient Kp[dB] is computed. At S140, the deviation or error E between the target driver condition coefficient Kt[dB] and the present driver condition coefficient Kp[dB] is computed.

At S150, a target relative acceleration/deceleration (dVr/dt)t is computed, and at S160, a target acceleration/deceleration (dVs0/dt)t of the subject vehicle is computed. At S170, a limitation corresponding to the driver's brake pedal operation is imposed on the target acceleration/deceleration (dVs0/dt)t. At S180, it is determined whether SSDC control or CC control start conditions are met or not. When an affirmative determination is made here, the operation proceeds to S190. When a negative determination is made, the operation proceeds to S200.

At S190, SSDC control or CC control is started or continued. The operation proceeds to S110, and the above processing is repeatedly performed. At S200, it is determined whether an SSDC control or CC control termination condition is met or not. When an affirmative determination is made here, the operation proceeds to S210. When a negative determination is made, the operation proceeds to S110, and the above processing is repeatedly performed. At S210, the execution of SSDC control or CC control, when it is being carried out, is terminated. Then, the operation proceeds to S110, and the above processing is repeatedly performed.

As described above, the drive assistance system in this embodiment operates as follows: it computes a target relative acceleration/deceleration between the subject vehicle and the preceding vehicle based on a target driver condition coefficient and the present driver condition coefficient. Based on this target relative acceleration/deceleration, it carries out SSDC control to accelerate or decelerate the subject vehicle. Thus, when the subject vehicle travels following the preceding vehicle, driving operation can be assisted based on the relation between the target driver condition coefficient and the present driver condition coefficient.

(Fourth Modification)

This third embodiment may be so constructed that the target driver condition coefficient Kt[dB] can be set to an arbitrary value using the operation switch SW 80, for example. Thus, the target driver condition coefficient Kt[dB] can be set to a value to the driver's own taste.

Fourth Embodiment

Figure 19:
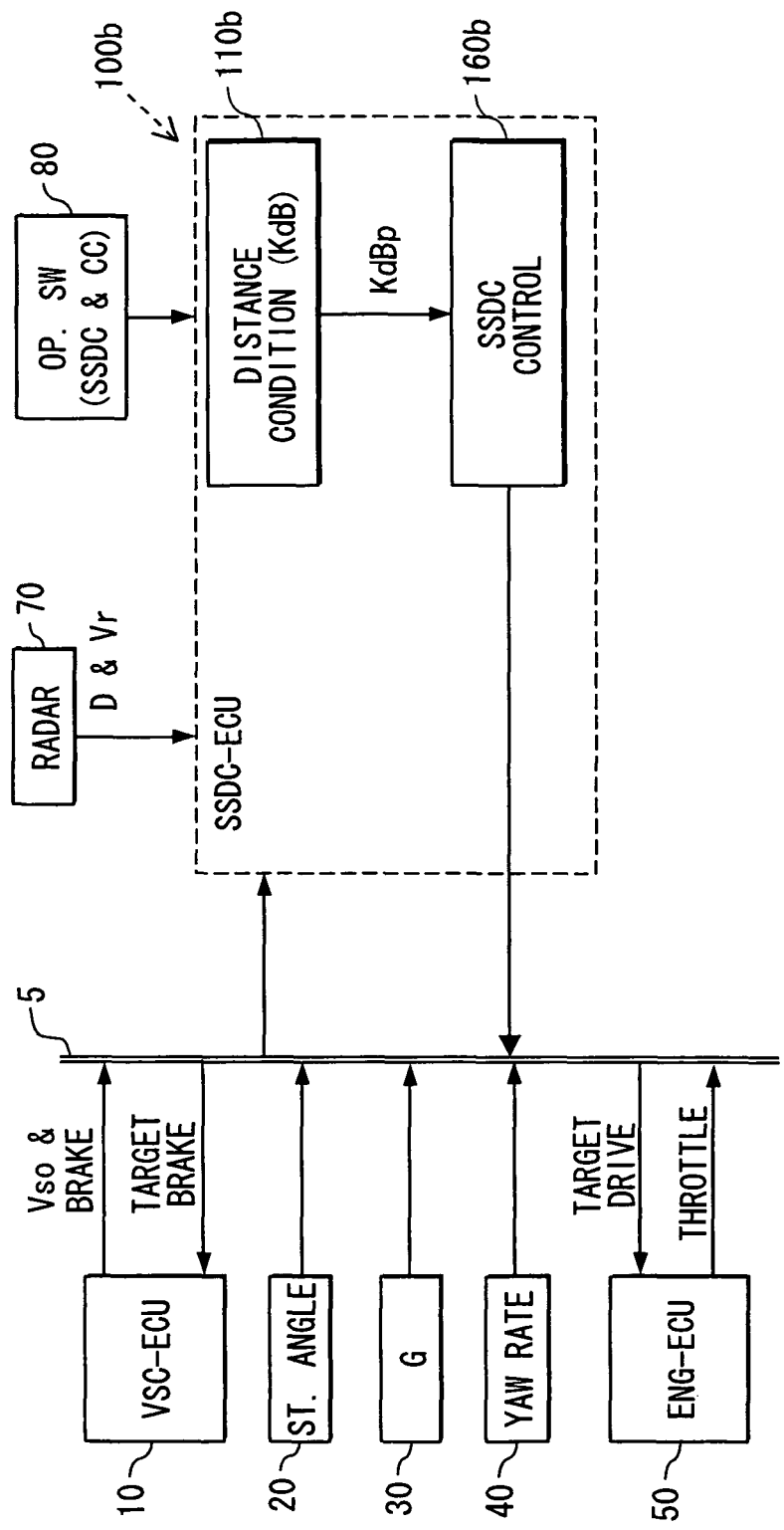
FIG. 19 is a block diagram illustrating a drive assistance system according to a fourth embodiment of the present invention.

In the fourth embodiment shown in FIG. 19, a drive assistance system is constructed with a VSC-ECU 10, a steering angle sensor 20, a G sensor 30, a yaw rate sensor 40, an ENG-ECU 50, a laser radar 70, an operation switch SW 80a and SSDC-ECU 100b. The parts other than the SSDC-ECU 100b are similar to those of the third embodiment shown in FIG. 12.

The SSDC-ECU 100b is basically constructed with a microcomputer. A distance condition evaluation index computation unit 110b computes a distance condition evaluation index KdB by the following expression, letting the inter-vehicle distance and relative speed outputted from the laser radar 70 be respectively D and Vr. $|-2 \times Vr|$ in the following expression represents the absolute value of $(-2 \times Vr)$. The relative speed Vr is marked with the negative (−) sign when the preceding vehicle and the subject vehicle draw close to each other, and with the positive (+) sign when the preceding vehicle and the subject vehicle draw apart from each other.

$$KdB = 10 \times \log\{|-2 \times Vr|/(D^3 \times 5 \times 10^{-8})\} \quad \text{(Expression 37)}$$

As described in connection with the first embodiment, the driver condition coefficient K that represents the degree of change in the area of the preceding vehicle as viewed from the subject vehicle can be used as follows: it can be used as an evaluation index that indicates the distance decreasing and the distance increasing between the preceding vehicle and the subject vehicle. For this reason, in this embodiment, the following operation is performed: Expression 5 or 31 that represents the driver condition coefficient K is multiplied by a constant and expressed by logarithm (decibel [dB]); then, a distance condition evaluation index KdB is obtained by Expression 37 in which it is further multiplied by a constant.

The distance condition evaluation index KdB computation unit 110b gives a sign to the computed present distance condition evaluation index KdBp as follows: it gives the positive (+) sign when the relative speed Vr is marked with the negative (−) sign (that is, the preceding vehicle and the subject vehicle draw close to each other); it gives the negative (−) sign when the relative speed Vr is marked with the positive (+) sign (that is, the preceding vehicle and the subject vehicle draw apart from each other). Then, it outputs the evaluation index to an SSDC control unit 160b.

When there is a preceding vehicle in the traveling direction of the subject vehicle, the SSDC control unit 160b performs the operation described below. This preceding vehicle is a vehicle ahead of the subject vehicle the traveling direction of which is the same as that of the subject vehicle, and oncoming vehicles are excluded. The SSDC control unit 110b computes a deceleration target KdBssdc from the normal deceleration ND of the subject vehicle, the inter-vehicle distance D, and the relative speed Vr. The deceleration target is an index that indicates execution timing of deceleration control in which the subject vehicle is decelerated. Then, it determines whether or not the value of the present distance condition evaluation index KdBp is larger than the deceleration target KdBssdc. When the value of the distance condition evaluation index KdBp is larger than the deceleration target KdBssdc, it starts the execution of deceleration control to decelerate the subject vehicle. When the value of the distance condition evaluation index KdBp is smaller than the deceleration target KdBssdc, it starts the execution of acceleration control to accelerate the subject vehicle. It thereby carries out safety speed and inter-vehicle distance control to control the inter-vehicle distance D and the speed Vs0 of the subject vehicle based on this acceleration/deceleration of the subject vehicle. This control will be hereafter referred to as SSDC control for Safety Speed & Distance Control.

Figure 20:
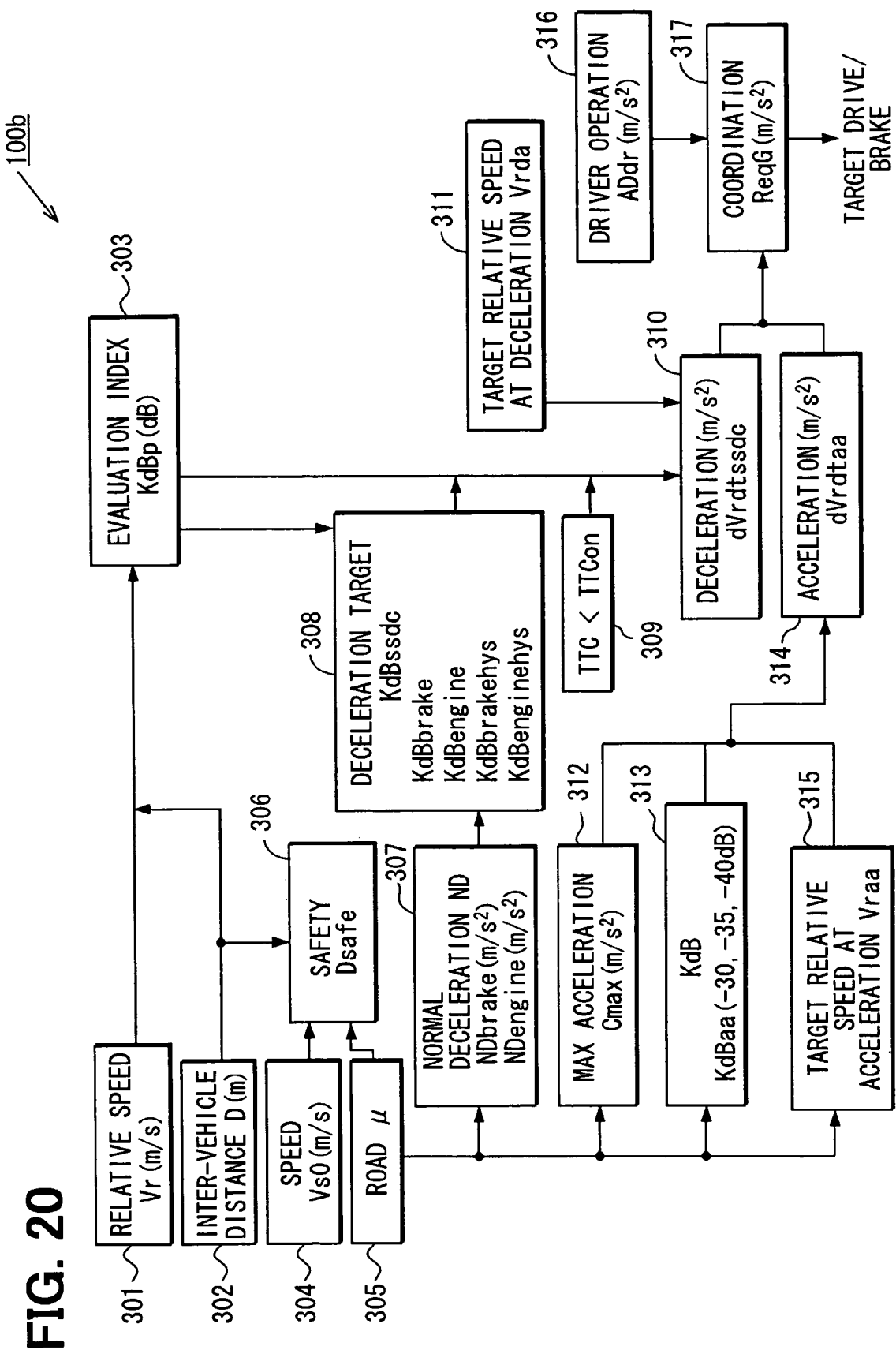
FIG. 20 is a functional block diagram of SSDC-ECU.

FIG. 20 illustrates the functional block of the SSDC-ECU 100b. A relative speed acquisition unit 301 and an inter-vehicle distance information acquisition unit 302 acquire the relative speed Vr and the inter-vehicle distance D from the laser radar 70. A distance condition evaluation index computation unit 303 computes the present distance condition evaluation index KdBp from the relative speed Vr and the inter-vehicle distance D, as described above.

A subject vehicle speed acquisition unit 304 acquires the speed Vs0 of the subject vehicle. A road friction μ acquisition unit 305 determines a coefficient μ of friction on a road from the condition of the road on which the subject vehicle travels, detected by a road condition detector, not shown. The following construction may be adopted: road condition, such as dry, wet, snow-covered, and ice-covered, is brought beforehand into correspondence with coefficients μ of friction on a road; the driver is prompted to select dry, wet, snow-covered, ice-covered, or the like; then a coefficient μ of friction on a road is determined from the selected road condition.

Figure 21:
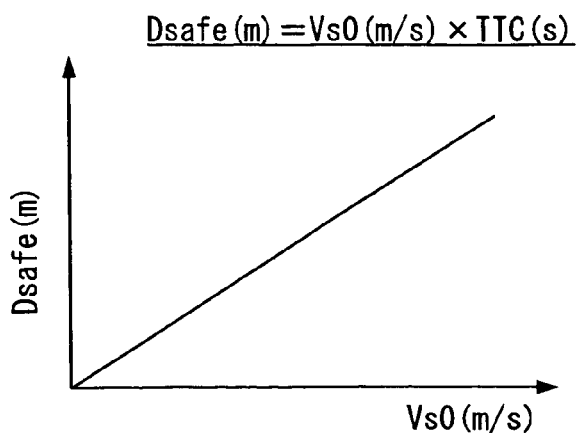
FIG. 21 is an operation diagram illustrating an example of safe inter-vehicle distance Dsafe.

A safe inter-vehicle distance computation and determination unit 306 computes a safe inter-vehicle distance Dsafe, as illustrated in FIG. 21. It is obtained by multiplying a preset headway TTCon by the speed Vs0 of the subject vehicle. The headway is an index indicating how many seconds later the subject vehicle will be brought into contact with the preceding vehicle when the present distance decreasing between the subject vehicle and the preceding vehicle lasts.

As described later, the headway TTCon is also used for determining whether to start the execution of deceleration control. When the present value of headway TTC is larger than a preset headway TTCon, it is considered that a safe headway is ensured and it is determined not to carry out deceleration control.

The safe inter-vehicle distance computation and determination unit 306 computes a safe inter-vehicle distance Dsafe by multiplying the preset headway TTCon by the speed Vs0 of the subject vehicle. It thereby determines whether the value of the present inter-vehicle distance D is smaller than the safe inter-vehicle distance Dsafe or not. It is comprehended from the result of this determination whether the safe inter-vehicle distance Dsafe is ensured or not.

The safe inter-vehicle distance Dsafe varies depending on the conditions of the road on which the vehicle travels. Therefore, the safe inter-vehicle distance Dsafe may be corrected according to the road conditions. For example, it is advisable to correct the headway TTCon by the coefficient μ of friction on a road and thereby correct the safe inter-vehicle distance Dsafe.

A normal deceleration storage unit 307 stores the normal deceleration ND of the subject vehicle. This normal deceleration ND represents two decelerations: engine brake normal deceleration NDengine that indicates an engine brake-equivalent deceleration, and main brake normal deceleration NDbrake that indicates a main brake-equivalent deceleration generated by a brake actuator. The main brake normal deceleration NDbrake represents a deceleration larger than the engine brake normal deceleration NDengine.

A deceleration target computation and determination unit 308 computes a deceleration target KdBssdc that is an index indicating execution timing of deceleration control from the normal deceleration ND, inter-vehicle distance D, and relative speed Vr. This deceleration target KdBssdc is computed by Expression 40. That is, the following expression is obtained from Expression 13. The first gain G1 in the following expression will be described later.

$$ND = G1 \times 7.5 \times D^2 \times 10^{\{(|KdBssdc|/10)-8\}} \times Vr \quad \text{(Expression 38)}$$

When the above expression is transformed, the following expression is obtained.

$$10^{\{(|KdBssdc|/10)-8\}} = ND/G1 \times 7.5 \times D^2 \times Vr \quad \text{(Expression 39)}$$

When the above expression is expressed in logarithm, the following expression is obtained.

$$KdBssdc = \{\log(|ND/(G1 \times 7.5 \times D^2 \times Vr)|) + 8\} \times 10 \quad \text{(Expression 40)}$$

The following are computed from Expression 40 by the expressions below: the deceleration target KdBengine that is an index indicating execution timing of deceleration control by engine brake; and the deceleration target KdBbrake that is an index indicating execution timing of deceleration control by brake actuator.

$$KdBengine = \{\log(|NDengine/(G1 \times 7.5 \times D^2 \times Vr)|) + 8\} \times 10 \quad \text{(Expression 41)}$$

$$KdBbrake = \{\log(|NDbrake/(G1 \times 7.5 \times D^2 \times Vr)|) + 8\} \times 10 \quad \text{(Expression 42)}$$

The deceleration target computation and determination unit 308 computes the following based on the deceleration target KdBengine and the deceleration target KdBbrake: a deceleration target KdBenginehys and a deceleration target KdBbrakehys that are indexes indicating termination timing of deceleration control. For example, values smaller by −3[dB] to −6[dB] or so than the deceleration target KdBengine and the deceleration target KdBbrake are taken for the deceleration target KdBenginehys and the deceleration target KdBbrakehys.

Figure 22:
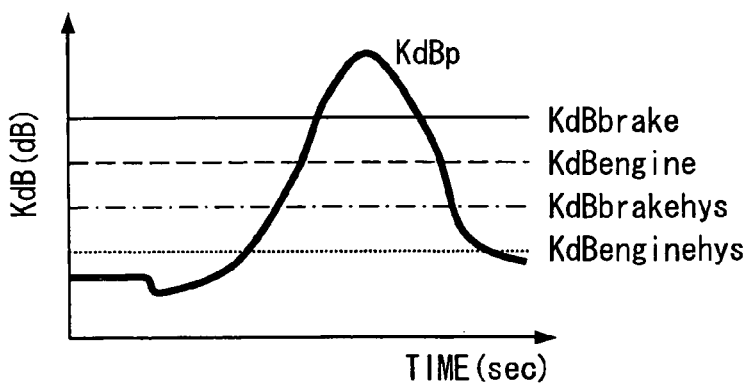
FIG. 22 is an operation diagram illustrating an example of the present distance condition evaluation index KdBp, deceleration target KdBengine, deceleration target KdBbrake, deceleration target KdBenginehys, and deceleration target KdBbrakehys.

As illustrated in FIG. 22, the deceleration target computation and determination unit 308 determines the following: whether or not the present value of the distance condition evaluation index KdBp is larger than the deceleration target KdBengine or the deceleration target KdBbrake. When it is determined as the result of this determination that the value is larger than at least either of the deceleration target KdBengine and the deceleration target KdBbrake, it is determined that the execution of deceleration control should be started.

Thus, the following advantage is brought by starting the execution of deceleration control, for example, when the present distance condition evaluation index KdBp is larger than the deceleration target KdBengine: the execution start timing thereof can be matched with the timing of decelerating operation performed when the engine brake normal deceleration NDengine is generated.

The following advantage is brought by starting the execution of deceleration control, for example, when the present distance condition evaluation index KdBp is larger than the deceleration target KdBbrake: the execution start timing thereof can be matched with the timing of decelerating operation performed when the main brake normal deceleration NDbrake is generated.

In this embodiment, a margin is provided based on headway TTC with respect to start of the execution of deceleration control by a headway TTC determination unit 309. As an example, it will be assumed that the inter-vehicle distance D is equal to or shorter than 50 m or so. In this case, the execution of deceleration control is started when the present distance condition evaluation index KdBp exceeds at least either of the deceleration target KdBengine and the deceleration target KdBbrake. Thus, it can be matched with the timing of brake operation performed by the driver himself/herself.

However, when the inter-vehicle distance D is equal to or longer than 50 m or so, the following takes place: the driver of the subject vehicle is lowered in the degree of perception of change in the area of the preceding vehicle as compared with cases where the inter-vehicle distance D is equal to or shorter than 50 m or so. For this reason, when the execution of deceleration control is started only based on the present distance condition evaluation index KdBp, which is in correspondence with the degree of change in the area of the preceding vehicle, the following takes place: the driver feels as though the subject vehicle decelerated earlier than when the driver himself/herself performs brake operation.

Figure 24:
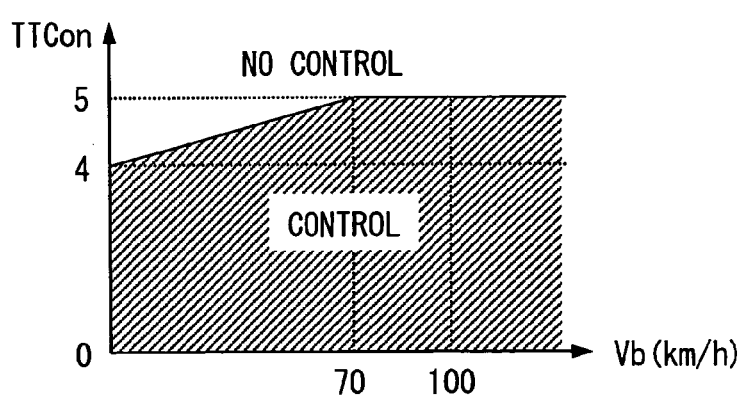
FIG. 24 is an operation diagram illustrating determination of whether to start the execution of deceleration control based on headway TTC.

In this embodiment, it is determined at the headway TTC determination unit 309 whether the value of the present headway TTC, computed from the inter-vehicle distance D and the relative speed Vr, is smaller than the preset headway TTCon shown in FIG. 24. Then, it is determined that the execution of deceleration control should be started when the following takes place: it is determined by the deceleration target computation and determination unit 308 that the value of the present distance condition evaluation index KdBp is larger than at least either of the deceleration target KdBengine and the deceleration target KdBbrake; at the same time, it is determined by the headway TTC determination unit 309 that the value of the present headway TTC is smaller than the preset headway TTCon (that is, it is within the diagonally shaded area in FIG. 24). Thus, the execution start timing of deceleration control can be matched with the timing of brake operation performed by the driver himself/herself.

The deceleration target computation and determination unit 308 reflects the propensity of the driver in the execution start timing of deceleration control. More specifically, in cases where the preceding vehicle brakes suddenly, the risk posed to the subject vehicle is increased with increase in the speed of the preceding vehicle. When there is high risk as described above, the driver of the subject vehicle is likely to perform brake operation earlier with increase in the speed of the preceding vehicle.

To reflect this propensity of the driver, the deceleration target computation and determination unit 308 carries out the computation expressed by the following expression: it computes a deceleration target KdBengine and a deceleration target KdBbrake multiplied by a third gain G3 that takes a positive value not more than 1, determined from the speed Vb of the preceding vehicle.

$$KdB\text{engine}=G3\times\{\log(|ND\text{engine}/(G1\times 7.5\times D^2\times Vr)|)+8\}\times 10 \quad \text{(Expression 43)}$$

$$KdB\text{brake}=G3\times\{\log(|ND\text{brake}/(G1\times 7.5\times D^2\times Vr)|)+8\}\times 10 \quad \text{(Expression 44)}$$

Figure 23:
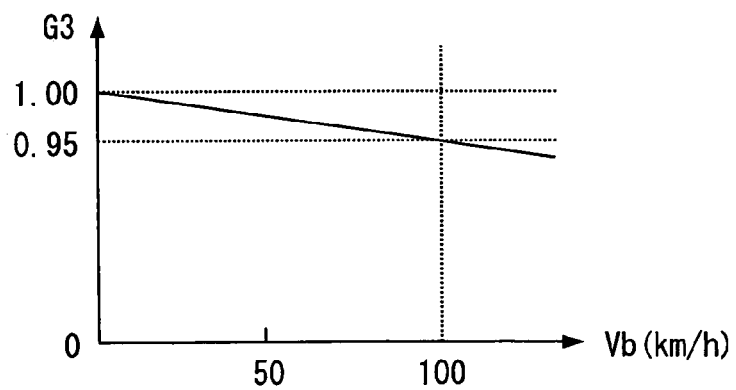
FIG. 23 is an operation diagram illustrating an example of third gain G3.

Multiplication by the third gain G3 lowers the values taken by the deceleration target KdBengine and the deceleration target KdBbrake. As a result, the time that lapses before the present distance condition evaluation index KdBp reaches the deceleration target KdBengine and the deceleration target KdBbrake is shortened. Therefore, for example, the G3 is set to 1.00 when the speed Vb of the preceding vehicle is 0[km/h], and the value of G3 is made smaller with increase in the speed Vb of the preceding vehicle, as illustrated in FIG. 23. For example, the G3 is set to 0.95 when the speed Vb of the preceding vehicle is 100[km/h]. The final deceleration target KdBssdc is computed by multiplying the third gain G3. Thus, the execution timing of deceleration control can be accelerated, and the driver's propensity can be reflected.

As illustrated in FIG. 22, the deceleration target computation and determination unit 308 determines that the execution of deceleration control should be terminated in the following cases: cases where it is determined that the value of the present distance condition evaluation index KdBp is smaller than the deceleration target KdBenginehys, while deceleration control is being carried out. Thus, hunting in deceleration control can be suppressed. At the same time as the execution of deceleration control is terminated, the execution of acceleration control is started to accelerate the subject vehicle. Thus, acceleration control can be carried out to accelerate the subject vehicle with such timing that deceleration control need not be carried out.

As illustrated in FIG. 22, a deceleration computation unit 310 computes the following as deceleration output when it is determined that the value of the present distance condition evaluation index KdBp is larger than at least either of the deceleration target KdBengine and the deceleration target KdBbrake: it computes a target relative deceleration dVrdtssdc between the subject vehicle and the preceding vehicle from the inter-vehicle distance D, relative speed Vr, and present distance condition evaluation index KdBp. Deceleration control is carried out so that the relative deceleration becomes equal to the target relative deceleration dVrdtssdc. This target relative deceleration dVrdtssdc is derived as follows: first, Expression 37 is transformed into the following expression:

$$10^{\{(KdBp|/10)\}} = |-2 \times Vr|/(D^3 \times 5 \times 10^{-8})$$ (Expression 45)

$$|-Vr| = (D^3 \times 5 \times 10^{-8}/2) \times 10^{\{(KdBp|/10)\}} = 2.5 \times D^3 \times 10^{\{(KdBp|/10)-8\}}$$ (Expression 46)

As expressed by the following expression, Expression 46 is subjected to time differentiation, and the result is taken as target relative deceleration dVrdtssdc.

$$dVrdtssdc = (dVr/dD) \times (dD/dt) = 7.5 \times D^2 \times 10^{\{(KdBp|/10)-8\}} \times Vr$$ (Expression 47)

Here, the target relative deceleration dVrdtssdc shown in Expression 47 represents a target value of relative deceleration for maintaining the present inter-vehicle distance D. Therefore, deceleration control is carried out so that the subject deceleration becomes equal to this target relative deceleration dVrdtssdc. The present distance condition evaluation index KdBp can be thereby maintained. In other words, the present inter-vehicle distance D can be substantially maintained.

The deceleration computation unit 310 multiplies the target relative deceleration dVrdtssdc by a first gain G1 that takes a positive value not more than 1. The target relative deceleration dVrdtssdc multiplied by the first gain G1 is expressed by the following expression.

$$dVrdtssdc = G1 \times 7.5 \times D^2 \times 10^{\{(KdBp|/10)-8\}} \times Vr$$ (Expression 48)

The first gain G1 in Expression 48 is set to the value of 1. Deceleration control is thereby carried out so that the relative deceleration becomes equal to the target relative deceleration dVrdtssdc at that time. Thus, the present distance condition evaluation index KdBp can be maintained. In other words, the present inter-vehicle distance D can be substantially maintained. Meanwhile, the first gain G1 is set to a positive value less than 1. Deceleration control is thereby carried out so that the relative deceleration becomes equal to the target relative deceleration dVrdtssdc at that time. Thus, the inter-vehicle distance can be made shorter than the present inter-vehicle distance D.

Here, consideration will be given to the range of the first gain G1. It will be assumed that the subject vehicle approaching the preceding vehicle at a stop at speed Vs0 (=Vr) starts deceleration at a certain deceleration GG. At this time, the travel distance DD traveled by the subject vehicle before it stops in a position where it is brought into contact with the preceding vehicle is expressed by the following expression.

$$DD = Vr^2/2 \times GG$$ (Expression 49)

Here, the ratio of the deceleration GG to the target relative deceleration dVrdtssdc is determined. The deceleration GG is a deceleration at which the subject vehicle stops in the position where it is brought into contact with the preceding vehicle. The target relative deceleration dVrdtssdc (first gain G1=1) is a target relative deceleration for maintaining the present distance condition evaluation index KdBp. In other words, it is a target relative deceleration for substantially maintaining the present inter-vehicle distance D.

$$GG/dVrdtssdc = (Vr^2/2 \times DD)/(G1 \times 7.5 \times D^2 \times 10^{\{(KdBp|/10)-8\}} \times Vr)$$ (Expression 50)

$$= Vr/(15 \times D^3 \times 10^{\{(KdBp|/10)-8\}})$$

When Expression 46 is substituted for the relative speed Vr in Expression 50, the following expression is obtained.

$$GG/dVrdtssdc = (2.5 \times D^3 \times 10^{\{(KdBp|/10)-8\}})/(15 \times D^3 \times 10^{\{(KdBp|/10)-8\}})$$ (Expression 51)

$$= 2.5/15 \approx 0.167$$

Therefore, a target relative deceleration dVrdtssdc at which the relative speed Vr=0 in the position where the subject vehicle is brought into contact with the preceding vehicle can be obtained by setting the first gain G1 to 0.167. The inter-vehicle distance D=0 can be maintained by carrying out deceleration control so that the relative deceleration becomes equal to the target relative deceleration dVrdtssdc. According to the foregoing, the range of the first gain G1 is between 0.167 and 1.000 inclusive.

It is advisable to change the value of first gain G1 according to the result of determination of whether or not the value of the inter-vehicle distance D is larger than the safe inter-vehicle distance Dsafe. Some examples will be taken. When the inter-vehicle distance D is longer than the safe inter-vehicle distance Dsafe, a safe inter-vehicle distance is ensured. Therefore, the first gain G1 is changed to 0.167. When the inter-vehicle distance D is shorter than the safe inter-vehicle distance Dsafe, a safe inter-vehicle distance is not ensured. Therefore, the first gain G1 is changed to an arbitrary value within the range ranging from 0.167 to 1.000. Thus, a target relative deceleration dVrdtssdc can be changed according to whether the value of the inter-vehicle distance D is larger than the safe inter-vehicle distance Dsafe or not.

When the deceleration computation unit 310 computes a target relative deceleration dVrdtssdc, it takes into account a target relative speed Vrda between the preceding vehicle and the subject vehicle, stored by a deceleration target relative speed storage unit 311. The computational expression for the target relative deceleration dVrdtssdc (first gain G1=1.000) with the target relative speed Vrda taken into account is as follows:

$$dVrdtssdc = 7.5 \times D^2 \times 10^{\{(KdBp|/10)-8\}} \times (Vr - Vrda)$$ (Expression 52)

When the target relative speed Vrda=0, deceleration control is carried out so that the relative deceleration becomes equal to the target relative deceleration dVrdtssdc at that time. As described above, the present distance condition evaluation index KdBp can be thereby maintained. In other words, the present inter-vehicle distance D can be substantially maintained.

When the target relative speed Vrda is negative (Vrda<0), the target relative deceleration dVrdtssdc takes a smaller value than in cases where the target relative speed Vrda=0. Therefore, deceleration control is carried out so that the relative deceleration becomes equal to the target relative deceleration dVrdtssdc at that time. The subject vehicle can be thereby decelerated until the present relative speed Vr becomes equal to the target relative speed Vrda.

When the target relative speed Vrda is positive (>0), the target relative deceleration dVrdtssdc takes a larger value than in cases where the target relative speed Vrda=0. Therefore, deceleration control is carried out so that the relative deceleration becomes equal to the target relative deceleration dVrdtssdc at that time. The subject vehicle can be thereby decelerated until the present relative speed Vr becomes equal to the target relative speed Vrda for distance increasing.

The deceleration computation unit 310 multiplies the target relative deceleration dVrdtssdc by a second gain G2 that takes a positive value not more than 1, determined from the speed of the preceding vehicle. More specifically, in cases where the preceding vehicle brakes suddenly, the risk posed to the subject vehicle is increased with increase in the speed of the preceding vehicle. Therefore, the driver of the subject vehicle is likely to generate a larger deceleration in the subject vehicle as the speed of the preceding vehicle becomes larger. Consequently, the deceleration computation unit 310 computes a target relative deceleration dVrdtssdc multiplied by the second gain G2 as well as the first gain.

$$dVrdtssdc = G2 \times \{G1 \times 7.5 \times D^2 \times 10^{\{(|KdBp|/10)-8\}} \times (Vr-Vrda)\} \quad \text{(Expression 53)}$$

Figure 25:
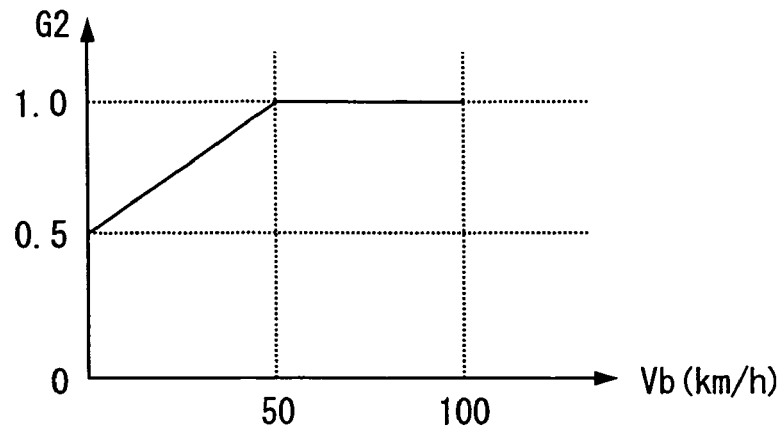
FIG. 25 is an operation diagram illustrating an example of second gain G2.

As illustrated in FIG. 25, in Expression 53, for example, the G2 is set to 0.5 when the speed Vb of the preceding vehicle is less than 50[km/h]; and the G2 is set to 1.0 when the speed Vb of the preceding vehicle is equal to or above 50[km/h]. Thus, the target relative deceleration dVrdtssdc can be matched with the deceleration generated by the driver' own decelerating operation.

A maximum acceleration storage unit 312 stores the maximum acceleration Cmax generated in the subject vehicle in acceleration control. An acceleration distance condition evaluation index setting unit 313 sets an acceleration distance condition evaluation index KdBaa (e.g. −30, −35, −40[dB]). The acceleration distance condition evaluation index KdBaa is an index to be taken as a target when the subject vehicle is accelerated by acceleration control.

As illustrated in FIG. 22, an acceleration computation unit 314 computes the following as acceleration output when it is determined that the value of the present distance condition evaluation index KdBp is smaller than the deceleration target KdBenginehys: it computes a target relative acceleration dVrdtaa between the subject vehicle and the preceding vehicle from the inter-vehicle distance D, relative speed Vr, and acceleration distance condition evaluation index KdBaa. Acceleration control is carried out so that the relative acceleration becomes equal to the target relative acceleration dVrdtaa. When the target relative acceleration dVrdtaa is larger than the maximum acceleration Cmax, this maximum acceleration Cmax is replaced with the target relative acceleration dVrdtaa. Thus, excessive acceleration can be prevented from being generated by acceleration control.

The acceleration computation unit 314 sets an acceleration distance condition evaluation index KdBaa (e.g. −30, −35, −40[dB]) in place of the present distance condition evaluation index KdBp in Expression 47. It thereby computes a target relative acceleration dVrdtaa by the following expression:

$$dVrdtaa = 7.5 \times D^2 \times 10^{\{(|KdBaa|/10)-8\}} \times Vr \quad \text{(Expression 54)}$$

This target relative acceleration dVrdtaa represents a target value of relative acceleration for maintaining the present inter-vehicle distance D (for maintaining the inter-vehicle distance D between the subject vehicle and the preceding vehicle). Therefore, acceleration control is carried out so that the relative deceleration becomes equal to this target relative deceleration dVrdtssdc. The subject vehicle can thereby run following the preceding vehicle.

When the acceleration computation unit 314 carries out computation, it takes into account a target relative speed Vraa (e.g. −5/3.6[m/s]) between the preceding vehicle and the subject vehicle, stored by an acceleration target relative speed storage unit 315, as expressed by the following expression:

$$dVrdtaa = 7.5 \times x D^2 \times 10^{\{(|KdBaa|/10)-8\}} \times (Vr-Vraa) \quad \text{(Expression 55)}$$

When the target relative speed Vraa=0, acceleration control is carried out so that the relative acceleration becomes equal to the target relative acceleration dVrdtaa at that time. The subject vehicle can thereby run following the preceding vehicle with the present inter-vehicle distance D maintained.

When the target relative speed Vraa is negative (Vraa<0), the target relative acceleration dVrdtaa takes a larger value than in cases where the target relative speed Vraa=0. Therefore, acceleration control is carried out so that the relative deceleration becomes equal to the target relative deceleration dVrdtaa at that time. The subject vehicle can be thereby accelerated until the present relative speed Vr becomes equal to the target relative speed Vraa for distance decreasing. For example, when the target relative speed Vraa is set to −5/3.6 [m/s], the subject vehicle can be accelerated so that it approaches the preceding vehicle at 5[km/h].

When the target relative speed Vraa is positive (Vraa>0), the target relative acceleration dVrdtaa takes a smaller value than in cases where the target relative speed Vraa=0. Therefore, acceleration control is carried out so that the relative acceleration becomes equal to the target relative acceleration dVrdtaa at that time. The subject vehicle can be thereby accelerated until the present relative speed Vr becomes equal to the target relative speed Vraa.

The acceleration computation unit 314 multiplies the target relative acceleration dVrdtaa shown in Expression 55 by a fourth gain that takes a positive value not more than 1. The target relative acceleration dVrdtaa multiplied by the fourth gain G4 is expressed by the following expression:

$$dVrdtaa = G4 \times \{7.5 \times D^2 \times 10^{\{(|KdBaa|/10)-8\}} \times (Vr-Vraa)\} \quad \text{(Expression 56)}$$

The fourth gain G4 in Expression 56 is set to the value of 1. Acceleration control is thereby carried out so that the relative acceleration becomes equal to the target relative acceleration dVrdtaa at that time. Thus, the subject vehicle can travel following the preceding vehicle with the present inter-vehicle distance D maintained. Meanwhile, when the fourth gain G4 is set to a positive value less than 1, the target relative acceleration dVrdtaa takes a low value. Therefore, the subject vehicle can be accelerated while increasing the inter-vehicle distance by carrying out acceleration control so that the relative acceleration becomes equal to this target relative acceleration dVrdtaa.

When it is determined that the value of the inter-vehicle distance D is smaller than the safe inter-vehicle distance Dsafe, it is preferable that the value of the fourth gain G4 should be changed to 1. Thus, the inter-vehicle distance D can be prevented from becoming shorter than the present inter-vehicle distance D.

When it is determined that the value of the inter-vehicle distance D is smaller than the safe inter-vehicle distance Dsafe, the acceleration computation unit 314 operates as follows: it computes the target relative acceleration dVrdtaa as zero (dVrdtaa=0), and prohibits the execution of acceleration control. Thus, the subject vehicle can be prevented from accelerating to approach the preceding vehicle.

A driver operation acceleration/deceleration computation unit 316 computes a driver operation acceleration/deceleration ADdr based on the condition of the driver's operation of accelerator pedal, brake pedal, or the like. It is an acceleration/deceleration requested by the driver. A coordinated acceleration/deceleration determination unit 317 determines a coordinated acceleration/deceleration ReqG from the target relative deceleration dVrdtssdc or target relative acceleration dVrdtaa and the driver operation acceleration/deceleration ADdr. The driver operation acceleration/deceleration computation unit 316 determines the coordinated acceleration/deceleration ReqG under the following conditions:

Condition 1: When the throttle valve opening request made by the driver's accelerator pedal operation is equal to or greater than a predetermined opening, the following procedure is taken: the driver operation acceleration/deceleration ADdr is taken as the coordinated acceleration/deceleration ReqG.

Condition 2: When the sign of the relative speed Vr is negative (−), that is, when the preceding vehicle and the subject vehicle draw close to each other, the following procedure is taken: in cases where the conditional expression below is satisfied, the preceding vehicle is regarded as an oncoming vehicle travelning opposite to the subject vehicle. Then, the driver operation acceleration/deceleration ADdr is taken as the coordinated acceleration/deceleration ReqG. x in the following expression is set to 5[km/h] or so.

$$-Vr < -(Vs0+x) \quad \text{(Expression 57)}$$

Condition 3: When steering system operation is performed by the driver so that a predetermined angle or a predetermined angular velocity is reached or exceeded within a predetermined time, the following procedure is taken: the driver operation acceleration/deceleration ADdr is taken as the coordinated acceleration/deceleration ReqG.

Condition 4: When brake pedal operation is performed by the driver, the driver operation acceleration/deceleration ADdr is taken as the coordinated acceleration/deceleration ReqG.

Condition 5: When it is determined by the safe inter-vehicle distance computation and determination unit 306 that the value of the inter-vehicle distance D is smaller than the safe inter-vehicle distance Dsafe, the following procedure is taken: the target relative deceleration dVrdtssdc or the target relative acceleration dVrdtaa is taken as the coordinated acceleration/deceleration ReqG.

Condition 6: When neither of Conditions 1 to 4 is satisfied, the target relative deceleration dVrdtssdc or the target relative acceleration dVrdtaa is taken as the coordinated acceleration/deceleration ReqG.

Condition 5 is for prohibiting the intervention of the driver's driving operation to accelerate the subject vehicle (prohibiting an override). Thus, when a sufficient inter-vehicle distance is not ensured, the subject vehicle can be prevented from being accelerated to further approach the preceding vehicle by the driver's driving operation.

The coordinated acceleration/deceleration determination unit 317 computes a target braking force or target driving force to be generated in the subject vehicle from the finally determined coordinated acceleration/deceleration ReqG. Then, it transmits the result of computation to the in-vehicle LAN.

Figure 26:
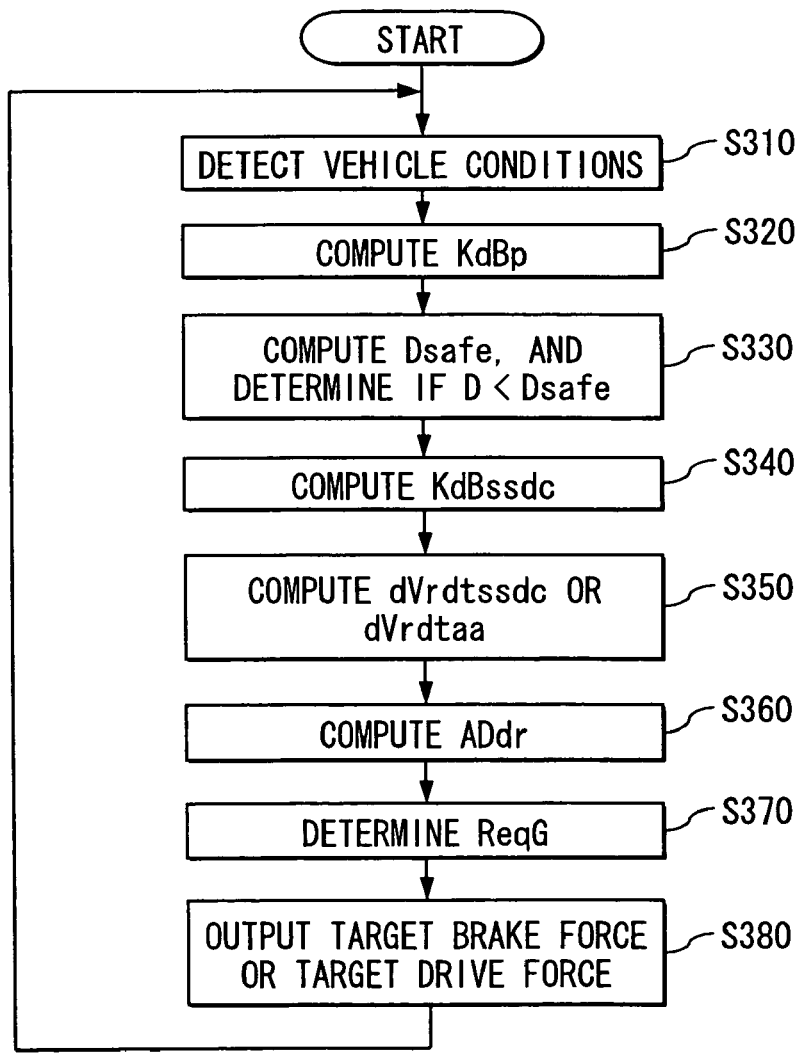
FIG. 26 is a flowchart illustrating the operation of the drive assistance system in the fourth embodiment.

The operation of this drive assistance system is described with reference to the flowchart in FIG. 26. First, at step (S) 310, the condition quantities of the vehicle, such as the inter-vehicle distance D, the vehicle speed Vs0 of the subject vehicle, the relative speed Vr, and the like, are acquired. At S320, the present distance condition evaluation index KdBp is computed. At S330, a safe inter-vehicle distance Dsafe is computed, and further it is determined whether the value of the present inter-vehicle distance D is smaller than the safe inter-vehicle distance Dsafe.

At S340, a deceleration target KdBengine, a deceleration target KdBbrake, a deceleration target KdBenginehys, and a deceleration target KdBbrakehys are computed. At the same time, the following are determined: whether or not the value of the present distance condition evaluation index KdBp is larger than the deceleration target KdBengine or the deceleration target KdBbrake; and whether or not it is smaller than the deceleration target KdBenginehys and the deceleration target KdBbrakehys.

At S350, a target relative deceleration dVrdtssdc or a target relative acceleration dVrdtaa is computed according to the result of determination at S340. At S360, a driver operation acceleration/deceleration ADdr is computed. At S370, a coordinated acceleration/deceleration ReqG is determined from the target relative deceleration dVrdtssdc or target relative acceleration dVrdtaa and the driver operation acceleration/deceleration ADdr. At S380, a target braking force or target driving force to be generated in the subject vehicle is computed from the coordinated acceleration/deceleration ReqG determined at S370, and the result of computation is outputted.

Figure 27A:
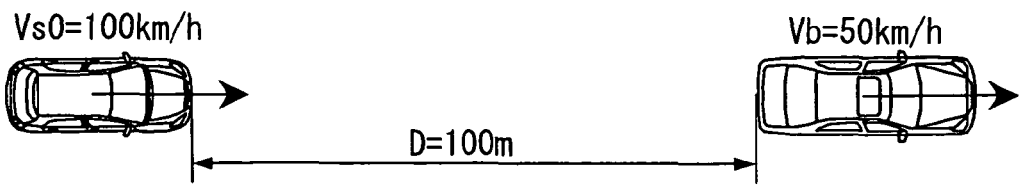
FIG. 27A is a table illustrating conditions set for numerical simulations in Cases No. 1 to 3.
Figure 27B:
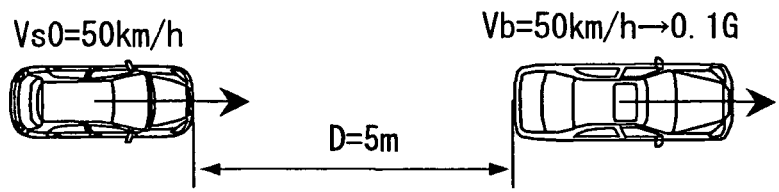
FIG. 27B is a table illustrating conditions set for numerical simulations in Cases No. 4 to 6.

FIGS. 27A and 27B illustrate set conditions in numerical simulations of this drive assistance system on a case-by-case basis. FIG. 28 to FIG. 33 illustrate the results of these numerical simulations.

FIG. 28 illustrates the result of a numerical simulation of deceleration control obtained when the following conditions are set (Case 1): the speed Vs0 of the subject vehicle is 100 km per hour; the speed Vb of the preceding vehicle is 50 km per hour; the initial value of inter-vehicle distance D is 100 m; the first gain G1 is 0.167; and the target relative speed Vrda between the preceding vehicle and the subject vehicle in deceleration control is 0 km per hour.

Figure 29:
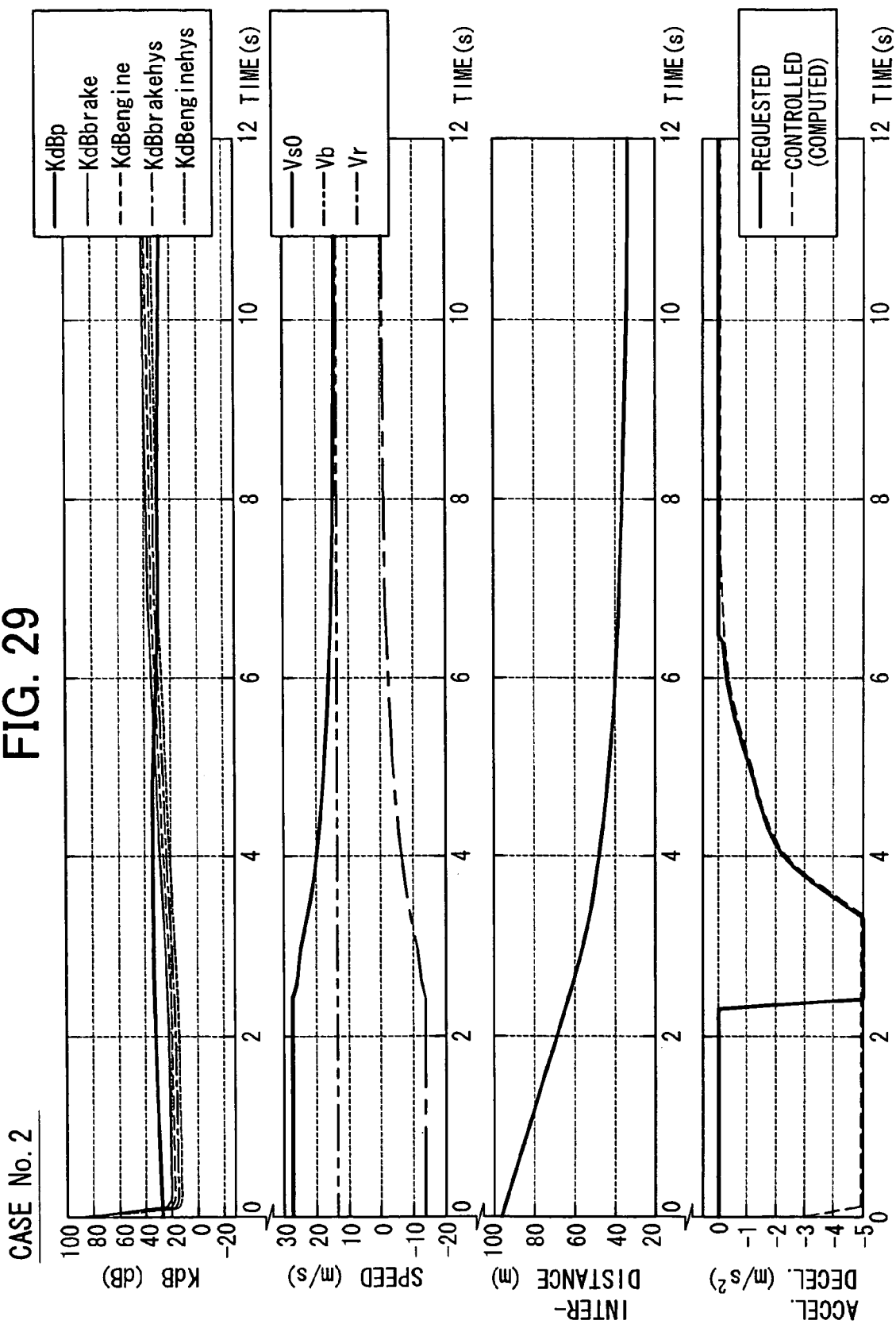
FIG. 29 is an operation diagram illustrating each result of a numerical simulation in Case No. 2.
Figure 30:
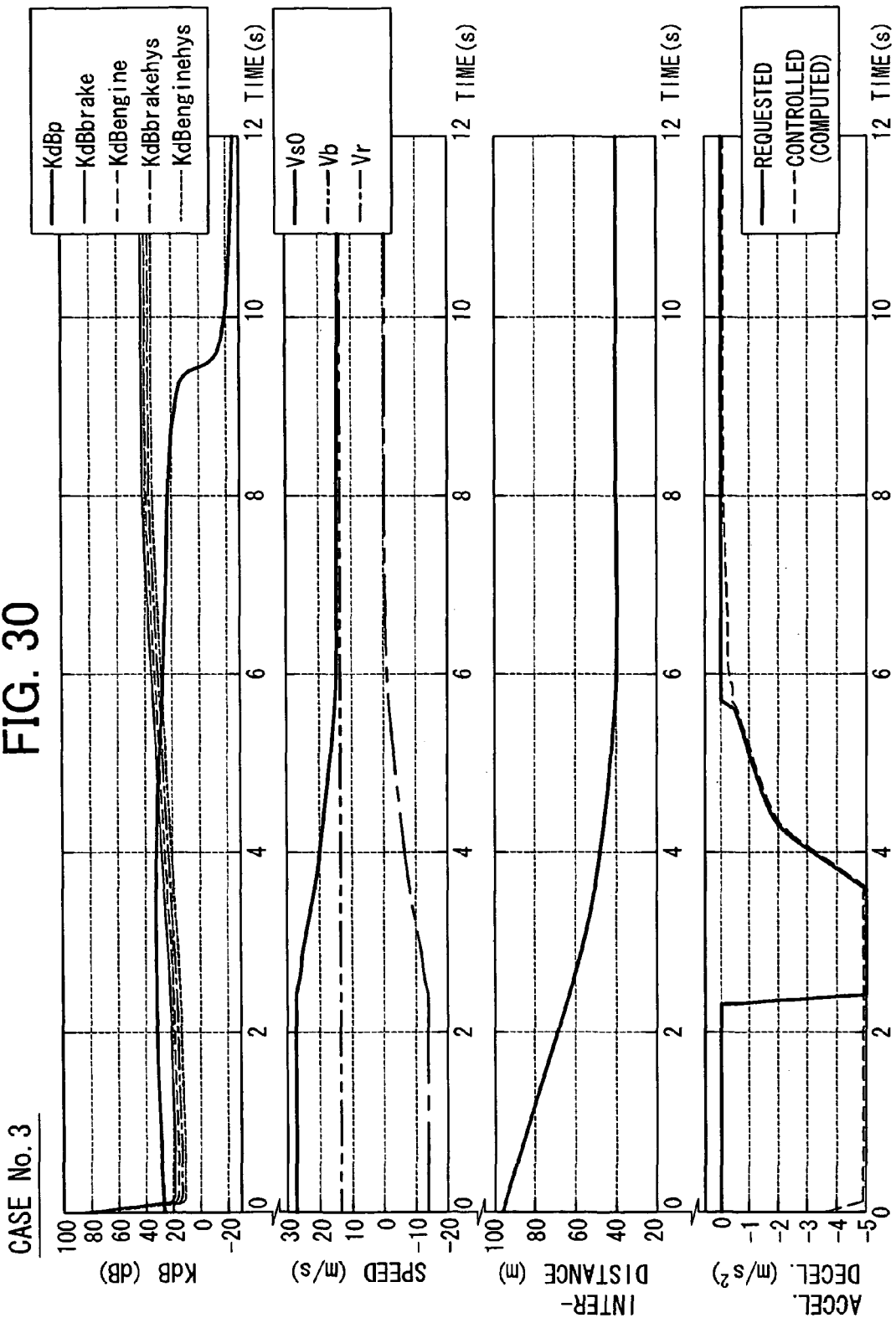
FIG. 30 is an operation diagram illustrating each result of a numerical simulation in Case No. 3.

FIG. 29 illustrates the result of a numerical simulation of deceleration control obtained when the first gain G1, a condition set for Case 1, is changed to 1.000 (Case 2). FIG. 30 illustrates the result of a numerical simulation of deceleration control obtained when the first gain G1, a condition set for Case 2, is changed to 1.000 (Case 3).

Figure 31:
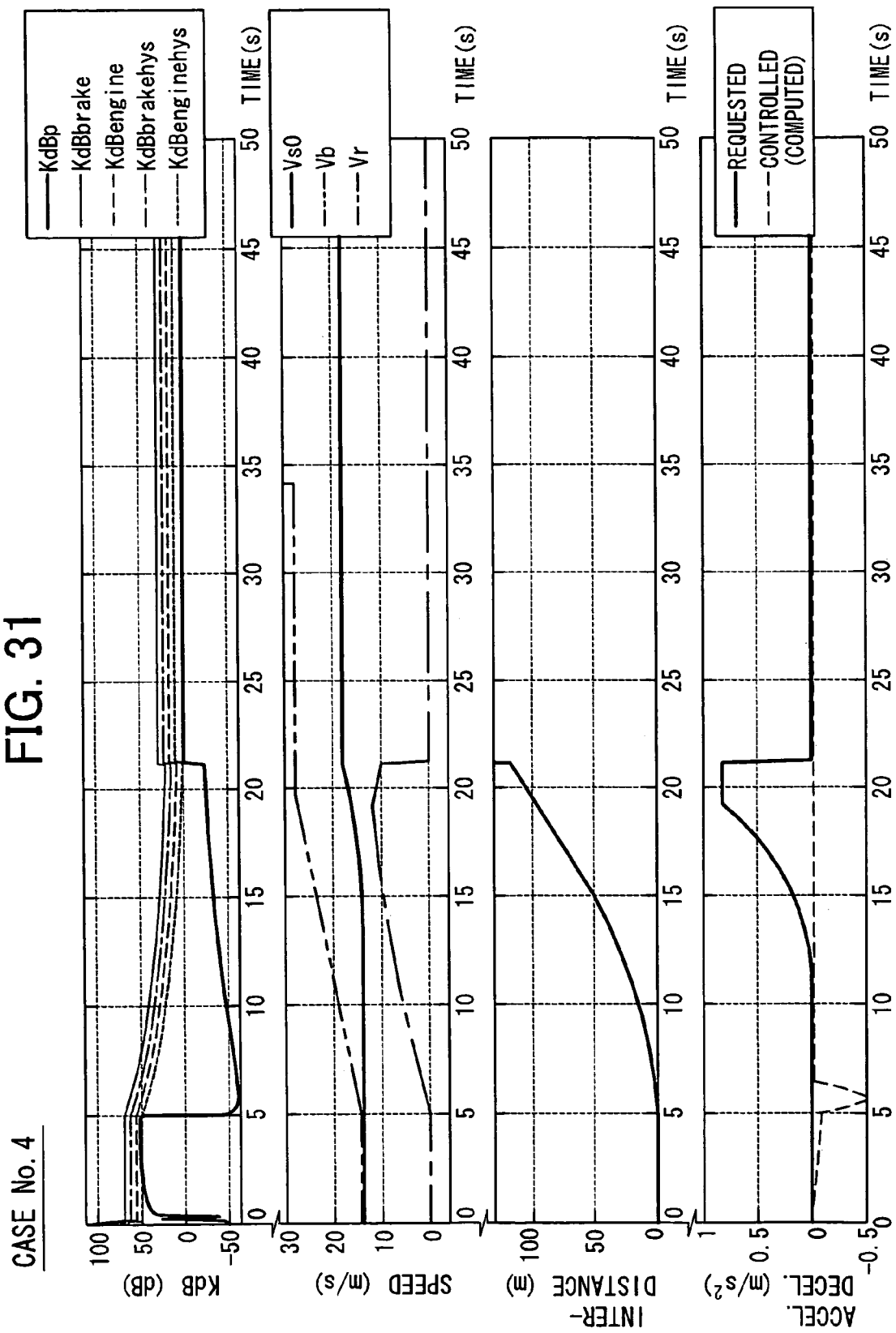
FIG. 31 is an operation diagram illustrating each result of a numerical simulation in Case No. 4.

FIG. 31 illustrates the result of a numerical simulation of acceleration/deceleration control obtained when the following conditions are set (Case 4): the speed Vs0 of the subject vehicle is 50 km per hour; the speed Vb of the preceding vehicle is 50 km per hour; the initial value of inter-vehicle distance D is 5 m; the first gain G1 is 1.000; the acceleration distance condition evaluation index KdBaa, which is an index to be taken as a target when the subject vehicle is accelerated by acceleration control, is 20[dB]; the target relative speed Vraa between the preceding vehicle and the subject vehicle in acceleration control is 0 km per hour; and the preceding vehicle starts deceleration at a deceleration of 0.1 G (approximately, 1[m/s$^2$]).

Figure 32:
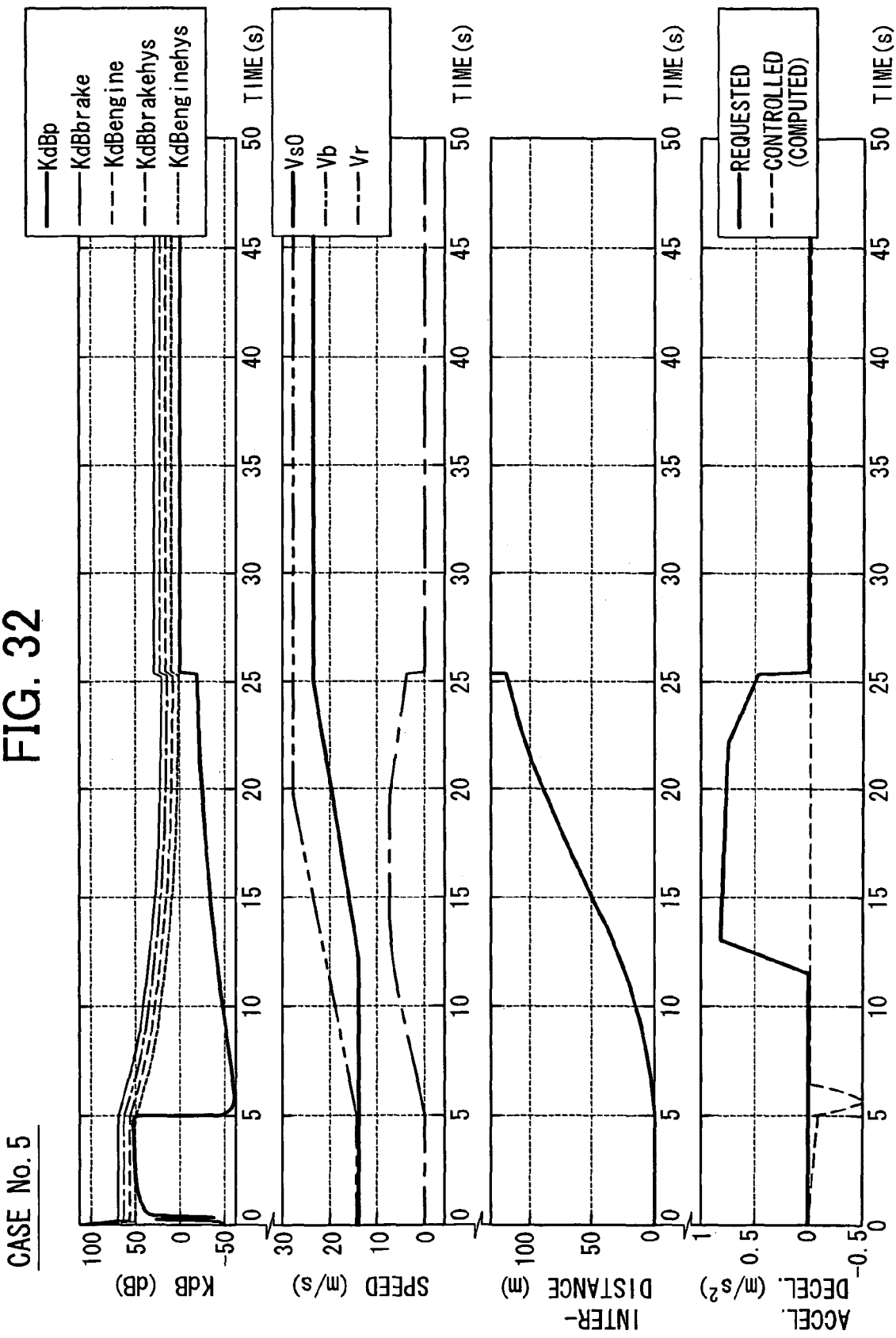
FIG. 32 is an operation diagram illustrating each result of a numerical simulation in Case No. 5.
Figure 33:
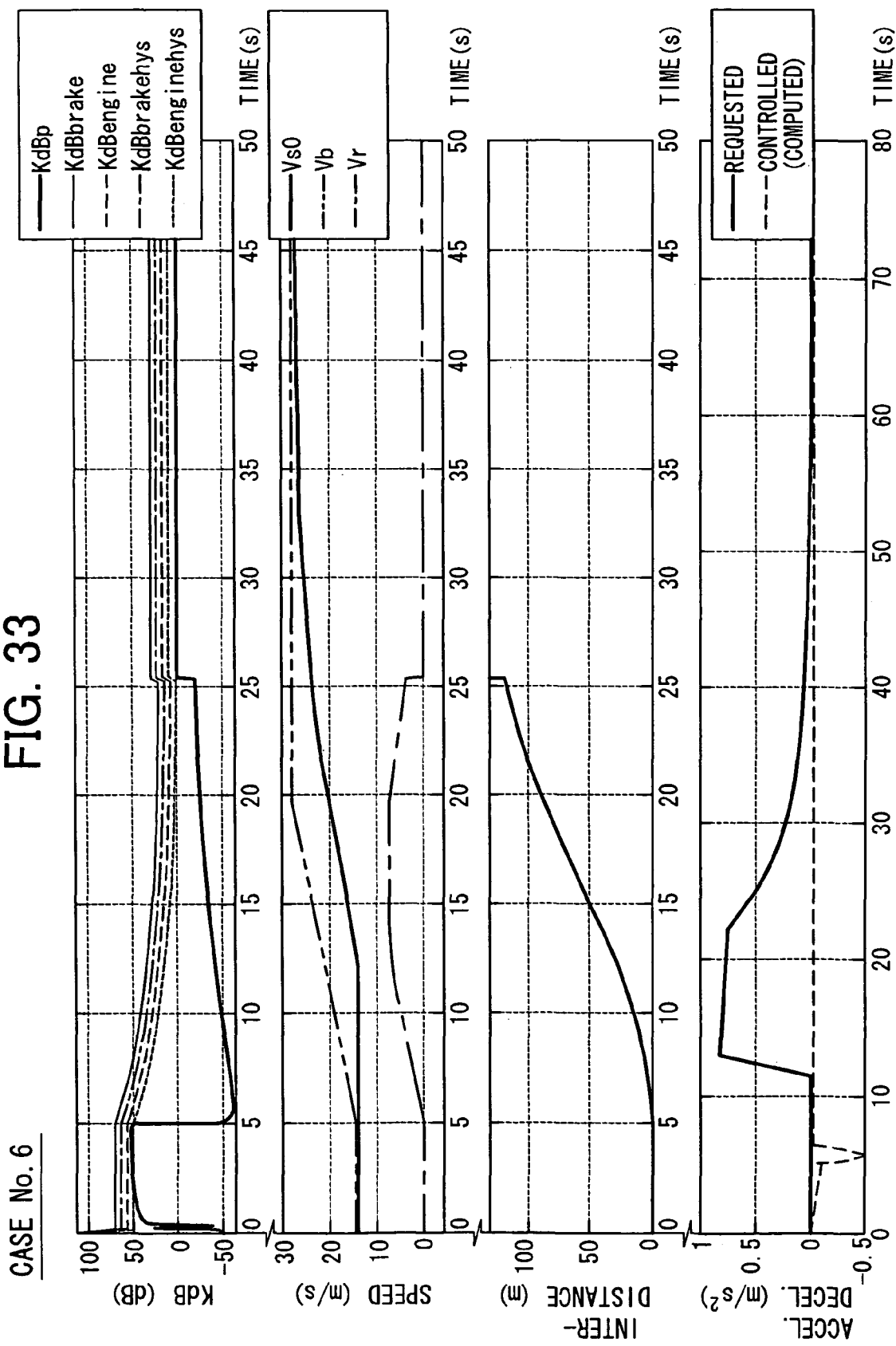
FIG. 33 is an operation diagram illustrating each result of a numerical simulation in Case No. 6.

FIG. 32 illustrates the result of a numerical simulation of acceleration/deceleration control obtained when the acceleration distance condition evaluation index KdBaa, a condition set for Case 4, is changed to 80[dB] (Case 5). FIG. 33 illustrates the result of a numerical simulation of acceleration/deceleration control obtained when the target relative speed Vraa, a condition set for Case 5, is changed to −10 km (Case 6).

The results of numerical simulations illustrated in FIG. 28 and FIG. 29 will be compared with each other. In Case 1 illustrated in FIG. 28, the first gain G1 is set to 0.167; therefore, the relative speed Vr=0 when the inter-vehicle distance D=0. In Case 2 illustrated in FIG. 29, the first gain G1 is set to 1.000; therefore, the inter-vehicle distance D is kept at approximately 30 m.

The results of numerical simulations illustrated in FIG. 29 and FIG. 30 will be compared with each other. In Case 2 illustrated in FIG. 29, the target relative speed Vrda is set to 0 km per hour; therefore, the relative speed is Vr=0 when the inter-vehicle distance D is approximately 30 m. In Case 3 illustrated in FIG. 30, the target relative speed Vrda is set to 10 km per hour; therefore, the relative speed is Vr=0 when the inter-vehicle distance D is approximately 40 m, and the inter-vehicle distance D is thereafter increased until this relative speed Vr reaches 10 km per hour.

The results of numerical simulations illustrated in FIG. 31 and FIG. 32 will be compared with each other. In Case 4 illustrated in FIG. 31, the acceleration distance condition evaluation index KdBaa is set to 20[dB]. In Case 5 illustrated in FIG. 32, the acceleration distance condition evaluation index KdBaa is set to 80[dB]. Though the rise time of requested acceleration is identical, therefore, the gradient of rise is larger in Case 5. As a result, the speed Vs0 of the subject vehicle is larger in Case 5 than in Case 4.

The results of numerical simulations illustrated in FIG. 32 and FIG. 33 will be compared with each other. In Case 5 in FIG. 32, the target relative speed Vraa in acceleration is set to 0 km per hour; therefore, the relative speed is Vr=0 when approximately 25 seconds pass. In Case 6 illustrated in FIG. 33, the target relative speed Vraa in acceleration is set to −10 km; therefore, the speed of the subject vehicle exceeds the speed of the preceding vehicle with time. This control is carried out until the relative speed Vr reaches −10 km per hour.

Various modifications may be made to the fourth embodiment as follows.

(Fifth Modification)

As described above, the driver condition coefficient K, which represents the degree of change in the area of the preceding vehicle as viewed from the driver of the subject vehicle, can be used as an evaluation index of the distance decreasing and distance increasing between the preceding vehicle and the subject vehicle. Therefore, for example, the traveling of the driver may be managed based on the distance condition evaluation index KdB. Alternatively, driver education may be carried out based on the distance condition evaluation index KdB.

(Sixth Modification)

When the preceding vehicle is a heavy vehicle, for example, there is a possibility that the driver of the subject vehicle may differently feel the degree of change in the area of the preceding vehicle as viewed from the driver. Therefore, the value of third gain G3 may be changed according to the type of the preceding vehicle. (For example, G3=1.0 when the preceding vehicle is an ordinary-sized passenger vehicle; G3=0.8 when it is a heavy vehicle.)

(Seventh Modification)

The drive assistance system in the fourth embodiment is so constructed as to carry out acceleration/deceleration control. It may be so constructed that an alarm is generated when acceleration/deceleration control is carried out.

(Eighth Modification)

For example, in cases where the inter-vehicle distance D is 10 m or less when deceleration control is carried out, the following operation may be performed: the first gain G1 is set to 1.000 to generate high deceleration, and impact from collision with the preceding vehicle is thereby lessened.

(Ninth Modification)

When there is a following vehicle behind the subject vehicle, the following operation may be performed: in cases where the distance and relative speed between the subject vehicle and the following vehicle can be acquired, the operation described below is performed. The execution timing of deceleration control is determined with the preceding vehicle regarded as the subject vehicle and with the following vehicle regarded as the subject vehicle. The following vehicle is informed of the risk of rear-end collision when deceleration control is carried out. To inform the following vehicle of the risk of rear-end collision, the stop lamps or hazard lamps of the subject vehicle may be turned on.

(Tenth Modification)

In this embodiment, the distance condition evaluation index KdB (Expression 59) is defined based on the driver condition coefficient K (Expression 58), which represents the degree of change (dS/dt) in the size (area S) of an image of the preceding vehicle. Then, Expression 59 is transformed to define the basic equation (Expression 60) for target relative acceleration/deceleration.

$$K = dS/dt \propto d(1/D^2)/dt = (-2/D^3) \times (dD/dt) = (-2/D^3) \times Vr \quad \text{(Expression 58)}$$

$$KdB = 10 \times \log\{-|K|/(5 \times 10^{-8})\} \quad \text{(Expression 59)}$$

$$dVr/dt = (dVr/dD) \times (dD/dt) = 7.5 \times 10^{\{((KdB|/10)-8\}} \times D^2 \times Vr \quad \text{(Expression 60)}$$

As in this modification, the following construction may be adopted: when the inter-vehicle distance is approximately 50 m or longer, at which the driver of the subject vehicle is lowered in the degree of perception on change in the area of the preceding vehicle, the measure described below is taken. Based on the degree of change in length, such as width or height, of the preceding vehicle or the degree of change in the preceding vehicle as a dot, the basic equation for target relative acceleration/deceleration is defined as described below. Then, it is used in acceleration/deceleration control.

For example, the degree of change K in the length, such as width or height, of the preceding vehicle is defined as the following expression:

$$K = (-1/D^2) \times Vr \quad \text{(Expression 61)}$$

Then, the basic equation for target relative acceleration/deceleration based on the degree of change in length, such as width or height, of the preceding vehicle is expressed by the following expression:

$$KdB = 10 \times \log\{-|K|/(2.5 \times 10^{-6})\} \quad \text{(Expression 62)}$$

$$dVr/dt = 5 \times 10^{\{((KdB|/10)-8\}} \times D \times Vr \quad \text{(Expression 63)}$$

The degree of change K in the preceding vehicle as a dot is defined as the following expression, for example:

$$K = (-1/D) \times Vr \quad \text{(Expression 64)}$$

Then, the basic equation for target relative acceleration/deceleration based on the degree of change K in the preceding vehicle as a dot is expressed by the following expression:

$$KdB = 10 \times \log\{-|K|/(2.5 \times 10^{-4})\} \quad \text{(Expression 65)}$$

$$dVr/dt = 2.5 \times 10^{\{((KdB|/10)-4\}} \times Vr \quad \text{(Expression 66)}$$

The first gain G1 for obtaining a target relative deceleration dVrdtssdc with which the relative speed Vr can be made equal to 0 in the position where the subject vehicle is brought into contact with the preceding vehicle is as follows: in case of the degree of change in the area of the preceding vehicle, G1=0.167; in case of the degree of change in the length, such as width or height, of the preceding vehicle, G1=0.25; in case of the degree of change in the preceding vehicle as a dot, G1=0.5.

The first gain G1 for maintaining the present distance condition evaluation index KdBp is as follows (in other words, the first gain G1 for substantially maintaining the present inter-vehicle distance D is as follows): in case of the degree of change in the area of the preceding vehicle, G1=1.000; in case of the degree of change in the length, such as width or height, of the preceding vehicle, G1=0.167×4=0.668; in case of the degree of change in the preceding vehicle as a dot, G1=0.167×2=0.334.

It is advisable to carry out acceleration/deceleration control based on the degree of change in the length, such as width or height, of the preceding vehicle or the degree of change in the preceding vehicle as a dot by appropriately changing the first gain G1.

What is claimed is:

1. A driver condition detecting device for detecting a driving condition of a driver of a subject vehicle relative to a preceding vehicle in a traveling direction of the subject vehicle, comprising:
   a driver condition coefficient computation unit that computes a driver condition coefficient K that indicates a degree of change in a size of an image of the preceding vehicle as viewed from the driver of the subject vehicle, the degree of change in the size of an image of the preceding vehicle being the degree of change of an area per unit time in the size of the image of the preceding vehicle acquired by an image pickup device;
   a driver condition detecting device that detects the driving condition of the driver based on the driver condition coefficient K computed by the driver condition coefficient computation unit; when the driving condition indicates normal or appropriate, the driver can perform a driving operation such that a certain inter-vehicle distance is maintained, when the driving condition indicates at least inappropriate, the driver cannot perform the driving operation such that a certain inter-vehicle distance is maintained; and
   an inter-vehicle distance detecting device that detects an inter-vehicle distance between the preceding vehicle and the subject vehicle,
   wherein the driver condition coefficient computation unit computes the driver condition coefficient K as $K=(-2/D^3) \times (dD/dt)$, in which the inter-vehicle distance is represented by D and change in the inter-vehicle distance per unit time is represented by dD/dt, the inter-vehicle distance being assumed equal to a distance between the driver's eyes and the preceding vehicle.

2. An in-vehicle alarm system comprising:
   a driver condition detecting device according to claim 1; and
   a driving condition reporting device that reports the driving condition of the driver corresponding to a magnitude of an absolute value of the driver condition coefficient.

3. An in-vehicle alarm system comprising:
   a driver condition detecting device according to claim 1; and
   an alarm generating device that generates an alarm to the driver based on a magnitude of an absolute value of the driver condition coefficient.

4. The in-vehicle alarm system according to claim 3 further comprising:
   a braking force applying device that applies braking force to the subject vehicle,
   wherein the alarm generating device causes the braking force applying device to apply braking force to decelerate the subject vehicle and thereby generates an alarm.

5. The in-vehicle alarm system according to claim 3, further comprising:
   a time-to-collision computing device that computes a time to collision that indicates a time allowed before the subject vehicle collides with the preceding vehicle,
   wherein the alarm generating device generates the alarm according to the time to collision.

6. The in-vehicle alarm system according to claim 3, further comprising:
   a target inter-vehicle distance computation unit that computes a target inter-vehicle distance between the preceding vehicle and the subject vehicle, corresponding to the vehicle speed of the subject vehicle,
   wherein, when the inter-vehicle distance between the preceding vehicle and the subject vehicle becomes shorter than the target inter-vehicle distance, the alarm generating device generates an alarm.

7. The in-vehicle alarm system according to claim 3, further comprising:
   an alarm determining device that compares a value taken by the driver condition coefficient with a threshold value of the driver condition coefficient and determines whether to generate an alarm or not, so that the alarm is generated when the alarm determining device determines that the alarm should be generated.

8. The in-vehicle alarm system according to claim 7, further comprising:
   a threshold value changing device that changes a threshold value of the driver condition coefficient to an arbitrary value.

9. The in-vehicle alarm system according to claim 7,
   wherein the alarm determining device repeatedly carries out determination in a predetermined cycle, and
   wherein, when the number of times of determination of alarm becomes a certain value or above and/or when the time when it is determined that an alarm should be generated lasts for a certain time or longer, the alarm generating device generates the alarm.

10. The in-vehicle alarm system according to claim 9,
    wherein, when generation of the alarm is started and then the time when the alarm determining device determines that an alarm should not be generated lasts for a certain time or longer, the alarm generating device ceases generating an alarm.

11. The in-vehicle alarm system according to claim 10,
    wherein, the relative speed between the preceding vehicle and the subject vehicle takes a negative value when the preceding vehicle and the subject vehicle draw close to each other and a positive value when the preceding vehicle and the subject vehicle draw apart from each other, and
    wherein, when the relative speed between the preceding vehicle and the subject vehicle transitions from negative to positive, the alarm generating device ceases generating an alarm.

12. An in-vehicle alarm system comprising:
    a driver condition detecting device according to claim 1; and
    an alarm generating device that generates an alarm to the driver based on the driver condition coefficient,
    wherein the driver condition coefficient K is indicated by a positive or negative value relative to a value obtained when there is no change in the size of an image of the preceding vehicle,
    wherein, when the size of an image of the preceding vehicle is changed and increased, the driver condition coefficient takes a positive value,
    wherein, when the size of an image of the preceding vehicle is changed and reduced, the driver condition coefficient takes a negative value, and
    wherein, when the driver condition coefficient takes a negative value, the alarm generating device generates the alarm.

13. The in-vehicle alarm system according to claim 12, further comprising:
a driving force applying device that applies driving force to the subject vehicle,
wherein the alarm generating device causes the driving force applying device to apply driving force to accelerate the subject vehicle, and thereby generates the alarm.

14. An in-vehicle alarm system comprising:
a driver condition detecting device according to claim 1;
an object detecting device that detects an object existing ahead of the subject vehicle; and
an alarm generating device that, when the object detecting device detects the object and the object exists in a predetermined alarm coverage ahead of the subject vehicle, generates an alarm to the driver,
wherein the alarm generating device includes an alarm coverage changing device that changes a width of the alarm coverage according to the an absolute value of the driver condition coefficient.

15. The in-vehicle alarm system according to claim 14,
wherein the alarm coverage changing device changes a width in the left and right direction ahead of the subject vehicle and changes the alarm coverage so that the width is widened with increase in the absolute value of the driver condition coefficient, and
wherein the width is narrowed with decrease in the absolute value of the driver condition coefficient.

16. The in-vehicle alarm system according to claim 14,
wherein the object detecting device detects at least one object of light vehicle, pedestrian, road traffic sign, and traffic light.

17. A drive assistance system comprising:
a driver condition detecting device according to claim 1; and
an acceleration/deceleration controlling device that, when the subject vehicle travels following the preceding vehicle, carries out at least either of acceleration control in which the subject vehicle is accelerated and deceleration control in which the subject vehicle is decelerated based on the driver condition coefficient.

18. The drive assistance system according to claim 17, further comprising:
a driving condition reporting device that reports the driving condition of the driver corresponding to a magnitude of an absolute value of the driver condition coefficient.

19. A driver condition detecting device for detecting a driving condition of a driver of a subject vehicle relative to a preceding vehicle in a traveling direction of the subject vehicle, comprising:
a driver condition coefficient computation unit that computes a driver condition coefficient K that indicates a degree of change in a size of an image of the preceding vehicle as viewed from the driver of the subject vehicle, the degree of change in the size of an image of the preceding vehicle being the degree of change of an area per unit time in the size of the image of the preceding vehicle acquired by an image pickup device;
a driver condition detecting that detects the driving condition of the driver based on the driver condition coefficient computed by the driver condition coefficient computation unit; when the driving condition indicates normal or appropriate, the driver can perform a driving operation such that a certain inter-vehicle distance is maintained, when the driving condition indicates at least inappropriate, the driver cannot perform the driving operation such that a certain inter-vehicle distance is maintained;
an inter-vehicle distance detecting that detects an inter-vehicle distance between the preceding vehicle and the subject vehicle;
a subject vehicle speed detecting device that detects a vehicle speed of the subject vehicle; and
at least either of a first relative speed computing device that computes the relative speed between the preceding vehicle and the subject vehicle from the vehicle speed of the subject vehicle and temporal change in the inter-vehicle distance and a second relative speed detecting device that detects the relative speed between the preceding vehicle and the subject vehicle,
wherein the driver condition coefficient computation unit computes the driver condition coefficient K as $K=(-2/D^3) \times Vr$, in which the inter-vehicle distance is represented by D and the relative speed is represented by Vr, the inter-vehicle distance being assumed equal to a distance between the driver's eyes and the preceding vehicle.

20. An in-vehicle alarm system comprising:
a driver condition detecting device according to claim 19; and
a driving condition reporting device that reports the driving condition of the driver corresponding to a magnitude of an absolute value of the driver condition coefficient.

21. An in-vehicle alarm system comprising:
a driver condition detecting device according to claim 19; and
an alarm generating device that generates an alarm to the driver based on a magnitude of an absolute value of the driver condition coefficient.

22. An in-vehicle alarm system comprising:
a driver condition detecting device according to claim 19; and
an alarm generating device that generates an alarm to the driver based on the driver condition coefficient,
wherein the driver condition coefficient K is indicated by a positive or negative value relative to a value obtained when there is no change in the size of an image of the preceding vehicle,
wherein, when the size of an image of the preceding vehicle is changed and increased, the driver condition coefficient takes a positive value,
wherein, when the size of an image of the preceding vehicle is changed and reduced, the driver condition coefficient takes a negative value, and
wherein, when the driver condition coefficient takes a negative value, the alarm generating device generates the alarm.

23. An in-vehicle alarm system comprising:
a driver condition detecting device according to claim 19;
an object detecting device that detects an object existing ahead of the subject vehicle; and
an alarm generating device that, when the object detecting device detects the object and the object exists in a predetermined alarm coverage ahead of the subject vehicle, generates an alarm to the driver,
wherein the alarm generating device includes an alarm coverage changing device that changes a width of the alarm coverage according to the an absolute value of the driver condition coefficient.

24. A driver condition detecting device for detecting a driving condition of a driver of a subject vehicle relative to a preceding vehicle in a traveling direction of the subject vehicle, comprising:
a driver condition coefficient computation unit that computes a driver condition coefficient K that indicates a degree of change in a size of an image of the preceding vehicle as viewed from the driver of the subject vehicle, the degree of change in the size of an actual image of the preceding vehicle being the degree of change of an area per unit time in the size of the image of the preceding vehicle acquired by an image pickup device;

a driver condition detecting device that detects the driving condition of the driver based on the driver condition coefficient computed by the driver condition coefficient computation unit; when the driving condition indicates normal or appropriate, the driver can perform a driving operation such that a certain inter-vehicle distance is maintained, when the driving condition indicates at least inappropriate, the driver cannot perform the driving operation such that a certain inter-vehicle distance is maintained; and the image pickup device that is mounted in the subject vehicle and picks up an actual image of the preceding vehicle, wherein the driver condition coefficient K is computed as a derivative of an area of the preceding vehicle in the actual image picked up by the image pickup device with respect to time computed from an inter-vehicle distance D and change in the inter-vehicle distance per unit time is represented by dD/dt, the inter-vehicle distance being assumed equal to a distance between the driver's eyes and the preceding vehicle.

25. An in-vehicle alarm system comprising:

a driver condition detecting device for detecting a driving condition of a driver of a subject vehicle relative to a preceding vehicle in a traveling direction of the subject vehicle, the driver condition detecting device comprising, a driver condition coefficient computation unit that computes a driver condition coefficient K that indicates a degree of change in a size of an image of the preceding vehicle as viewed from the driver of the subject vehicle, the degree of change in the size of an image of the preceding vehicle being the degree of change of an area per unit time in the size of the image of the preceding vehicle acquired by an image pickup device; and a driver condition detecting device that detects the driving condition of the driver based on the driver condition coefficient computed by the driver condition coefficient computation unit; when the driving condition indicates normal or appropriate, the driver can perform a driving operation such that a certain inter-vehicle distance is maintained, when the driving condition indicates at least inappropriate, the driver cannot perform the driving operation such that a certain inter-vehicle distance is maintained; and an alarm generating device that generates an alarm to the driver, wherein the driver condition coefficient is indicated by a positive or negative value relative to a value obtained when there is no change in the size of an image of the preceding vehicle, wherein, when the size of the image of the preceding vehicle is changed and increased, the driver condition coefficient takes the positive value, wherein, when the size of the image of the preceding vehicle is changed and reduced, the driver condition coefficient takes the negative value, wherein, when the driver condition coefficient takes the positive value, the alarm generating device generates the alarm, and wherein the driver condition coefficient K is computed as a derivative of an area of the preceding vehicle in the actual image picked up by the image pickup device with respect to time computed from an inter-vehicle distance D and change in the inter-vehicle distance per unit time is represented by dD/dt, the inter-vehicle distance being assumed equal to a distance between the driver's eyes and the preceding vehicle.

26. A drive assistance system comprising:

a driver condition detecting device for detecting a driving condition of a driver of a subject vehicle relative to a preceding vehicle in a traveling direction of the subject vehicle, the driver condition detecting device comprising, a driver condition coefficient computation unit that computes a driver condition coefficient K that indicates a degree of change in a size of an image of the preceding vehicle as viewed from the driver of the subject vehicle, the degree of change in the size of an image of the preceding vehicle being the degree of change of an area per unit time in the size of the image of the preceding vehicle acquired by an image pickup device; and a driver condition detecting device that detects the driving condition of the driver based on the driver condition coefficient computed by the driver condition coefficient computation unit; when the driving condition indicates normal or appropriate, the driver can perform a driving operation such that a certain inter-vehicle distance is maintained, when the driving condition indicates at least inappropriate, the driver cannot perform the driving operation such that a certain inter-vehicle distance is maintained; and an acceleration/deceleration controlling device that, when the subject vehicle travels following the preceding vehicle, carries out at least either of acceleration control in which the subject vehicle is accelerated and deceleration control in which the subject vehicle is decelerated based on the driver condition coefficient, wherein the driver condition coefficient is indicated by a positive or negative value relative to the value obtained when there is no change in the size of an image of the preceding vehicle, wherein the driver condition coefficient takes a positive value when the size of an image of the preceding vehicle is changed and increased, wherein the driver condition coefficient takes a negative value when the size of an image of the preceding vehicle is changed and reduced, wherein the acceleration/deceleration controlling device carries out the deceleration control when the driver condition coefficient takes the positive value, and the acceleration control when the driver condition coefficient takes the negative value, and wherein the driver condition coefficient K is computed as a derivative of an area of the preceding vehicle in the actual image picked up by the image pickup device with respect to time computed from an inter-vehicle distance D and change in the inter-vehicle distance per unit time is represented by dD/dt, the inter-vehicle distance being assumed equal to a distance between the driver's eyes and the preceding vehicle.

27. The drive assistance system according to claim 26, further comprising:

an oncoming vehicle detecting device that detects an oncoming vehicle on a lane adjacent to the lane on which the subject vehicle is traveling, wherein, when the oncoming vehicle detecting device detects an oncoming vehicle, the acceleration/deceleration controlling device ceases the execution of acceleration control in which the subject vehicle is accelerated and deceleration control in which the subject vehicle is decelerated.

28. The drive assistance system according to claim 26, wherein, when a steering system of the subject vehicle is operated by the driver, the acceleration/deceleration controlling device ceases the execution of the deceleration control.

29. The drive assistance system according to claim 26, further comprising:
a vehicle speed controlling device that controls the vehicle speed of the subject vehicle to a certain vehicle speed.

30. A drive assistance system comprising:
a driver condition detecting device for detecting a driving condition of a driver of a subject vehicle relative to a preceding vehicle in a traveling direction of the subject vehicle, the driver condition detecting device comprising,
a driver condition coefficient computation unit that computes a driver condition coefficient K that indicates a degree of change in a size of an image of the preceding vehicle as viewed from the driver of the subject vehicle, the degree of change in the size of an image of the preceding vehicle being the degree of change of an area per unit time in the size of the image of the preceding vehicle acquired by an image pickup device; and
a driver condition detecting device that detects the driving condition of the driver based on the driver condition coefficient computed by the driver condition coefficient computation unit; when the driving condition indicates normal or appropriate, the driver can perform a driving operation such that a certain inter-vehicle distance is maintained, when the driving condition indicates at least inappropriate, the driver cannot perform the driving operation such that a certain inter-vehicle distance is maintained; and
an acceleration/deceleration controlling device that, when the subject vehicle travels following the preceding vehicle, carries out at least either of acceleration control in which the subject vehicle is accelerated and deceleration control in which the subject vehicle is decelerated based on the driver condition coefficient,
wherein, even when at least either of acceleration operation and brake operation by the driver of the subject vehicle intervenes while the acceleration control or the deceleration control is being carried out, the acceleration/deceleration controlling device carries out the acceleration control or the deceleration control without interruption, and
wherein the driver condition coefficient K is computed as a derivative of an area of the preceding vehicle in the actual image picked up by the image pickup device with respect to time computed from an inter-vehicle distance D and change in the inter-vehicle distance per unit time is represented by dD/dt, the inter-vehicle distance being assumed equal to a distance between the driver's eyes and the preceding vehicle.

31. The drive assistance system according to claim 30, wherein, when acceleration operation is performed to accelerate the subject vehicle while the deceleration control is being carried out, the acceleration/deceleration controlling device ceases the execution of the deceleration control when a certain time has lapsed after start of the acceleration operation.

32. The drive assistance system according to claim 30, wherein the acceleration/deceleration controlling device carries out at least either of deceleration control by main brake and deceleration control by engine brake as the deceleration control, and carries out only deceleration control by engine brake when a certain time has elapsed after start of the acceleration operation in cases where the acceleration operation is performed to accelerate the subject vehicle while the deceleration control is being carried out.

33. A drive assistance system comprising:
a driver condition detecting device for detecting a driving condition of a driver of a subject vehicle relative to a preceding vehicle in a traveling direction of the subject vehicle, the driver condition detecting device comprising,
a driver condition coefficient computation unit that computes a driver condition coefficient K that indicates a degree of change in a size of an image of the preceding vehicle as viewed from the driver of the subject vehicle, the degree of change in the size of an image of the preceding vehicle being the degree of change of an area per unit time in the size of the image of the preceding vehicle acquired by an image pickup device; and
a driver condition detecting device that detects the driving condition of the driver based on the driver condition coefficient computed by the driver condition coefficient computation unit; when the driving condition indicates normal or appropriate, the driver can perform a driving operation such that a certain inter-vehicle distance is maintained, when the driving condition indicates at least inappropriate, the driver cannot perform the driving operation such that a certain inter-vehicle distance is maintained; and
an acceleration/deceleration controlling device that, when the subject vehicle travels following the preceding vehicle, carries out at least either of acceleration control in which the subject vehicle is accelerated and deceleration control in which the subject vehicle is decelerated based on the driver condition coefficient,
wherein the deceleration control by the acceleration/deceleration controlling device is such that a plurality of different threshold values are set for the driver condition coefficient and a plurality of different decelerations to be generated in the subject vehicle are set for the threshold values,
wherein the subject vehicle is decelerated at a deceleration corresponding to the value of the driver condition coefficient, and
wherein the driver condition coefficient K is computed as a derivative of an area of the preceding vehicle in the actual image picked up by the image pickup device with respect to time computed from an inter-vehicle distance D and change in the inter-vehicle distance per unit time is represented by dD/dt, the inter-vehicle distance being assumed equal to a distance between the driver's eyes and the preceding vehicle.

34. The drive assistance system according to claim 33, wherein the acceleration/deceleration controlling device sets the deceleration to be generated in the subject vehicle to a larger value as the threshold value is larger.

35. A driver condition detecting device for detecting a driving condition of a driver of a subject vehicle relative to a preceding vehicle in a traveling direction of the subject vehicle, comprising:

- a sensing device that senses a forward condition of the subject vehicle and provides a signal of the forward condition;
- a driver condition coefficient computation unit that computes, based on the signal of the forward condition, a driver condition coefficient K that indicates a degree of change in a size of an image of the preceding vehicle with respect to time as viewed from the driver of the subject vehicle, the degree of change in the size of an image of the preceding vehicle being the degree of change of an area per unit time in the size of the image of the preceding vehicle acquired by an image pickup device; and
- a driver condition detecting device that detects the driving condition of the driver based on the driver condition coefficient computed by the driver condition coefficient computation unit; when the driving condition indicates normal or appropriate, the driver can perform a driving operation such that a certain inter-vehicle distance is maintained, when the driving condition indicates at least inappropriate, the driver cannot perform the driving operation such that a certain inter-vehicle distance is maintained;

wherein the driver condition coefficient K is computed as a derivative of an area of the preceding vehicle in the actual image picked up by the image pickup device with respect to time computed from an inter-vehicle distance D and change in the inter-vehicle distance per unit time is represented by dD/dt, the inter-vehicle distance being assumed equal to a distance between the driver's eyes and the preceding vehicle.

* * * * *